(12) United States Patent
Yamagata et al.

(10) Patent No.: US 6,349,000 B1
(45) Date of Patent: Feb. 19, 2002

(54) DEVICE FOR CALCULATING DIFFRACTION EFFICIENCIES OF A DIFFRACTION LENS, LENS WITH GRATING ELEMENT, AND OPTICAL SYSTEM FOR READING

(75) Inventors: Michihiro Yamagata; Kazutake Boku, both of Osaka; Yasuhiro Tanaka, Hyogo; Tomohiko Sasano; Shusuke Ono, both of Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/154,355

(22) Filed: Sep. 16, 1998

(30) Foreign Application Priority Data

| Sep. 24, 1997 | (JP) | 9-258132 |
| Oct. 3, 1997 | (JP) | 9-270933 |
| Nov. 20, 1997 | (JP) | 9-320127 |

(51) Int. Cl.$^7$ .............................. G02B 5/18
(52) U.S. Cl. ....................................... 359/575
(58) Field of Search ........................ 359/575

(56) References Cited

U.S. PATENT DOCUMENTS

| 5,078,513 A | 1/1992 | Spaulding et al. |
| 5,161,057 A | 11/1992 | Johnson |
| 5,161,059 A | * 11/1992 | Swanson et al. ............ 356/565 |

(List continued on next page.)

FOREIGN PATENT DOCUMENTS

| DE | 43 23 971 | 2/1994 |
| EP | 615 142 | 9/1994 |
| JP | 5-119255 | 5/1993 |
| JP | 5-135193 | 6/1993 |
| JP | 8-171052 | 7/1996 |
| JP | 10-133104 | 5/1998 |
| WO | WO 95/18393 | 7/1995 |

OTHER PUBLICATIONS

Swanson, G. et al. "Diffractive optical elements for use in infrared systems", Optical Engineering; vol. 28, No. 6; Jun. 1989, pp. 605–608.

(List continued on next page.)

Primary Examiner—F. L. Evans
Assistant Examiner—Zandra V. Smith
(74) Attorney, Agent, or Firm—Merchant & Gould P.C.

(57) ABSTRACT

A device for calculating diffraction efficiencies of a diffraction lens divided into a plurality of regions, each region comprising at least one grating ring, comprises a first memory for storing information about diffraction efficiencies of the regions; a second memory for storing information about weights corresponding to the regions; and a first processor for retrieving information from the first and the second memory, and calculating diffraction efficiencies of the entire diffraction lens using the formula $$E_j = \sum_{m=1}^{M} W_m \eta_{mj} \quad (1)$$

wherein:
- j: integer indicating the order of diffraction light
- $E_j$: diffraction efficiency for j-th order diffraction light of the diffraction lens
- M: positive integer (M>1) indicating the number of regions for which the diffraction efficiency is calculated
- m: index of the region for which the diffraction efficiency is calculated
- $\eta_{mj}$: diffraction efficiency for the j-th order diffraction light of the m-th region (stored in the first memory)
- $W_m$: weight for the m-th region (stored in the second memory means).

Thus, the diffraction efficiency of the diffraction lens can be calculated easily.

29 Claims, 50 Drawing Sheets

U.S. PATENT DOCUMENTS

| | | | | |
|---|---|---|---|---|
| 5,218,471 A | * | 6/1993 | Swanson et al. | 359/565 |
| 5,543,966 A | | 8/1996 | Meyers | |
| 5,581,405 A | | 12/1996 | Meyers et al. | |
| 5,629,799 A | | 5/1997 | Maruyama et al. | |
| 5,648,655 A | * | 7/1997 | Rostoker | |
| 6,024,283 A | * | 2/2000 | Campanelli et al. | 235/462.32 |

OTHER PUBLICATIONS

"Diffractive grating", Academic Press; Chapter 2; 1982, pp. 13–15.

Sweatt, William C. "Describing holographic optical elements as lenses", J. Opt. Soc. Am.; vol. 67, No. 6; Jun. 1997; pp. 803–808.

Rossi, M. et al: "Refractive and diffractive properties of planar micro–optical elements", vol. 34, No. 26; Sep. 10, 1995, pp. 5996–6007, XP000523025.

Yamagata, M. et al.: Efficiency simulation for diamond–turned diffractive lenses 1997 $6^{th}$ Microoptics Conference and $14^{th}$ Topical Meeting on Gradient Index Optical Systems; vol. 37, No. 6B, pp. 3695–3700, XP002112601.

Yin Gonjie et al.: "Diffractive efficiency of diffreactive lenses and its effect on MTF", Jiguang Jishu; Jiguang Jushu, Chengdu, CHINA, vol. 21, No. 6, 1997, pp. 369–371, XP002112602.

* cited by examiner (a)

(b)

(c)

(d)

(e)

DEVICE FOR CALCULATING DIFFRACTION EFFICIENCIES OF A DIFFRACTION LENS, LENS WITH GRATING ELEMENT, AND OPTICAL SYSTEM FOR READING

FIELD OF THE INVENTION

First Invention

The first invention relates to a diffraction lens (also referred to as "lens with grating element" or "lens with diffraction element" in the following), in particular to a calculation (simulation) technique for calculating a diffraction efficiency of a diffraction lens that is cut with a diamond bit or molded using a die that is cut with a diamond bit, and a design technique for designing achromatic lenses.

Furthermore, the first invention relates to a lens with a grating element, particularly to a small size imaging apparatus such as a board camera or a monitoring camera etc. and a reading apparatus such as a bar code reader etc.

Second Invention

The second invention relates to an optical system for reading in which chromatic aberration is excellently corrected, and to an image reading apparatus and a bar code reader using the same.

BACKGROUND OF THE INVENTION

First Invention

In an optical system for imaging or an optical system for reading, imaging performance is of great importance. As factors that influence the imaging performance, there are those inside the optical system such as aberration of lenses, diffraction and dust, and those outside the optical system such as environmental conditions. Particularly, chromatic aberration due to different refractive indices of a lens at different wavelengths is one cause of deteriorating imaging performance.

Accordingly, conventional techniques try to reduce the chromatic aberration by combining several lenses having different Abbe numbers, and among other technologies, it is known that an anomalous dispersion glass may be used as an achromatic lens system.

Also, recently, as another technology for reducing chromatic aberration, a lens with diffraction element where a relief for providing diffractive effect is formed on a surface of the lens to correct chromatic aberration has been proposed. For example, in Publication of Unexamined Japanese Patent Application (Tokuhyo) No. Hei 8-508116, it is proposed to correct chromatic aberration in the entire visible spectrum by a single lens with diffraction element.

Recently, a large number of achromatic lenses and dual-focus lenses have been proposed where lens functionality is enhanced with diffraction lenses (see e.g. Publication of Unexamined Japanese Patent Application No. Hei 8-171052 and Japanese Patent Application No. Hei 8-290080). Most of these diffraction lenses are so-called relief-type diffraction lenses having a periodic relief on a surface of a lens or flat plate of, for example, glass.

There are basically two methods for forming a relief-type diffraction lens. One method is to cut the lens with a diamond bit. In this case, a saw-tooth-shaped relief (relief profile) can be cut. The other method involves photolithography and approximates this saw-tooth-shaped relief with a step relief. This is also called "binary method".

Diffraction efficiencies are important parameters for the utilization and the design of diffraction lenses.

It is widely known, that according to Swanson et al (G. J. Swanson and Wilfrid B. Veldkamp, "Diffractive optical elements for use in infrared systems", Optical Engineering, Vol. 28, No. 6, (1989)), the relation between the number of masks used during manufacturing and the diffraction efficiency can be calculated for the binary method.

The retardation of the wave front passing a periodic relief-type diffraction grating with a grating ring interval (pitch) that is sufficiently longer than the wavelength and a phase shift of about one wavelength can be calculated from the refractive index of the grating material on the basis of its cross-section. It is widely known (see e.g. M. C. Hutley, "Diffraction Grating", Academic Press, Chap. 2, 1982) that when the retardation is Fourier-transformed, the diffraction efficiency of the diffraction grating can then be obtained as the Fourier coefficients (scalar diffraction theory).

FIG. 49(a) outlines how a die for the diffraction lens is cut with a diamond bit. A die 1901, which rotates in the arrow direction, is cut by a diamond bit 1902. The diamond bit has a pointed tip, which is suitable for cutting diffraction lenses or dies for diffraction lenses.

FIG. 49(b) is a magnification of FIG. 49(a) showing a cutting region A. The tip 1903 of the diamond bit describes a circular arc with a certain curvature radius (nose radius) 1904. Even when the designed shape is a saw-tooth shape as indicated by the chain double-dashed line 1905, the dent left by the diamond bit is a circular arc 1906 that has almost the same radius as the curvature radius of its tip.

FIG. 50 shows cross-sections outlining how a diffraction lens and a die are cut. For the sake of simplicity, the diffraction lens is formed on a planar substrate.

When the designed shape of the lens is as shown in FIG. 50(a), the designed shape of the die for manufacturing the lens is as shown in FIG. 50(b). However, when the die is cut with a diamond bit 2001 whose tip is a circular arch with a certain curvature radius, the convex angular portions in the cross-section of the die will be rounded out, as shown in FIG. 50(c). As a result, lenses that are formed with that die have a relief profile as shown in FIG. 50(d).

FIG. 50(e) is a magnification of the cross-section shown in FIG. 50(c), showing the microscopic features of the cutting region A after the cutting. Depending on the feed speed and the curvature radius of the cutting bit, cutting traces 2002 amounting to a tiny undulation remain on the cut surface. These cutting traces are transferred to the lens surface.

Since the diffraction efficiency of the diffraction lens is influenced by the relief profile, it may turn out to be quite different from the designed value, if the relief profile degenerates like this during the manufacturing step.

As mentioned above, the cutting bit can have a pointed tip to avoid a change of the diffraction efficiency, but then, many technically difficult problems arise. For example, the necessary cutting distance becomes long, the degeneration due to abrasion of the cutting bit becomes large, and the cutting bit chips more easily. As a result, the productivity becomes considerably worse.

If the relationship between the curvature radius of the cutting bit and the diffraction efficiency of the obtained diffraction lens were known, it could be decided before the cutting process which cutting bit should be chosen to keep the decrease in diffraction efficiency during the manufacturing process in a tolerable range, and the used bit would not have to be sharper than necessary, which would be very useful for the production efficiency.

If, at the design stage, the diffraction efficiency of the lens could be calculated with consideration to the processing method, then the processing method could be taken into account as one of the lens design parameters and lenses that are easier to manufacture could be designed. Consequently, there is a need for an easy calculation method for calculating, at the design stage, the finally attained diffraction efficiency with consideration to the processing method.

A typical example of an application for a diffraction lens is the use as an achromatic lens to correct the chromatic aberration of a refractive lens with the chromatic aberration of the diffraction lens. Such lenses are known, for example from Publications of Unexamined Japanese Patent Publication No. Hei 6-242373 and No. Hei 8-171052. In the lenses disclosed in both of these publications, the number of grating rings is large, so that it is difficult to cut a die for the lens using, for example, a diamond bit. Moreover, the diffraction efficiency can decrease due to deterioration of the shape because of the curvature at the vertex of the cutting bit. In the above publications, these problems were not addressed by the design considerations, so that it was difficult to ensure both diffraction efficiency and productivity.

Furthermore, in the above-mentioned conventional technologies, the pitches of the relief rings that form a grating element gradually decrease with increasing distance from the optical axis. Thus, the pitch becomes very small at the peripheral portion, so that problems such as decreased diffraction efficiency or processing difficulties may result.

Also, if lateral chromatic aberration (magnification chromatic aberration) of a wide-angle lens having a half field angle of at least 60° is to be corrected with a single grating element surface, the focal length of the grating element must be short. However, in such a condition, longitudinal chromatic aberration (axial chromatic aberration) is excessively corrected, so that good imaging performance cannot be obtained. Furthermore, because the number of the relief rings also increases, problems such as decrease in diffraction efficiency or difficulty in processing may be caused.

Second Invention

Various optical systems for reading that form images from image information, or manuscript or code information etc. on an image sensor such as a charge-coupled device (CCD) have been proposed. It is required that such optical systems for reading should have modulation transfer function (MTF) that is high enough to project a manuscript on a CCD line sensor having high density, so that satisfactory correction of various aberrations is needed.

Conventionally, particularly in order to correct chromatic aberration as a cause of deterioration in imaging performance, combinations of multiple lenses with different Abbe numbers have been used. For example, in Publication of Unexamined Japanese Patent Application (Tokukai) No. Hei 5-119255, a technology that intends to correct chromatic aberration by forming an optical system for reading using three lenses in three groups, and also to enable low-cost production by using plastic materials as a lens material is disclosed. Furthermore, in Publication of Unexamined Japanese Patent Application (Tokukai) No. Hei 5-135193, a bar code reader, in which the optical system for reading is formed by using a single aspheric lens, is disclosed.

However, in the optical system for reading as disclosed in the above-mentioned Publication of Unexamined Japanese Patent Application (Tokukai) No. Hei 5-119255, due to the need for multiple lenses, low-cost production is limited in view of processing and assembly of the lenses. Furthermore, although it is intended to achieve low-cost production by using plastic materials for the lens materials, because types of plastic materials are limited, correction of chromatic aberration is also restricted. Also, in the bar code reader disclosed in the above-mentioned Publication of Unexamined Japanese Patent Application (Tokukai) No. Hei 5-135193, because chromatic aberration cannot be corrected and a single wavelength is required, a light source such as an LED is needed, thus limiting miniaturization and low-cost production.

SUMMARY OF THE INVENTION

To solve the above problems, it is an object of the first present invention to provide a simple method for calculating the diffraction efficiency of a lens molded with a die that was cut with a diamond bit.

It is another object of the first present invention to provide a combined refraction/diffraction lens that can be cut with high productivity using a diamond bit and which provides sufficient achromatism.

Furthermore, an object of the first invention is to solve the above-mentioned problems, and to provide a lens with a diffraction element that can be processed easily while utilizing the characteristics of conventional lenses with diffraction elements by devising the pitches of the relief rings which provide diffractive effect.

An object of the second invention is to solve the above-mentioned problems in conventional technologies, and provide an optical system for reading in which chromatic aberration is corrected without increasing the number of lens components and by which good imaging performance can be attained, and an image reading apparatus and a bar code reader using the same, by providing a surface of the lens with diffractive effect.

First Invention

In accordance with a first configuration of the present invention, a device for calculating diffraction efficiencies of a diffraction lens divided into a plurality of regions, each region comprising at least one grating ring, comprises:

a first memory for storing information about diffraction efficiencies of the regions;

a second memory for storing information about weights corresponding to the regions;

a first processor for retrieving information from the first and the second memory, and calculating diffraction efficiencies of the entire diffraction lens in accordance with the formula $$E_j = \sum_{m=1}^{M} W_m \eta_{mj} \qquad (1)$$

wherein:

j: integer indicating the order of diffraction light $E_j$: diffraction efficiency for j-th order diffraction light of the diffraction lens M: positive integer (M>1) indicating the number of regions for which the diffraction efficiency is calculated m: index of the region for which the diffraction efficiency is calculated $\eta_{mj}$: diffraction efficiency for the j-th order diffraction light of the m-th region (stored in the first memory)

$W_m$: weight for the m-th region (stored in the second memory means).

In accordance with the first configuration of the present invention, a method for calculating diffraction efficiencies of a diffraction lens divided into a plurality of regions, each region comprising at least one grating ring, comprises:

a first memory step of storing information about diffraction efficiencies of the regions;

a second memory step of storing information about weights corresponding to the regions;

a first processing step of retrieving information stored in the first and the second memory step, and calculating diffraction efficiencies of the entire diffraction lens in accordance with the formula $$E_j = \sum_{m=1}^{M} W_m \eta_{mj} \quad (1)$$

wherein:

j: integer indicating the order of diffraction light $E_j$: diffraction efficiency for j-th order diffraction light of the diffraction lens M: positive integer (M>1) indicating the number of regions for which the diffraction efficiency is calculated m : index of the region for which the diffraction efficiency is calculated $\eta m_j$: diffraction efficiency for the j-th order diffraction light of the m-th region (stored in the first memory step)

$W_m$: weight for the m-th region (stored in the second memory step).

In accordance with the first configuration of the present invention, a computer-readable recording medium stores a computer-executable program for calculating diffraction efficiencies of a diffraction lens divided into a plurality of regions, each region comprising at least one grating ring, which program executes:

a first memory step of storing information about diffraction efficiencies of the regions;

a second memory step of storing information about weights corresponding to the regions; and a first processing step of retrieving information stored in the first and the second memory step, and calculating diffraction efficiencies of the entire diffraction lens in accordance with the formula $$E_j = \sum_{m=1}^{M} W_m \eta_{mj} \quad (1)$$

wherein:

j: integer indicating the order of diffraction light $E_j$: diffraction efficiency for j-th order diffraction light of the diffraction lens M: positive integer (M>1) indicating the number of regions for which the diffraction efficiency is calculated m: index of the region for which the diffraction efficiency is calculated $\eta_{mj}$: diffraction efficiency for the j-th order diffraction light of the m-th region (stored in the first memory step)

$W_m$: weight for the m-th region (stored in the second memory step).

In accordance with this first configuration of the present invention, the diffraction lens is divided into a plurality of regions, and a weight is assigned to each region to determine the diffraction efficiency of the entire lens, so that the diffraction efficiency of the entire lens can be calculated precisely and efficiently, even when the regions have different diffraction efficiencies. It is preferable that the calculation of diffraction efficiencies according to the present invention is performed on a computer.

In accordance with a second configuration of the present invention, a device for calculating diffraction efficiencies of a diffraction lens divided into a plurality of regions, each region comprising at least one grating ring, the diffraction efficiencies corresponding to a plurality of wavelengths, comprises:

a first memory for storing information about diffraction efficiencies of the regions at the plurality of wavelengths;

a second memory for storing information about weights corresponding to the regions;

a third memory for storing information about a relief cross-section shape of the diffraction lens;

a fourth memory for storing information about the plurality of wavelengths;

a fifth memory for storing information about refractive indices of a material of the diffraction lens at the wavelengths;

a fourth processor for calculating a relief cross-section shape of the diffraction lens stored in the third memory;

a second processor for retrieving information from the third, fourth and fifth memory, and calculating therefrom diffraction efficiencies of the regions at the plurality of wavelengths stored in the first memory;

a third repeating means for operating the second processor for a number of times that is equal to the number of the wavelengths;

a fourth repeating means for operating the third repeating means for a number of times that is equal to the number of the regions; and a first processor for retrieving information from the first and the second memory, and calculating diffraction efficiencies of the entire diffraction lens using the formula $$E_{jl} = \sum_{m=1}^{M} W_m \eta_{mjl} \quad (5)$$

wherein:

j: integer indicating the order of diffraction light l: index of the wavelengths $E_{jl}$: diffraction efficiency for j-th order diffraction light of the diffraction lens at the l-th wavelength M: positive integer (M>1) indicating the number of regions for which the diffraction efficiency is calculated m: index of the region for which the diffraction efficiency is calculated $W_m$: weight for the m-th region $\eta_{mjl}$: diffraction efficiency for the j-th order diffraction light of the m-th region at the l-th wavelength In accordance with the second configuration of the present invention, a method for calculating diffraction efficiencies of a diffraction lens divided into a plurality of regions, each region comprising at least one grating ring, the diffraction efficiencies corresponding to a plurality of wavelengths, comprises:

a first memory step of storing information about diffraction efficiencies of the regions at the plurality of wavelengths;

a second memory step of storing information about weights corresponding to the regions;

a third memory step of storing information about a relief cross-section shape of the diffraction lens;

a fourth memory step of storing information about the plurality of wavelengths;

a fifth memory step of storing information about refractive indices of a material of the diffraction lens at the wavelengths;

a fourth processing step of calculating a relief cross-section shape of the diffraction lens stored in the third memory step;

a second processing step of retrieving information stored in the third, fourth and fifth memory step, and calculating therefrom diffraction efficiencies of the regions at the plurality of wavelengths stored in the first memory step;

a third repeating step of repeating the second processing step for a number of times that is equal to the number of the wavelengths;

a fourth repeating step of repeating the third repeating step for a number of times that is equal to the number of the regions; and a first processing step of retrieving information stored in the first and the second memory step, and calculating diffraction efficiencies of the entire diffraction lens using the formula $$E_{jl} = \sum_{m=1}^{M} W_m \eta_{mjl} \tag{5}$$

wherein:
j: integer indicating the order of diffraction light
l: index of the wavelengths
$E_{jl}$: diffraction efficiency for j-th order diffraction light of the diffraction lens at the l-th wavelength
M: positive integer (M>1) indicating the number of regions for which the diffraction efficiency is calculated
m: index of the region for which the diffraction efficiency is calculated
$W_m$: weight for the m-th region
$\eta_{mjl}$: diffraction efficiency for the j-th order diffraction light of the m-th region at the l-th wavelength.

In accordance with the second configuration of the present invention, a computer-readable recording medium stores a computer-executable program for calculating diffraction efficiencies of a diffraction lens divided into a plurality of regions, each region comprising at least one grating ring, the diffraction efficiencies corresponding to a plurality of wavelengths, wherein the program executes:

a first memory step of storing information about diffraction efficiencies of the regions at the plurality of wavelengths;

a second memory step of storing information about weights corresponding to the regions;

a third memory step of storing information about a relief cross-section shape of the diffraction lens;

a fourth memory step of storing information about the plurality of wavelengths;

a fifth memory step of storing information about refractive indices of a material of the diffraction lens at the wavelengths;

a fourth processing step of calculating a relief cross-section shape of the diffraction lens stored in the third memory step;

a second processing step of retrieving information stored in the third, fourth and fifth memory step, and calculating therefrom diffraction efficiencies of the regions at the plurality of wavelengths stored in the first memory step;

a third repeating step of repeating the second processing step for a number of times that is equal to the number of the wavelengths;

a fourth repeating step of repeating the third repeating step for a number of times that is equal to the number of the regions; and a first processing step of retrieving information stored in the first and the second memory step, and calculating diffraction efficiencies of the entire diffraction lens using the formula $$E_{jl} = \sum_{m=1}^{M} W_m \eta_{mjl} \tag{5}$$

wherein:
j: integer indicating the order of diffraction light
l: index of the wavelengths
$E_{jl}$: diffraction efficiency for j-th order diffraction light of the diffraction lens at the l-th wavelength
M: positive integer (M>1) indicating the number of regions for which the diffraction efficiency is calculated
m: index of the region for which the diffraction efficiency is calculated
$W_m$: weight for the m-th region
$\eta_{mjl}$: diffraction efficiency for the j-th order diffraction light of the m-th region at the l-th wavelength.

In accordance with this second configuration of the present invention, the diffraction efficiencies at a plurality of wavelengths can be calculated with comparatively little memory and high speed.

According to the present invention, a lens-shape measurement apparatus for measuring the surface shape of a measurement object selected from the group consisting of a diffraction lens and a die for a diffraction lens comprises:

a shape measuring means for measuring the surface shape of the measurement object;

a processor device for substantially eliminating at least one of the macroscopic components selected from the group consisting of a spherical surface, an aspherical surface, and a plane from measurement data obtained with the shape measuring means; and a device for calculating diffraction efficiencies of the diffraction lens based on the measured data from which the macroscopic component has been substantially eliminated;

wherein the device for calculating diffraction efficiencies is a device according to the first configuration of the present invention.

According to the present invention, a method for calculating diffraction efficiencies of a diffraction lens by measuring the surface shape of a measurement object selected from the group consisting of a diffraction lens and a die for a diffraction lens, comprises:

a shape measuring step of measuring the surface shape of the measurement object;

a processing step of substantially eliminating at least one of the macroscopic components selected from the group consisting of a spherical surface, an aspherical surface, and a plane from measurement data obtained in the shape measuring step; and a step of calculating diffraction efficiencies of the diffraction lens based on the measured data from which the macroscopic component has been substantially eliminated;

wherein the step of calculating diffraction efficiencies is a method according to the first configuration of the present invention.

According to the present invention, a computer-readable recording medium stores a computer-executable program for calculating diffraction efficiencies of a diffraction lens by measuring the surface shape of a measurement object selected from the group consisting of a diffraction lens and a die for a diffraction lens, wherein the program executes:

a shape measuring step of measuring the surface shape of the measurement object;

a processing step of substantially eliminating at least one of the macroscopic components selected from the group consisting of a spherical surface, an aspherical surface, and a plane from measurement data obtained in the shape measuring step; and a step of calculating diffraction efficiencies of the diffraction lens based on the measured data from which the macroscopic component has been substantially eliminated;

wherein the program for executing the step of calculating diffraction efficiencies is a program stored in a recording medium according to the first configuration of the present invention.

In accordance with this configuration, the diffraction efficiencies of diffraction lenses can be obtained by measuring relief profiles of actually obtained diffraction lenses or dies for molding diffraction lenses, so that it can be determined to what extent the precision of the obtained lens or the obtained die for molding lenses influences the diffraction efficiency. Thus, useful validation data for quality control such as precision tolerances or discrimination of faulty articles can be obtained. Moreover, by comparing diffraction efficiencies calculated from the actually obtained relief profile to diffraction efficiencies as determined from the design of a relief profile, the relation between the processing conditions for manufacturing a diffraction lens and the diffraction efficiency of the obtained lens can be determined. Consequently, this relation can be considered in the lens design, so that a precise prediction of the diffraction efficiency of the finally obtained diffraction lens and the selection of optimum manufacturing conditions become possible.

According to the present invention, an apparatus for designing diffraction lenses comprises:

an input for entering lens design data; and a processor for calculating optical properties and diffraction efficiencies of the diffraction lens obtained on the basis of the design data;

wherein the processor for calculating the diffraction efficiencies is a device for calculating diffraction efficiencies according to the first configuration of the present invention.

According to the present invention, a method for designing diffraction lenses, comprises:

an input step of entering lens design data;

a processing step of calculating optical properties and diffraction efficiencies of the diffraction lens obtained on the basis of the design data;

an optimization step of optimizing the lens properties based on the result of the processing step;

wherein the processing step of calculating the diffraction efficiencies is a method for calculating diffraction efficiencies according to the first configuration of the present invention.

According to the present invention, a computer-readable recording medium stores a computer-executable program for designing a diffraction lens, and executing on a computer an evaluation function for evaluating lens properties; wherein the recording medium is in accordance with the first configuration of the present invention.

In accordance with this configuration, the optical properties and diffraction efficiencies of diffraction lenses obtained on the basis of design data can be predicted precisely, so that the lenses can be designed in consideration of restrictions due to both correction of chromatic aberration and tolerances of the diffraction efficiencies. Consequently, diffraction lenses with excellent characteristics can be designed in a short time and with high efficiency. Moreover, taking the conditions for the lens manufacturing process (for example the curvature radius of the tip of the cutting bit or the feed speed of the cutting bit) and their relation to the diffraction efficiency of the resulting lens into account, optimum manufacturing conditions can be determined at the time of lens design.

In accordance with the present invention, a combined refraction/diffraction lens comprises a refraction lens; and a diffraction lens comprising a plurality of concentric grating rings formed on at least one surface of the refraction lens; and satisfies the formula $$k = f\left(\frac{1}{f_g} + \frac{v_g}{f_d v_d}\right), \quad (6)$$

wherein:

f: total focal length of the combined refraction/diffraction lens $f_d$: focal length of the diffraction lens $f_g$: focal length of the refraction lens $v_d$: partial dispersion coefficient at an applied wavelength region of the diffraction lens $v_g$: partial dispersion coefficient at an applied wavelength region of the refraction lens wherein k satisfies $0.1 \leq k$.

In accordance with this configuration, combined refraction/diffraction lenses and dies for molding combined refraction/diffraction lenses, which are cut with a diamond bit, can be manufactured with high productivity.

In accordance with the present invention, a combined refraction/diffraction objective lens for use in an optical information recording/reproducing device comprises:

a single lens having an ingoing surface and an outgoing surface; and a diffraction lens comprising a plurality of concentric grating rings formed on at least one surface of the single lens;
and satisfies the formula $$k = f\left(\frac{1}{f_g} + \frac{v_g}{f_d v_d}\right), \quad (6)$$

wherein:
f: total focal length of the combined refraction/diffraction lens
$f_d$: focal length of the diffraction lens
$f_g$: focal length of the refraction lens
$v_d$: partial dispersion coefficient at an applied wavelength region of the diffraction lens
$v_g$: partial dispersion coefficient at an applied wavelength region of the refraction lens
$v_g$: partial dispersion coefficient at an applied wavelength region of the refraction lens
wherein k satisfies $0.2 \leq k \leq 0.6$.

In accordance with this configuration, combined refraction/diffraction objective lenses and dies for molding combined refraction/diffraction objective lenses, which are cut with a diamond bit, can be manufactured with good chromatic aberration correction and high productivity. Consequently, an optical head including an objective lens according to the present invention can attain excellent signal output, because the focal length of the objective lens varies only little when the wavelength of the light source varies, and stray light can be reduced. Moreover, the optical heads comprising a single objective lens with such properties can be devised significantly smaller.

According to the present invention, a combined refraction/diffraction imaging lens comprises:
a single lens having an ingoing surface and an outgoing surface; and
a diffraction lens comprising a plurality of concentric grating rings formed on at least one surface of the single lens;
satisfying the formula $$k = f\left(\frac{1}{f_g} + \frac{v_g}{f_d v_d}\right), \quad (6)$$

wherein:
f: total focal length of the combined refraction/diffraction lens
$f_d$: focal length of the diffraction lens
$f_g$: focal length of the refraction lens
$v_d$: partial dispersion coefficient at an applied wavelength region of the diffraction lens
$v_g$: partial dispersion coefficient at an applied wavelength region of the refraction lens
$v_g$: partial dispersion coefficient at an applied wavelength region of the refraction lens
wherein k satisfies $0.3 \leq k$.

In accordance with this configuration, imaging lenses and dies for molding imaging lenses, which are cut with a diamond bit, can be manufactured with high productivity. Moreover, if $0.4 \leq k \leq 0.7$, then processability is excellent, and an imaging lens with good resolution can be obtained. Consequently, an image pickup device comprising an imaging lens according to the present invention can attain a picture with little flare and excellent elimination of achromatic aberration.

Furthermore, in order to attain the above-mentioned objects, a lens with a grating element in accordance with the first configuration of the present invention is characterized by that, in the lens with a grating element in which chromatic aberration is corrected by forming concentric relief rings on a surface of the lens to provide diffractive effect, the pitch $P_m$ of the relief rings satisfies the formula $$P_m > \sqrt{\frac{\lambda_1 \cdot f_d}{2m}}, \quad (7)$$

where m is the ring number counted from the center of the lens, $f_d$ is the focal length of the grating element, and $\lambda_1$ is the principal wavelength of the grating element.

By satisfying Formula (7), a grating element surface can easily be produced. In addition, decrease in diffraction efficiency can be prevented, so that influence of unnecessary scattered light being projected on an image surface to decrease the imaging performance can be inhibited.

A lens with a grating element in accordance with the second configuration of the present invention is characterized by that, in the lens with a grating element in which chromatic aberration is corrected by forming concentric relief rings on a surface of the lens to provide diffractive effect, the itches of the relief rings gradually decrease to a certain position away from the optical axis, and gradually increase further away from the position.

By using such a configuration, the grating element surface can easily be produced, while function of excellent correction of chromatic aberration is maintained. Furthermore, decrease in diffraction efficiency can be prevented, so that influence of unnecessary scattered light being projected on an image surface to decrease the imaging performance can be inhibited.

A lens with a grating element in accordance with the third configuration of the present invention is characterized by that, in the lens with a grating element in which chromatic aberration is corrected by forming concentric relief rings on a surface of the lens to provide diffractive effect, the following Formula (8) is satisfied:

$$0.2 < \left|\frac{d}{r}\right| < 0.7 \quad (8)$$

where r is the effective radius of the grating element surface, and d is the distance of the innermost ring of the relief from the optical axis.

By using such a configuration, a lens shape particularly useful for correcting lateral chromatic aberration can be obtained, and excessive correction of longitudinal chromatic aberration can also be inhibited.

Furthermore, in the lens with a grating element in accordance with the first to third configurations of the present invention, it is preferable that the grating element surface has a kinoform profile. Furthermore, it is preferable that the lens is made of glass or of plastic. By using such a structure, a lens with a grating element having a kinoform profile with excellent transcription performance can be achieved.

Furthermore, it is preferable that the lens with a grating element in accordance with the first to third configurations of the present invention is formed from an infrared absorbing material. By using such a material, influence of unnecessary light in the infrared spectrum generated by the grating element surface being projected on an image pickup device to decrease the imaging performance can be inhibited, so that good imaging performance can be maintained.

Furthermore, in forming an imaging apparatus, it is preferable that the imaging apparatus comprises a lens with a grating element in accordance with the first to third configurations of the present invention, an image pickup device and a signal processing circuit. By using such a structure, a small type imaging apparatus with very excellent imaging performance can be obtained.

Furthermore, in forming a reading apparatus, it is preferable that the reading apparatus comprises a lens having grating element in accordance with the first to third configurations of the present invention, an image sensor and a signal processing circuit. By using such a structure, a small type reading apparatus with very excellent imaging performance can be obtained.

Second Invention

In order to attain the above-mentioned objects, the present invention provides an optical system for reading image information or code information, which comprises a lens in which a grating element surface is formed on at least one surface of the lens. According to this structure, an optical system for reading with corrected chromatic aberration and having good imaging performance can be achieved.

Furthermore, it is preferable that the optical system for reading in accordance with the present invention can be moved on the optical axis by a driving device. According to this preferable example, manuscripts having different sizes can be read, and also an optical system for reading with corrected chromatic aberration and good imaging performance can be achieved.

Furthermore, in this preferable structure, it is preferable to satisfy $$0.6 < Y_t/Y_W < 1 \qquad (14)$$

where $Y_W$ is the maximum height of a manuscript when the optical system for reading is moved closest to the object side, and $Y_t$ is the maximum height of a manuscript when the optical system for reading is moved closest to the image side.

According to this preferable example, a small size optical system for reading having good imaging performance can be achieved.

Furthermore, in the optical system for reading in accordance with the present invention, it is preferable that the lens that constitutes the optical system for reading is only a single lens in which the grating element surface is formed, the image side surface of the lens being a convex surface and having a positive refractive power, and a diaphragm being placed on the object side from the lens. According to this preferable example, a low-priced optical system for reading with good imaging performance, in which chromatic aberration is corrected without increasing the number of the lens components, can be achieved.

Furthermore, in this preferable structure, it is preferable to satisfy $$0.05 < |r_2/r_1| < 0.5, \qquad (9)$$

$$9 < f/D < 16, \qquad (10)$$

and $$0.05 < |f/f_d| < 0.15 \qquad (11)$$

where $r_1$ is the radius of curvature at the vertex of the object side surface of the lens, $r_2$ is the radius of curvature at the vertex of the image side surface of the lens, D is the diameter of the diaphragm, f is the focal length of the entire optical system, and $f_d$ is the focal length of the grating element surface of the lens.

According to this preferable example, the following effects can be obtained. First, by satisfying Formula (9) above, an optimal lens shape in balance of various aberrations can be obtained. Then, by satisfying Formula (10) above, sufficient depth of field to prevent loss of image information or erroneous recognition of code information due to vibration etc. can be obtained. Then, by satisfying Formula (11) above, chromatic aberration can be excellently corrected.

In this case, it is further preferable that at least one surface of the lens is an aspheric surface with a local radius of curvature that becomes smaller with increasing distance from the optical axis. According to this preferable example, distortion aberration and curvature of field can be corrected effectively.

Furthermore, in the optical system for reading in accordance with the present invention, it is preferable to satisfy $$450 \text{ nm} < \lambda_1 < 600 \text{ nm} \qquad (12)$$

where $\lambda_1$ is the principal wavelength when the grating element surface is formed.

According to this preferable example, unnecessary scattered light generated by the grating element surface can be prevented from being projected on an image sensor and decreasing the image performance.

Also, in this case, it is preferable that the grating element surface has a kinoform profile.

Furthermore, in the optical system for reading in accordance with the present invention, it is preferable that the lens having the grating element surface is made of glass or of plastic. According to this preferable example, a grating element surface having a kinoform profile with excellent transcription performance can be achieved.

In an optical system for reading in accordance with the present invention, it is preferable that the lens having the grating element surface is formed from an infrared absorbing material. According to this preferable example, particularly, unnecessary light in the infrared spectrum generated by the grating element surface can be prevented from being projected on an image sensor and decreasing the imaging performance, so that good imaging performance can be ensured.

Furthermore, in the optical system for reading in accordance with the present invention, it is preferable to satisfy $$0.2 < y/Y < 0.6 \qquad (13)$$

where Y is the maximum height of a manuscript and y is the maximum height of an image sensor.

According to this preferable example, miniaturization of the optical system for reading can be achieved.

Also, in this case, it is preferable that the meridional image surface has a better imaging performance than the sagittal image surface. According to this preferable example, precision of reading image information or code information can be enhanced, so that erroneous recognition can be prevented.

Furthermore, an imaging reading apparatus in accordance with the present invention comprises the optical system for reading in accordance with the present invention, an image sensor for converting the image information that is imaged by the optical system for reading into electric signals, and a circuit portion for processing the electric signals to process the image information. According to the structure of this image reading apparatus, the size of the entire image reading apparatus can be smaller than that of a conventional one, and also an image reading apparatus with good imaging performance can also be achieved.

Furthermore, a bar code reader in accordance with the present invention comprises the optical system for reading in accordance with the present invention, an image sensor for converting the bar code information that is imaged by the optical system for reading into electric signals, and a signal processing circuit having a circuit portion for decoding the bar code information. According to the structure of this bar code reader, the size of the entire bar code reader can be smaller than that of a conventional one, and a bar code reader with good imaging performance can also be achieved.

DESCRIPTION OF THE PREFERRED EMBODIMENTS

The invention will be better understood from the following detailed description when considered with reference to the accompanying drawings.

First Invention
First Embodiment

When a diffraction lens is cut with a cutting bit, the extent of deformation due to the cutting bit changes from grating ring to grating ring. The deforming influence of the cutting bit on grating rings with a large grating ring interval (pitch) is relatively small. On the other hand, its influence on grating rings with a short grating interval becomes severe.

The grating ring pitch in a center portion of a diffraction lens is generally large, and becomes smaller towards a peripheral portion of the lens.

Therefore, the diffraction efficiency near the center of the lens differs from the diffraction efficiency near its periphery. The diffraction efficiency of the entire lens can be found by determining the weighted average of the diffraction efficiencies of each lens portions.

EXAMPLE 1

Figure 1:
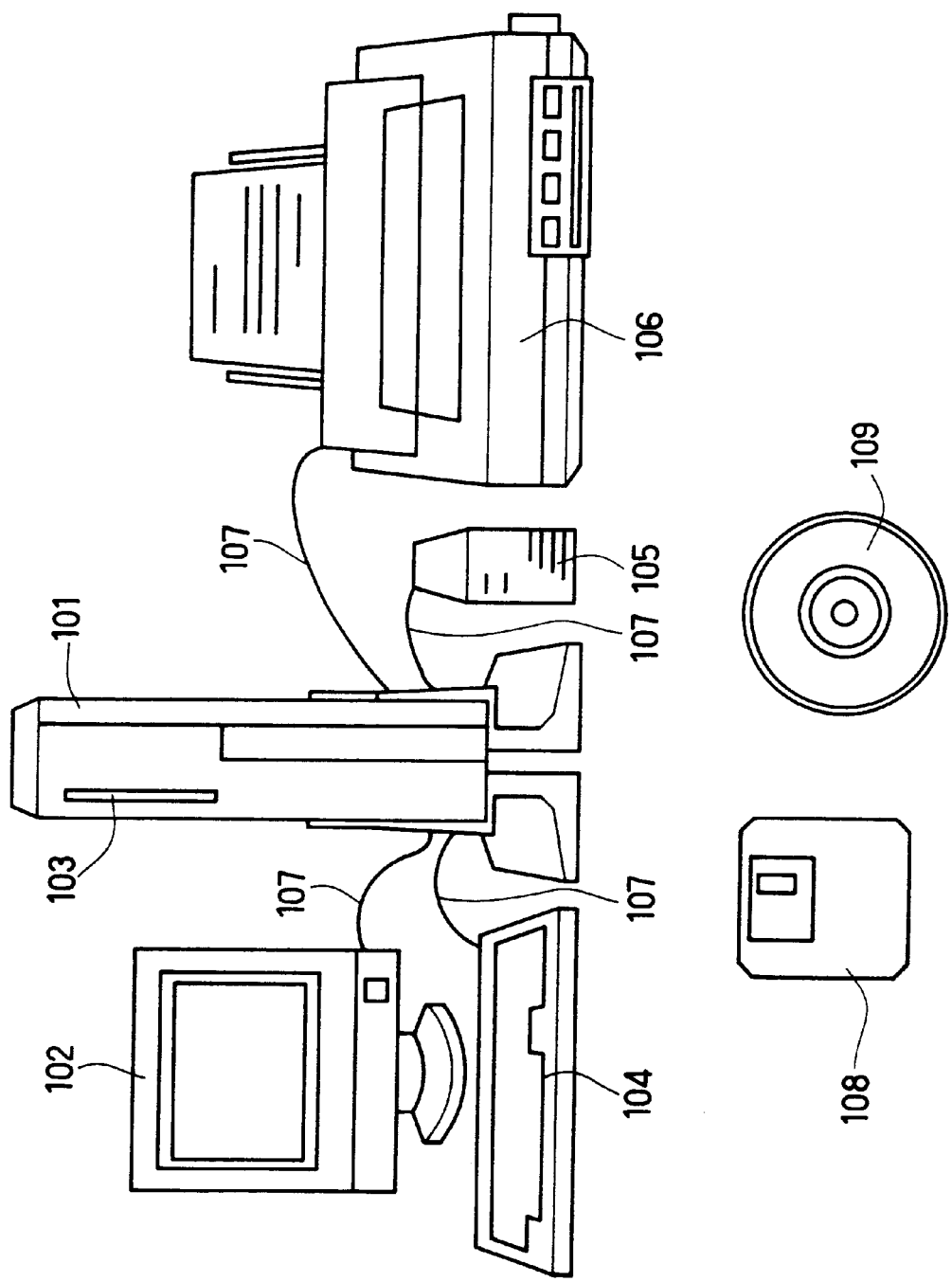
FIG. 1 is a drawing of a device for calculating diffraction efficiencies according to a first embodiment of the present invention.

FIG. 1 is a drawing of a computing device for calculating the diffraction efficiency in a first embodiment of the present invention.

Such a computing device according to this embodiment comprises a main computer 101, a display 102, a floppy-disk drive (FDD) 103, a keyboard 104, a hard-disk drive (HDD) 105 and a printer 106. Each device is connected to the main computer 101 with a connection cable 107. The main computer 101 incorporates a processing unit and a local memory device.

Figure 2:
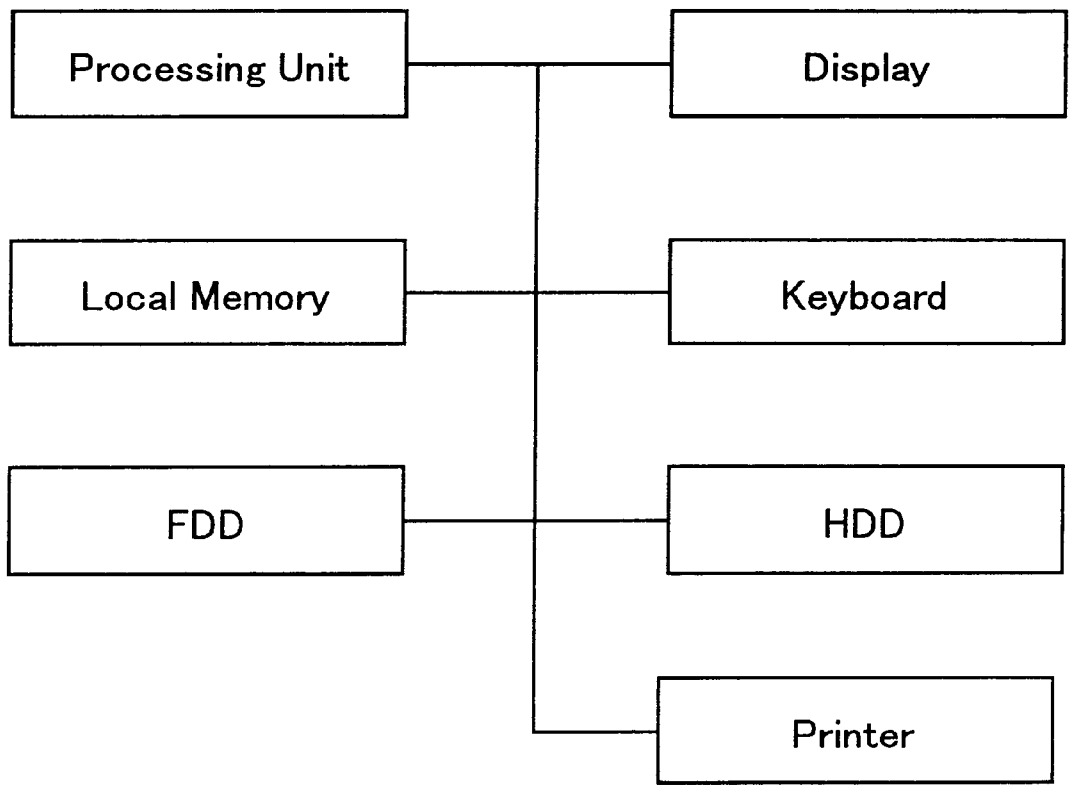
FIG. 2 is a block diagram of the device for calculating diffraction efficiencies according to the first embodiment of the present invention.

FIG. 2 illustrates the structure of such a computing device. Data is entered with the keyboard or read in with the FDD, and stored with the HDD. Data that is necessary for a computation is read from the HDD into the local memory. The processing unit performs the necessary computations and the result is stored in the HDD. The results of the computations are output on the display or the printer.

A computer program for calculating the diffraction efficiency with a computer is stored in the HDD. The processing unit loads the program from the HDD into the local memory, and performs the program. It is also possible to store the program on a floppy disk 108 or an optical disk 109, as shown in FIG. 1.

"Memories" according to the present invention are means for storing information, and refer to information recording media such as floppy disks, hard disks, local memories, optical disks, print-outs from a printer, etc. "Memory step" refers to the process of storing information and applies to recording information on floppy disks, hard disks, local memories, optical disks, etc. and printing information with a printer, etc.

Moreover, "processors" according to the present invention are means for performing a numerical calculation with certain data, and generally refers to the processing unit of a computer. "Processing step" means the process of performing a numerical calculation with certain data.

"Repeating means" according to the present invention are means for repeating the operation of a certain processing unit with a computer program. It is also possible that the operator of the computer sends instructions to repeat a calculating operation to the computer via an input such as the keyboard. "Repeating step" means the repetition of a certain step (procedure).

"To retrieve information from a memory" means, for example, to read data from a floppy disk with the FDD, to read data from a hard disk with the HDD, to read data from an optical disk with an optical disk drive, to read data from the local memory, or to enter data that has been printed out by the operator of the computer via the keyboard.

A "recording medium on which a program is stored" according to the present invention is, for example, a floppy disk, a hard disk, an optical disk, or a print-out from a printer, and refers to any medium for storing software for a computer.

It is possible that due to the advancement of computer technology new means (and steps) in accordance with the above explanations will be developed in the future. However, it is to be understood that the present invention encompasses these newly developed devices and methods, if their function is similar to the function of the means (and steps) of the present invention. The present invention does not depend on a particular device or method, but rather on the functions of these means (and steps). For example, it is possible that an information terminal connected to a network via a network cable is used instead of the recording medium, such as the floppy disk, to send and receive data from this information terminal. However this would correspond to "retrieve information from a memory" in the present invention.

Furthermore, in the following, "devices" comprising certain "means" are explained mainly to avoid duplicate explanations. However, these explanations also refer to "methods" comprising "steps", or to computer-readable "recording media" storing a program for executing "steps" on a computer.

A device according to the present example calculates the weighted average of the diffraction efficiency of a diffraction element that is divided into a plurality of regions, according to the formula $$E_j = \sum_{m=1}^{M} W_m \eta_{mj} \quad (1)$$

wherein $\eta_{mj}$ is the diffraction efficiency of the j-th order diffraction light in the m-th region, and $W_m$ is the weight for the m-th region.

$W_m$ must satisfy the equation $$\sum_{m=1}^{M} W_m = 1 \quad (15)$$

so that Equation (1) corresponds to the weighted average of $\eta_{mj}$.

However, to facilitate the calculation, Equation (15) does not necessarily have to be satisfied.

Figure 3:
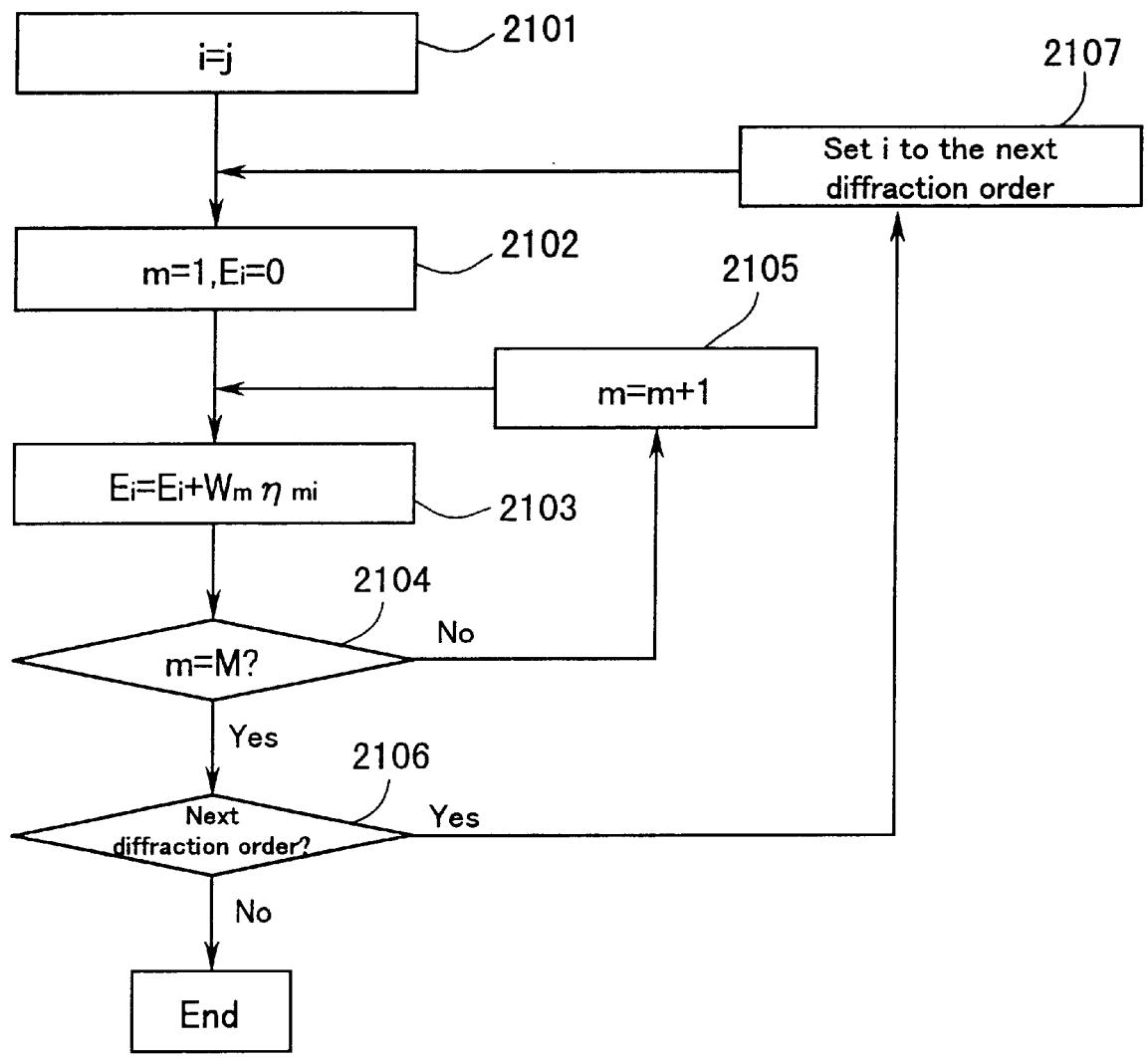
FIG. 3 illustrates an algorithm for the device for calculating diffraction efficiencies according to the first embodiment of the present invention.

FIG. 3 shows an algorithm for calculating the above equation. In the present example, the diffraction lens is divided into M regions.

The diffraction efficiency data and the weights of these M regions have been stored beforehand into the memory.

Figure 4:
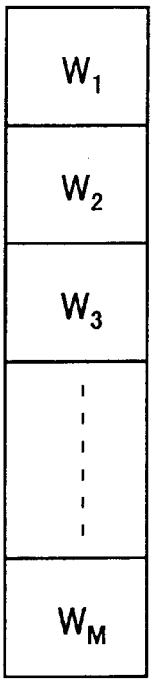
FIG. 4 illustrates a data array for the device for calculating diffraction efficiencies according to the first embodiment of the present invention.

FIG. 4 is an outline of the memory format for the diffraction efficiency data stored in a first memory and the weight data stored in a second memory.

FIG. 4(a) shows the structure of the first memory storing the diffraction efficiency data for calculating the 0th-, -1st- and 1st-order diffraction efficiencies. When the diffraction efficiencies of three orders are calculated, this is a two-dimensional data array with M×3 elements. The data array can be included in a device that can store the data and read necessary data, for example in a memory, such as the main memory of a computer or a floppy disk.

FIG. 4(b) shows the structure of a second memory for similarly storing information about the weight of each region. In this case, there is a data row with M data fields. This second memory can also be realized using any memory device of the computer.

In this specification, "memory" means internal or external storage regions of the main computer for storing such data arrays, data rows, or single data elements, and can be any memory region in a computing device. Below, explanations as to what memory regions are used in each memory are omitted, and the memory is simply referred to as "memory".

Concerning the data arrays, expressions without subscript refer to the entire array, and expressions with subscript refer only to a single element of the array. For example, in the example of FIG. 4, "η" refers to the memory region of (M×3) elements in the computing device, and $\eta_{10}$ refers to a single element therein.

In FIG. 3, the diffraction order for the computation is set in step 2101, which is the first step. In the following step 2102, $E_i$ is initialized to 0 and the counter m for counting the regions is initialized to 1. In the following step 2103, the diffraction efficiency $\eta_{mi}$ of the i-th order diffraction light at the m-th region and the weight $W_m$ for the m-th region are read out from the first and the second memory, and the product of $\eta_{mi}$ and $W_m$ is added to $E_i$. The following step 2104 determines whether the region counter m is equal to M, to decide whether the calculation has been terminated for all regions. If m=M is not true, then there are regions left that have not been calculated, so m is increased by 1 in step 2105, and the procedure returns to step 2103. If in step 2104 m=M is true, the procedure advances to step 2106. The steps 2102 to 2105 correspond to the first processor of the present invention. Step 2106 determines whether a calculation for another diffraction order has to be performed. If a calculation of the diffraction efficiency of another order is necessary, the procedure advances to step 2107, i is set to the next diffraction order, and the procedure is repeated from step 2102. When no calculation for another diffraction order is necessary, the calculation is terminated.

By using the device of this example, the diffraction efficiency of an entire lens having regions with differing diffraction efficiency can be calculated precisely and with high efficiency.

In this example, the calculation is made for a plurality of diffraction orders. However, a calculation for only a single diffraction order is possible by omitting the steps 2101, 2106, and 2107 that are provided for calculating a plurality of diffraction orders from the algorithm shown in FIG. 3.

EXAMPLE 2

Figure 5:
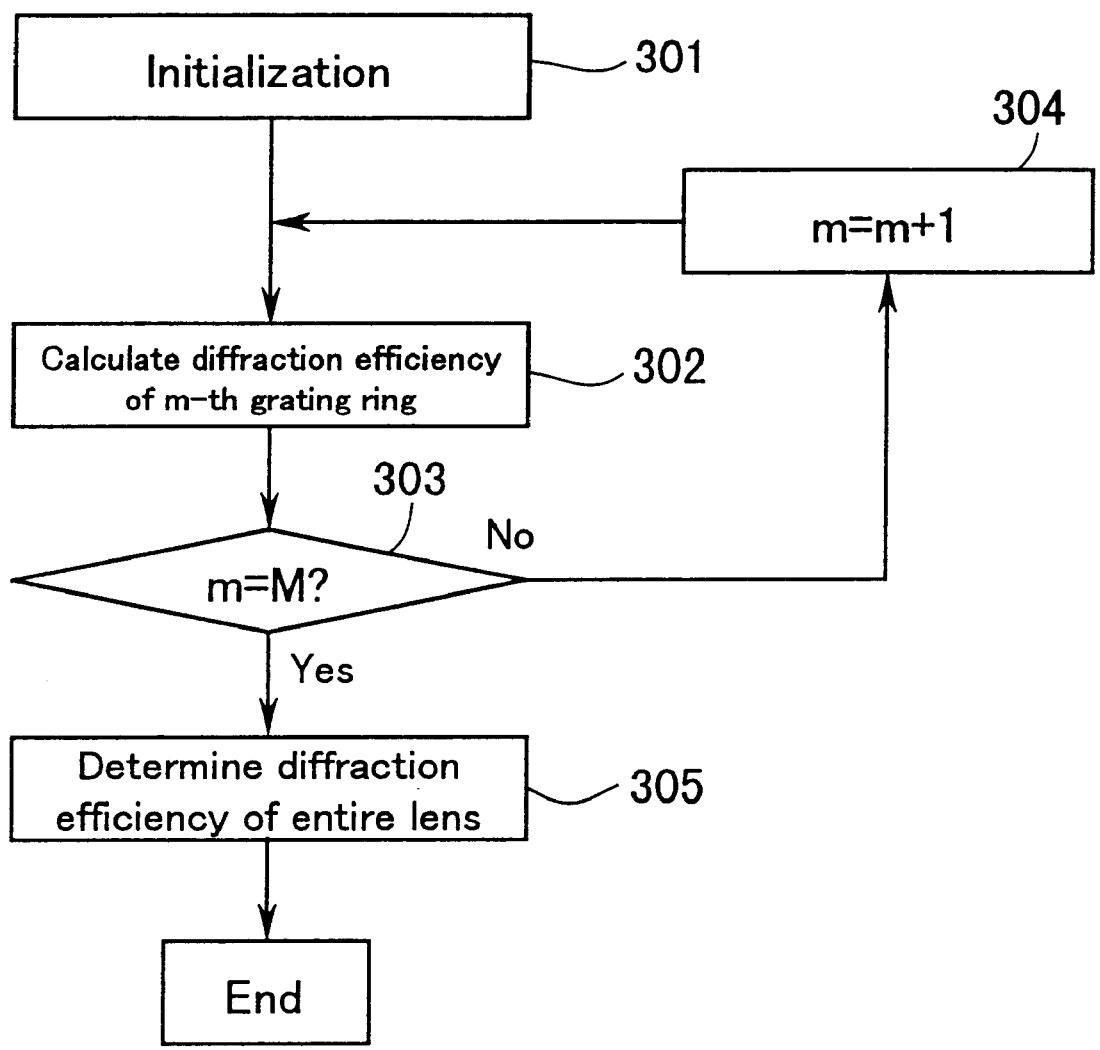
FIG. 5 illustrates a calculation algorithm for the device for calculating diffraction efficiencies according to the first embodiment of the present invention.

In Example 1, the diffraction efficiency of each region has to be determined beforehand and stored in memory before the calculation begins. However, often the diffraction efficiency is unknown. In that case, the form and the refractive index, etc. of the diffraction lens are measured, and using this data, the diffraction efficiency of each region is determined. On the basis of the diffraction efficiency of each region, the diffraction efficiency of the entire lens can be calculated. The calculation algorithm for this case is shown in FIG. 5.

It is assumed that relief cross-section data of the diffraction lens, the wavelength of the light-source, the refractive index of the lens material at this wavelength, and the weights for the grating rings have been stored in a third, a fourth, a fifth, and a second memory respectively.

In step 301, the number of grating rings is determined on the basis of the relief data stored in the third memory and stored in a memory M. The grating ring counter m is initialized to 1.

In step 302, the relief data for the m-th grating ring is retrieved from the third memory, and the wavelength and the refractive index data are retrieved from the fourth and the fifth memory. The diffraction efficiency of the m-th grating ring is calculated and the result is stored in a region of memory η corresponding to the first memory. This step 302 is the second processor of the present invention.

Step 303 determines whether step 302 has been performed for all grating rings. If m=M is not true, then there are rings left for which the calculation has not been performed, so m is increased by 1 in step 304, and the procedure returns to step 302. These steps 303 and 304 correspond to a first repeating means. If in step 303 m=M is true, this means that step 302 has been performed for all grating rings, and the diffraction efficiencies of all rings are stored in a memory η corresponding to the first memory.

In step 305, the diffraction efficiency of the entire lens is determined. When all steps from step 301 to step 304 are performed, the diffraction efficiencies of all grating rings are stored in the memory η, which corresponds to the first memory. The second memory stores the weights as already-known information. Consequently, by performing in step 305 the algorithm already explained for Example 1, the diffraction efficiency of the entire lens can be calculated.

Using the device according to this example, the lens diffraction efficiency of the entire lens can be calculated by evaluating its relief profile and refractive index, even when the diffraction efficiencies of the individual grating rings is not known, so that useful information for the design of optical systems can be obtained.

EXAMPLE 3

In Example 2, an example for an algorithm where one grating ring of the diffraction lens corresponds to one region has been explained. The pitch between the grating rings of the diffraction lens is large in a center portion of the lens and becomes smaller towards the lens periphery. At the lens periphery, the pitch of neighboring grating rings is almost the same. In such a case, it can be assumed that the diffraction efficiency of these grating rings is also almost the same. Consequently, when a plurality of rings with presumably almost the same diffraction efficiency is treated as one region, the memory capacity that is necessary for the memory $\eta$ and the memory W can be decreased. Moreover, the computational amount is decreased, so that the calculation can be sped up.

EXAMPLE 4

Figure 6:
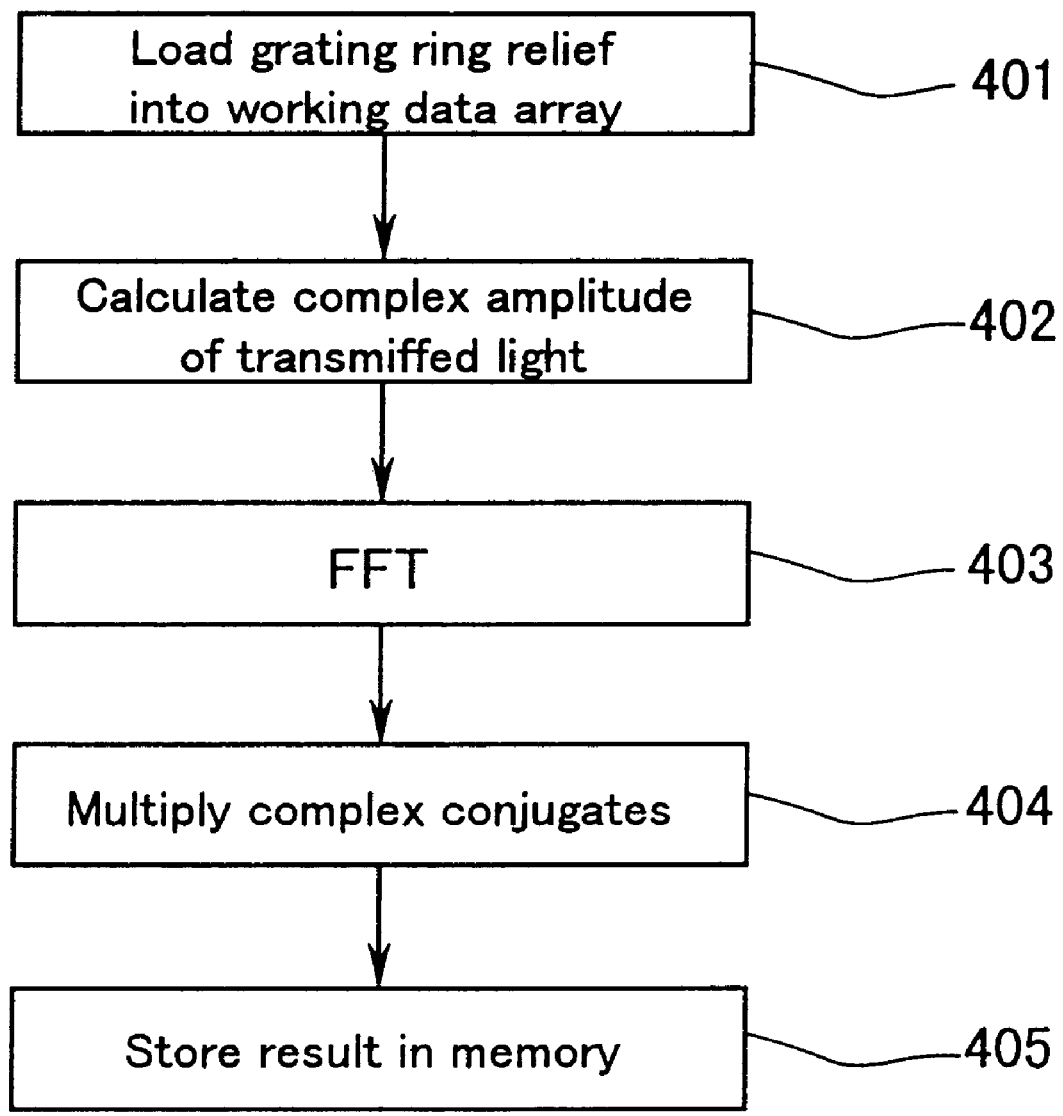
FIG. 6 illustrates an algorithm for calculating diffraction efficiencies using an FFT.

Several methods are known for calculating the diffraction efficiency on the basis of the detailed relief profile of a diffraction element. In the case of diffraction lenses, scalar diffraction theory using a Fourier transformation can yield sufficiently satisfactory precision. A detailed calculation algorithm for this case is shown in FIG. 6.

In step 401, cross-sectional data of the grating ring relief to be calculated is loaded as working data into a data array D held on the computing device. If the number of elements in the data array is a power of 2, then a Fast Fourier Transformation (FFT) can be used, and the computation process can be sped up. To be specific, a number in the order of 4096 elements is advantageous.

In step 402, the wavelength $\lambda$ and the refractive index N are retrieved from the memory corresponding to the third and the fourth memory, and on the basis of these figures, the complex amplitude of the transmitted light is determined and stored in a complex array P with the same number of elements as the data array D, held in the computing device.

In the following step 403, an FFT is performed on the complex array P. The Fourier coefficients resulting from this process are stored in the complex array P.

In step 404, the complex conjugates of all elements of the complex array P are multiplied, which gives real numbers. Then, the elements are normalized so that the sum of all elements of the complex array P becomes 1. Thus, the diffraction efficiency for each order is stored in the complex array P.

In step 405, the diffraction efficiency of the necessary order is read out from the complex array P and stored in the memory $\eta$, which corresponds to the first memory.

Second Embodiment

In the above embodiment, it was assumed that suitable values for the weights of each region of the diffraction lens are stored beforehand in a memory. However, if these weights can be calculated on the basis of the intensity distribution of a light source and the grating ring diameter of the diffraction lens, then the time and effort of entering these data can be saved.

The amount of the light incident on each region of the diffraction lens divided by the amount of light incident on the entire lens can be used for the weights.

When it can be assumed that the light incident on the diffraction lens has a uniform intensity distribution, the area of each region divided by the effective diameter of the lens can be calculated and the resulting value can be used for the weights.

EXAMPLE 5

The following explains how the weights can be calculated when the surface area of each region is stored in a memory (sixth memory).

In this example, the region of the diffraction lens through which the light beam passes (effective region) is divided into M regions, and $S_m$ is the area of the m-th region. First of all, the areas of all regions stored in the sixth memory are retrieved and added to calculate the area $S_t$ of the effective region using the formula $$S_t = \sum_{i=1}^{M} S_i. \tag{16}$$

Then, $$W_m = \frac{S_m}{S_t} \tag{17}$$

is calculated for all m from m=1 to m=M.

A third processor of the present invention calculates the weights for all grating rings with the above equations.

The obtained weights $W_m$ for each grating ring are stored in a memory that corresponds to the second memory for storing the weight information. The determined weights satisfy the equation $$\sum_{m=1}^{M} W_m = 1. \tag{15}$$

Consequently, the sum of the products of these weights and the diffraction efficiencies of each region is a weighted average, wherein the diffraction efficiency of each region is weighted with the area of that region.

EXAMPLE 6

If the diffraction lens consists of concentric grating rings, then the weights can be calculated on the basis of the radius of each grating ring instead of the area of each grating ring.

Here, the grating rings are counted from the center of the lens, and the total number of rings is M. That is to say, the grating ring in the center of the lens is the first ring, and the outermost ring is the M-th grating ring. When the radius of the m-th grating ring is expressed by $R_m$, then the radius $R_M$ of the outermost grating ring is the effective radius of the lens. When the radii $R_m$ are stored in a data array corresponding to the seventh memory, the radii $R_m$ are retrieved sequentially and the weights are calculated using $$W_1 = \frac{R_1^2}{R_M^2} \text{ and} \tag{3}$$

$$W_m = \frac{R_m^2 - R_{m-1}^2}{R_M^2} \quad (m > 1), \text{ wherein} \tag{4}$$

$R_m$: radius of the math grating ring counting from the center of the lens;

$W_m$: weight of the m-th grating ring

M: number of grating rings m: index of grating rings counted from the lens center The results of these calculations are stored in the elements of the weight memory W, which corresponds to the second memory.

Thus, the weights $W_m$ are proportional to the areas of the grating rings. The determined weights satisfy the equation $$\sum_{m=1}^{M} W_m = 1. \tag{15}$$

Consequently, the sum of the products of these weights and the diffraction efficiencies of each region is a weighted average, wherein the diffraction efficiency of each region is weighted with the area of that region.

EXAMPLE 7

When a laser light source is used, the intensity distribution of the emitted light is not uniform, but is known to resemble a Gauss distribution. In the case of a semiconductor laser, the emitted light beam is elliptic.

Figure 7:
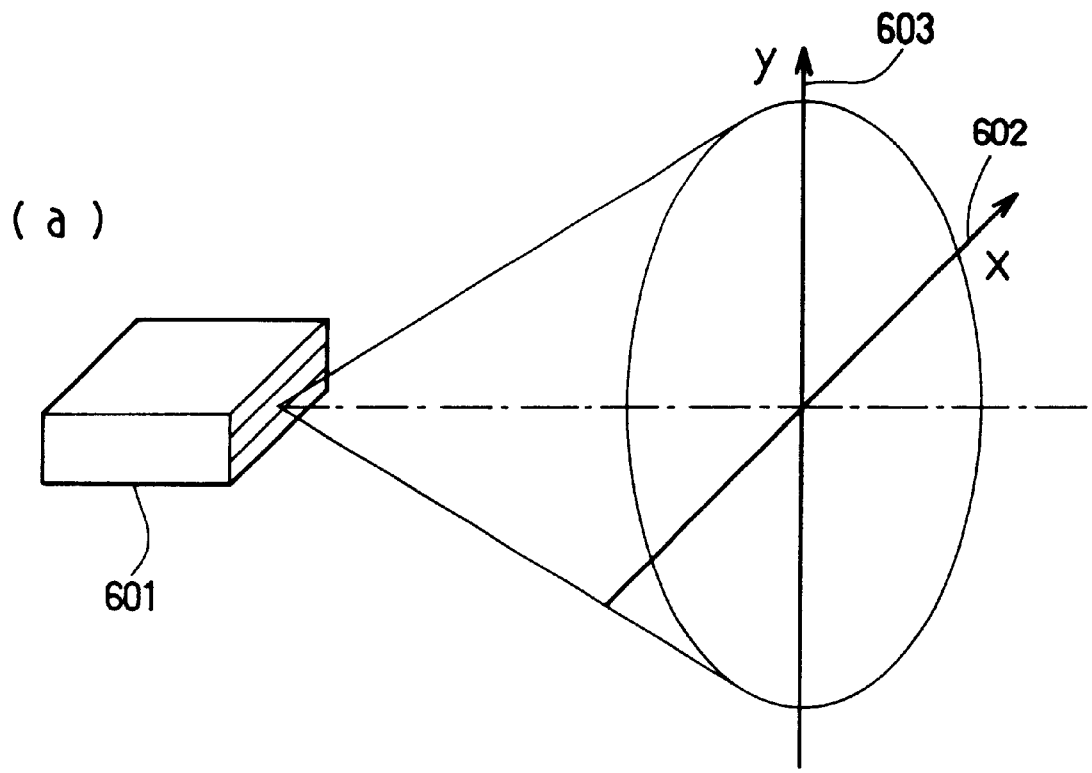
FIGS. 7a–b illustrates the light intensity distribution of a semiconductor laser.
Figure 7:
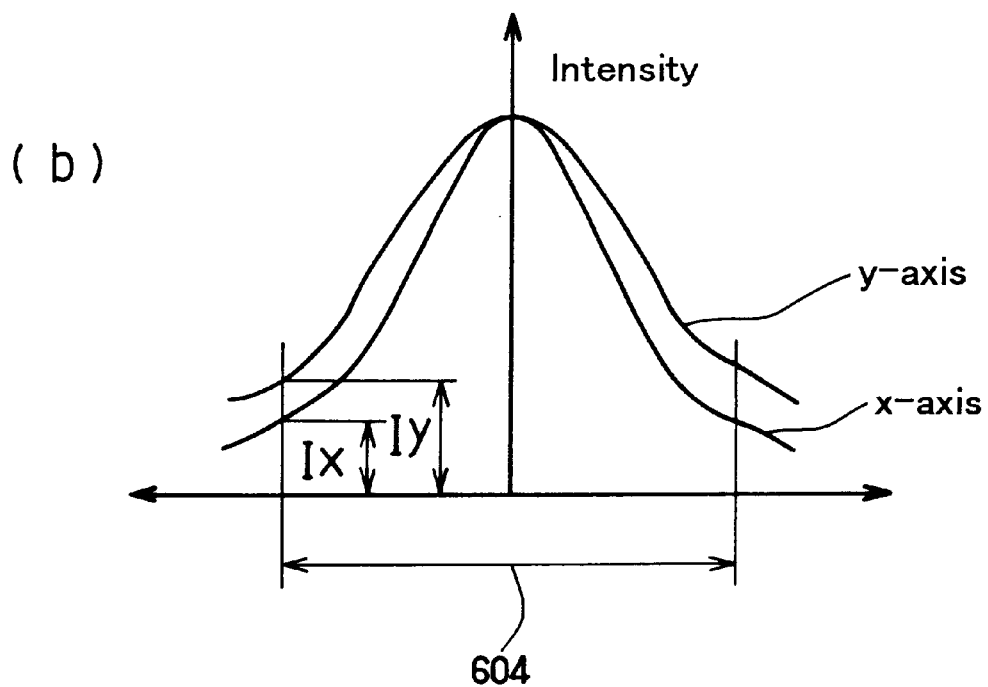

FIG. 7(a) is a schematic drawing of the light beam emitted from a semiconductor laser. A semiconductor laser light source 601 emits an elliptic light beam. The intensity distribution of the emitted beam in the direction of the short axis (x-axis) 602 of the ellipse differs from the intensity distribution over the long axis (y-axis) 603 of the ellipse. An example for the intensity distributions over these two axes is shown in FIG. 7(b). When such a light source is used, the result of a calculation where the weights are proportional to the area of the grating rings deviates strongly from the actual value, which is highly undesirable.

In this example, however, the light intensity in the center of the beam, as shown in FIG. 7(b), is normalized as 1, and the intensities (proportion relative to the peak values) over the x-axis and the y-axis in the effective radius 604 of the lens are $I_x$ and $I_y$. When the incident light intensity is as described in FIG. 7(b), more realistic weights that are proportional to the intensity of the light incident on the grating rings, rather than proportional to the grating ring areas, can be calculated, if the data for $I_x$ and $I_y$ are available.

Figure 8:
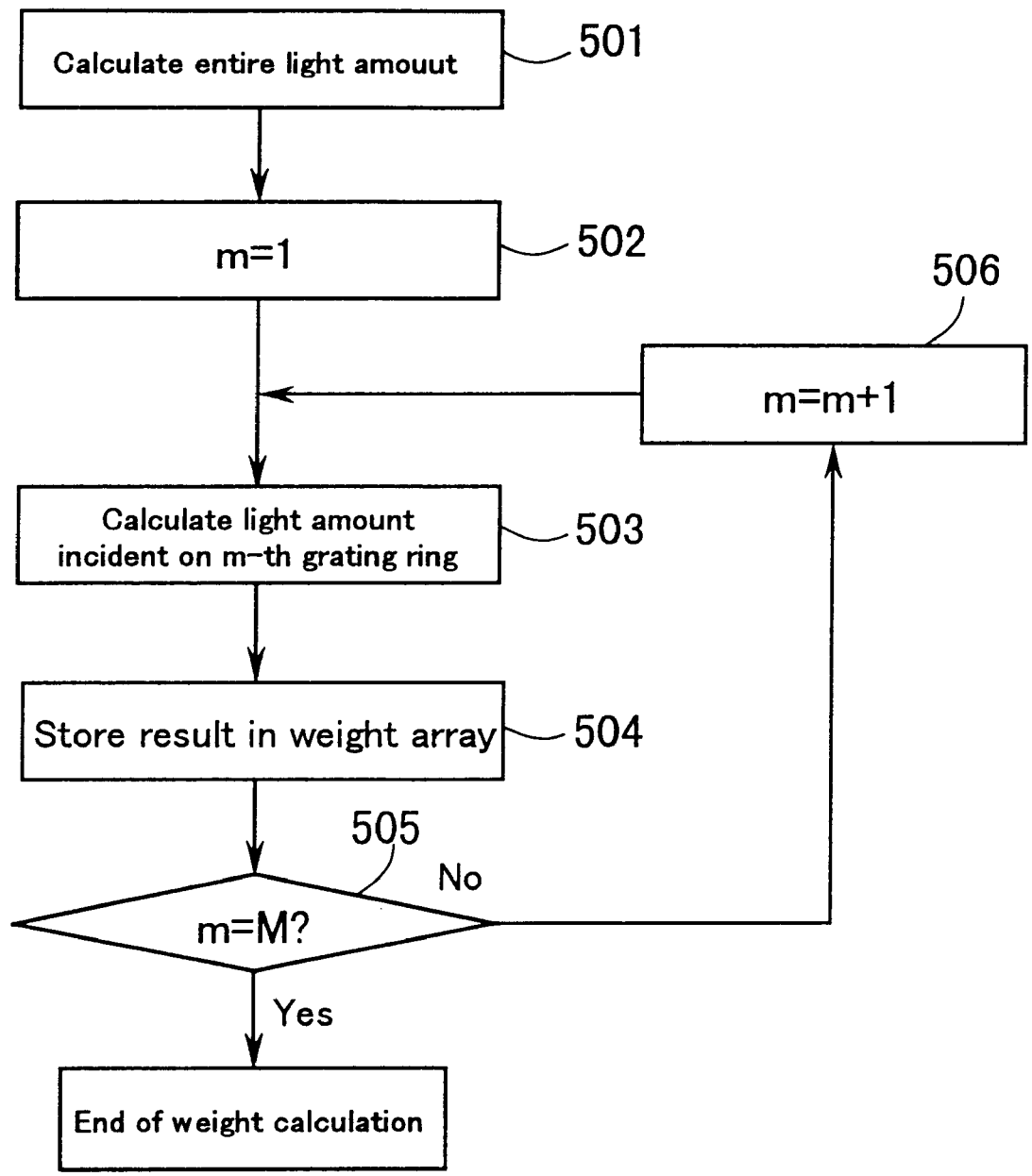
FIG. 8 illustrates a calculation algorithm for the device for calculating diffraction efficiencies according to a second embodiment of the present invention.

FIG. 8 illustrates a specific algorithm for such a calculation.

It is assumed that the incident light intensity data $I_x$ and $I_y$ have been stored beforehand in a memory that corresponds to an eighth memory.

It is further assumed that the incident light has an intensity distribution as shown in FIG. 7(b). In step 501, the entire light amount incident on the lens is calculated and the result of this calculation stored in another memory.

In step 502, the grating ring counter m is initialized to 1.

In step 503, the light amount incident on the m-th grating ring is calculated using the grating ring radius information stored in the seventh memory as described in Example 6 and the information concerning the intensity distribution of the light beam. In the following step 504, the light amount incident on the m-th grating ring as determined in step 503 is divided by the total light amount as stored in memory. This quotient is stored as the weight $W_m$ for the m-th grating ring in the weight memory W, which corresponds to the second memory. The steps 503 and 504 correspond to the third processor of the present invention.

In step 505, it is verified whether the steps 503 and 504 have been performed for all grating rings. If m=M is not true, the procedure advances to step 506, m is increased by 1, and the steps 503 and 504 are repeated. If m=M is true, this means that the steps 503 and 504 have been performed for all grating rings. In this case, the weights of all grating rings have been stored in the memory W.

In accordance with this algorithm, weights that are substantially proportional to the light intensity of the beam incident on each grating ring can be determined. Moreover, the determined weights satisfy the equation $$\sum_{m=1}^{M} W_m = 1. \tag{15}$$

Consequently, the sum of the products of these weights and the diffraction efficiencies of each region is a weighted average, wherein the diffraction efficiency of each region is weighted with the light intensity that is incident in this region.

Consequently, in accordance with this example, the calculation of the diffraction efficiency with consideration of the light intensity distribution of the light that is incident on the lens becomes possible.

Third Embodiment

In the above embodiments of a device for calculating diffraction efficiencies, it was assumed that the relief profile is already known. However, when, for example, the relief profile design data at the stage of the lens design, and the cutting bit data for processing the lens or the feed speed of the cutting bit are known, the relief profile after the processing can be calculated on the basis of the relief profile design. In other words, on the basis of this information, the diffraction efficiency of the finally obtained lens can be calculated taking into account the change of the relief profile of the designed lens due to processing.

The following example is an example for forming a diffraction lens using a diffraction lens mold that was cut with a cutting bit. However, the present invention is not limited to this, and can be equally applied when no mold is used and the diffraction lens is directly cut with a cutting bit.

EXAMPLE 8

Figure 9:
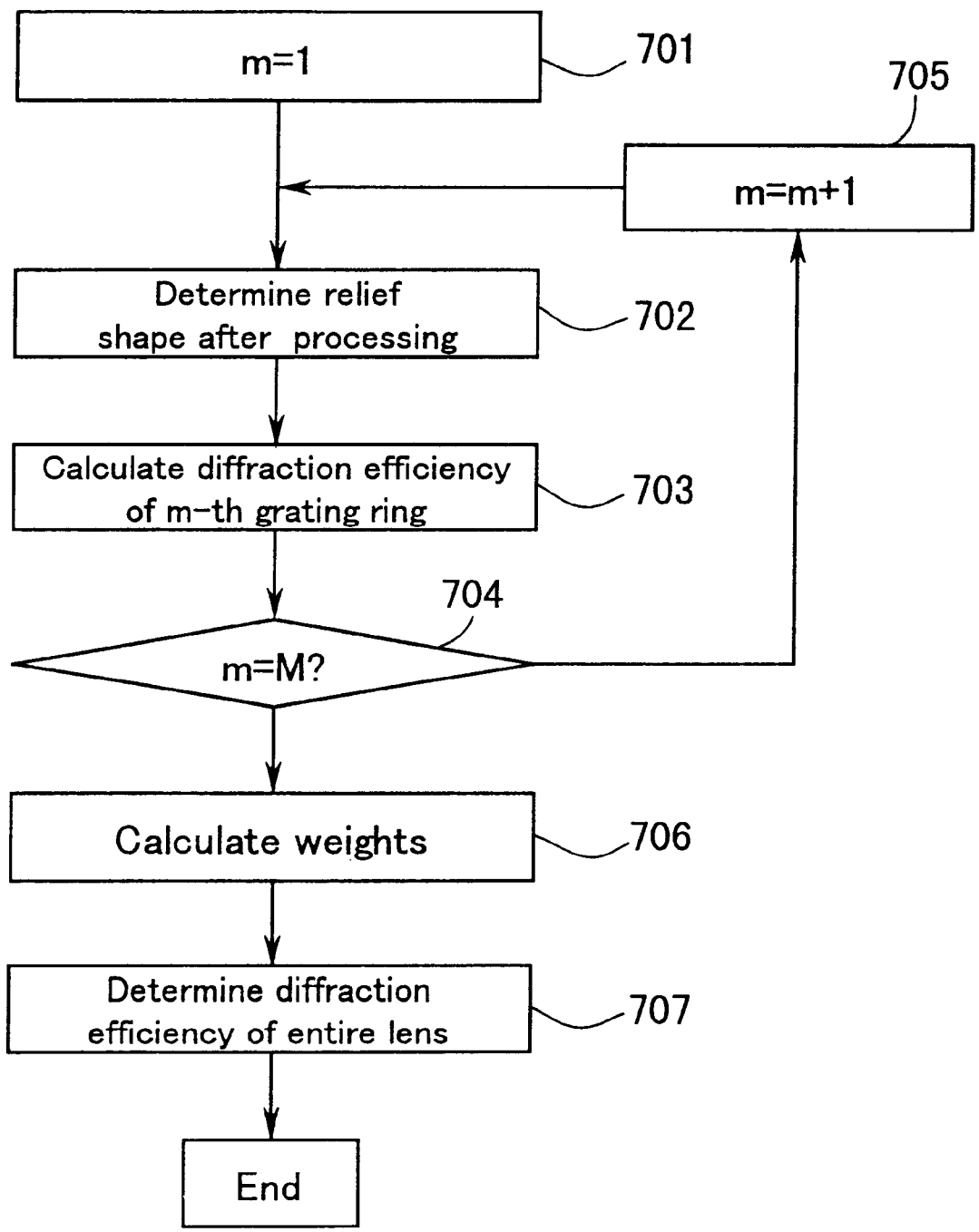
FIG. 9 illustrates an algorithm for the device for calculating diffraction efficiencies according to a third embodiment of the present invention.

FIG. 9 shows a computational algorithm performed by the device for calculating diffraction efficiencies according to the third embodiment of the present invention.

First of all, the data necessary for the calculation is entered. This means that the design shape of the diffraction lens relief, the end radius of the cutting bit for cutting the mold, the wavelength of the light source used with the lens, and the refractive index of the lens material are entered and stored in that order in memories that correspond to the ninth, the tenth, the fourth, and the fifth memory.

In step 701, the number of grating rings of the diffraction lens is stored in the memory M, and the grating ring counter m is initialized to 1.

In step 702, the relief profile after the processing is determined on the basis of the relief profile design data, and stored in a relief profile memory, which corresponds to the third memory.

The relief profile design data of the m-th grating ring and the nose radius t of the end of the cutting bit are retrieved from the memories corresponding to the ninth and the tenth memory.

Figure 10:
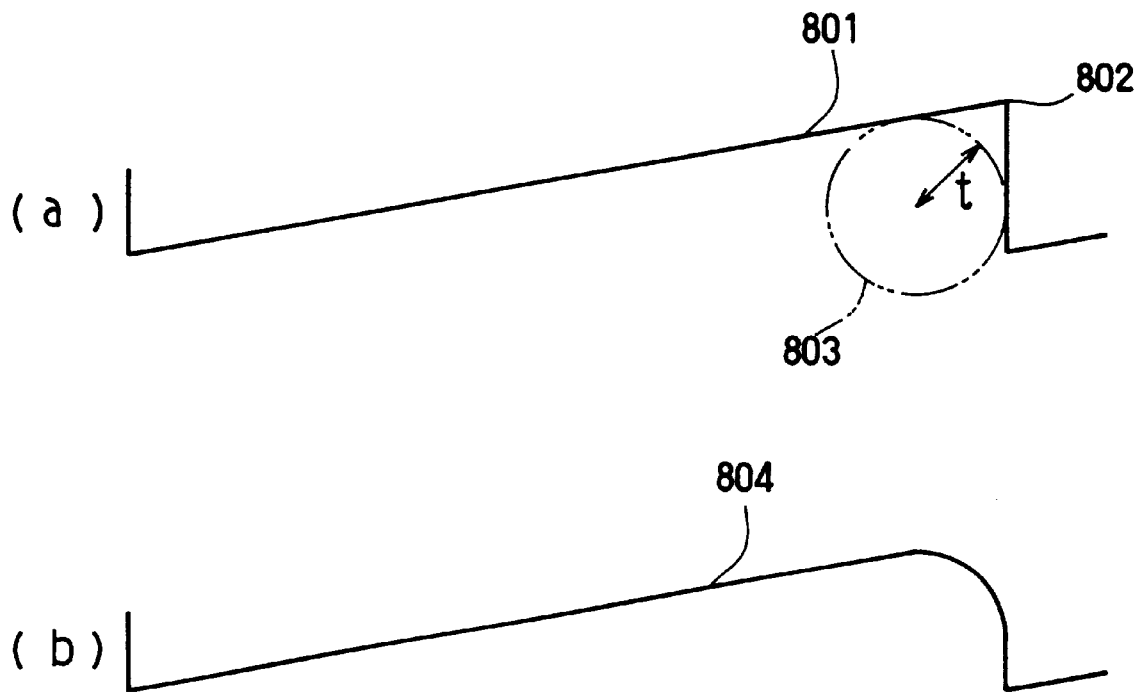
FIGS. 10a–b illustrates the calculation of relief profiles after processing in a third embodiment of the present invention.

FIG. 10 illustrates the procedure performed during step 702. In FIG. 10(*a*), numeral 801 is a saw-tooth-shaped relief design. When the lens is manufactured using a mold by press-forming or injection molding, the relief profile after the processing has a rounded shape that is formed as the depressed vertex 802 of the mold (which becomes a protruding vertex of the lens) and has the radius t of the cutting bit nose. That is to say, in the case of the relief 801, the vertex 802 can be rounded off with the radius t. A circular arc 803 with the radius t is inscribed in the relief 801, so that the relief profile 804 shown in FIG. 10(*b*) is obtained after the processing. This relief profile 804 is stored in a memory for storing relief profiles, which corresponds to the third memory of the present invention. When the lens is manufactured by cutting a lens material with a cutting bit, the depressed portions of the lens relief can be rounded off with the radius t. This step 702 corresponds to the fourth processor of the present invention.

In step 703, the diffraction efficiency of the grating rings is calculated. In this step, the relief profiles, the wavelengths, and the refractive indices are retrieved from the third, the fourth, and the fifth memory respectively, as explained for example in Example 2. The diffraction efficiency is calculated, and the result of this calculation is stored in the memory η, which corresponds to the first memory.

Step 704 checks whether m=M is true. If m=M is not true, the procedure advances to step 705, m is increased by 1, and steps 702 and 703 are repeated. The steps 704 and 705 serve as both the first and the second repeating means. When in step 704 m=M is true, this means that steps 702 and 703 have been performed for all grating rings, and the diffraction efficiencies of all rings are stored in memory η, which corresponds to the first memory.

In step 706, the weight W is determined for each grating. The specific calculations performed in this step have already been explained for Example 5, Example 6, and Example 7, so that a further explanation is omitted here. The weight information obtained in step 706 for each grating ring, is stored in the memory W, which corresponds to the second memory.

In step 707, the diffraction efficiency of the entire lens is determined. The specific calculations performed in this step are the same as explained in Example 1, whereby a further explanation may be omitted.

By using the device of this embodiment, the diffraction efficiency can be calculated on the basis of the lens design data and the processing data of the cutting bit.

Figure 11:
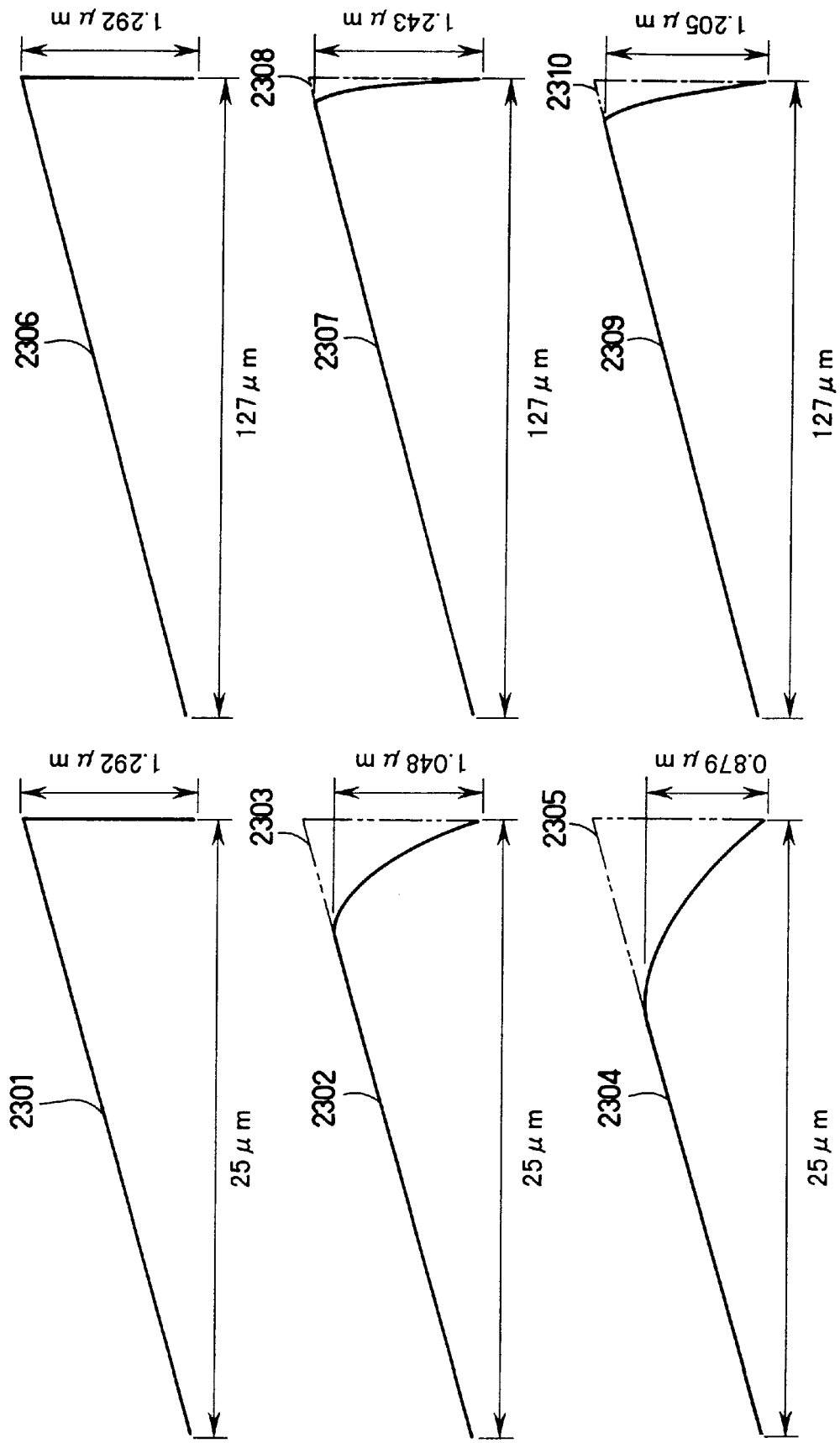
FIG. 11 shows an example how relief profiles after processing are calculated from a design relief profile with a device for calculating diffraction efficiencies according to a third embodiment of the present invention.

For comparison, FIG. 11 shows examples of relief profiles after processing as calculated with a device according to this embodiment.

Numerals 2301 and 2306 indicate relief profile designs with 25 μm and 127 μm pitch respectively, and 1.292 μm depth (note that the scaling in vertical and horizontal direction in FIG. 11 is not equal). When the refractive index n of the lens material is 1.5262 and the wavelength λ of the light-source is 680 nm, the depth D satisfies the equation $$D = \frac{\lambda}{n-1}. \tag{18}$$

Consequently, ignoring surface reflections, the designed reliefs 2301 and 2306 in FIG. 11 have a diffraction efficiency of 100% for first-order diffraction light. When the mold for such a designed relief is processed using a cutting bit with a nose radius of 10 μm, then the calculated relief profiles are as indicated by the numerals 2302 and 2307. Furthermore, when a cutting bit with a nose radius of 20 μm is used for the processing, then the calculated relief profiles are as indicated by the numerals 2304 and 2309. The chain double-dashed lines 2303, 2305, 2308, and 2310 indicate the grating ring relief profile designs 2301 and 2306. Moreover, the diffraction efficiencies for first-order diffraction light were calculated for these grating rings using FFT. The result of this calculation was a diffraction efficiency of 100% for the reliefs 2301 and 2306, 94.3% for relief 2302, 90.0% for relief 2304, 73.5% for relief 2307, and 54.5% for relief 2309.

EXAMPLE 9

Depending on the feed speed of the processing bit, cutting traces may remain on the relief after the processing. Because the waviness of the relief profile due to these cutting traces after the processing is periodic, it causes diffraction light. As a result, the lens diffraction efficiencies of the orders that are actually utilized drop. Consequently, when a simulation is performed under consideration of the cutting traces, the relation between the feed speed of the processing bit and the resulting lens efficiency can be established. This data can be useful for examining lens manufacturing processes.

Figure 12:
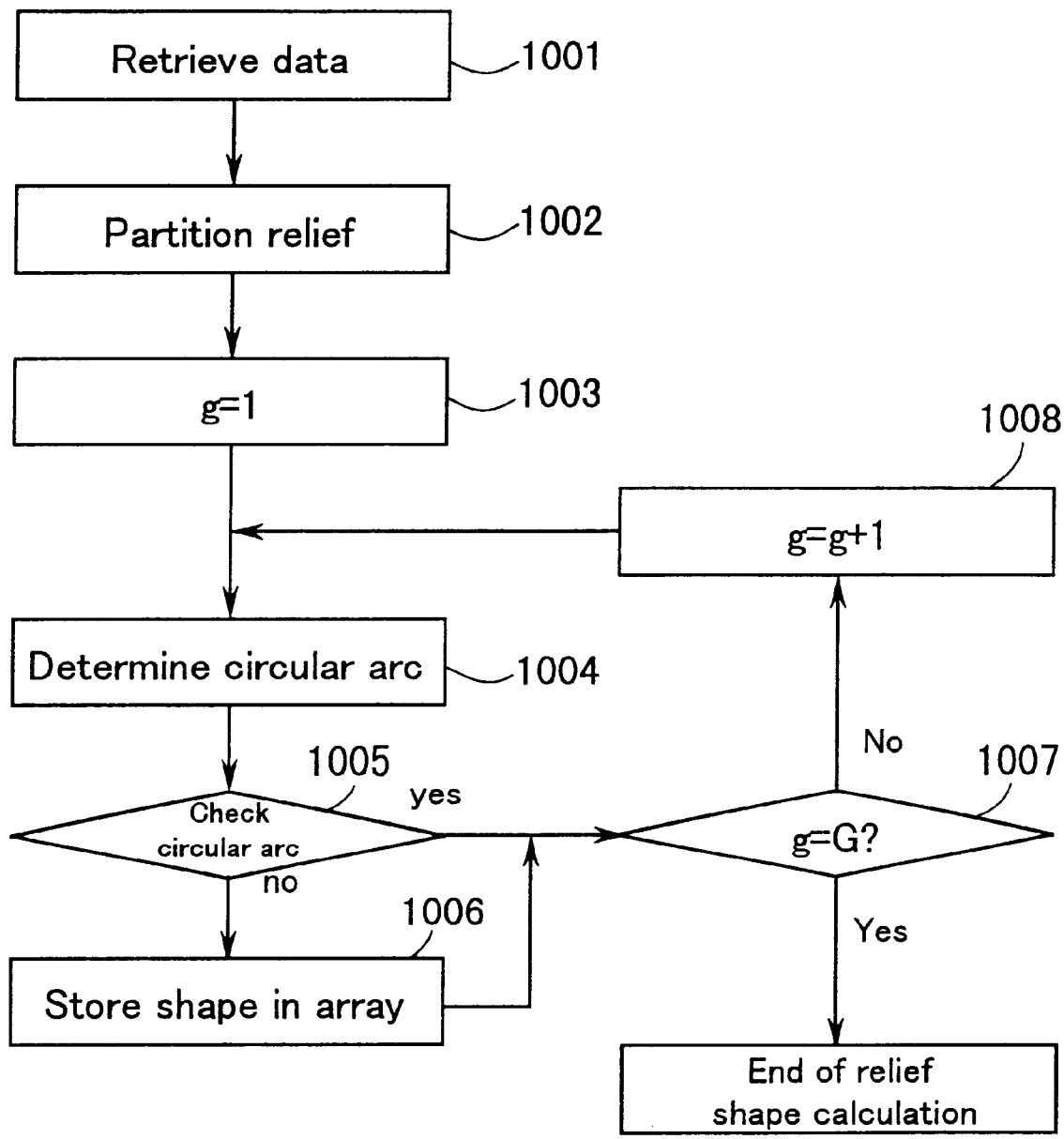
FIG. 12 illustrates an algorithm for calculating relief profiles after processing, taking the feed speed of the processing bit into consideration.
Figure 13:
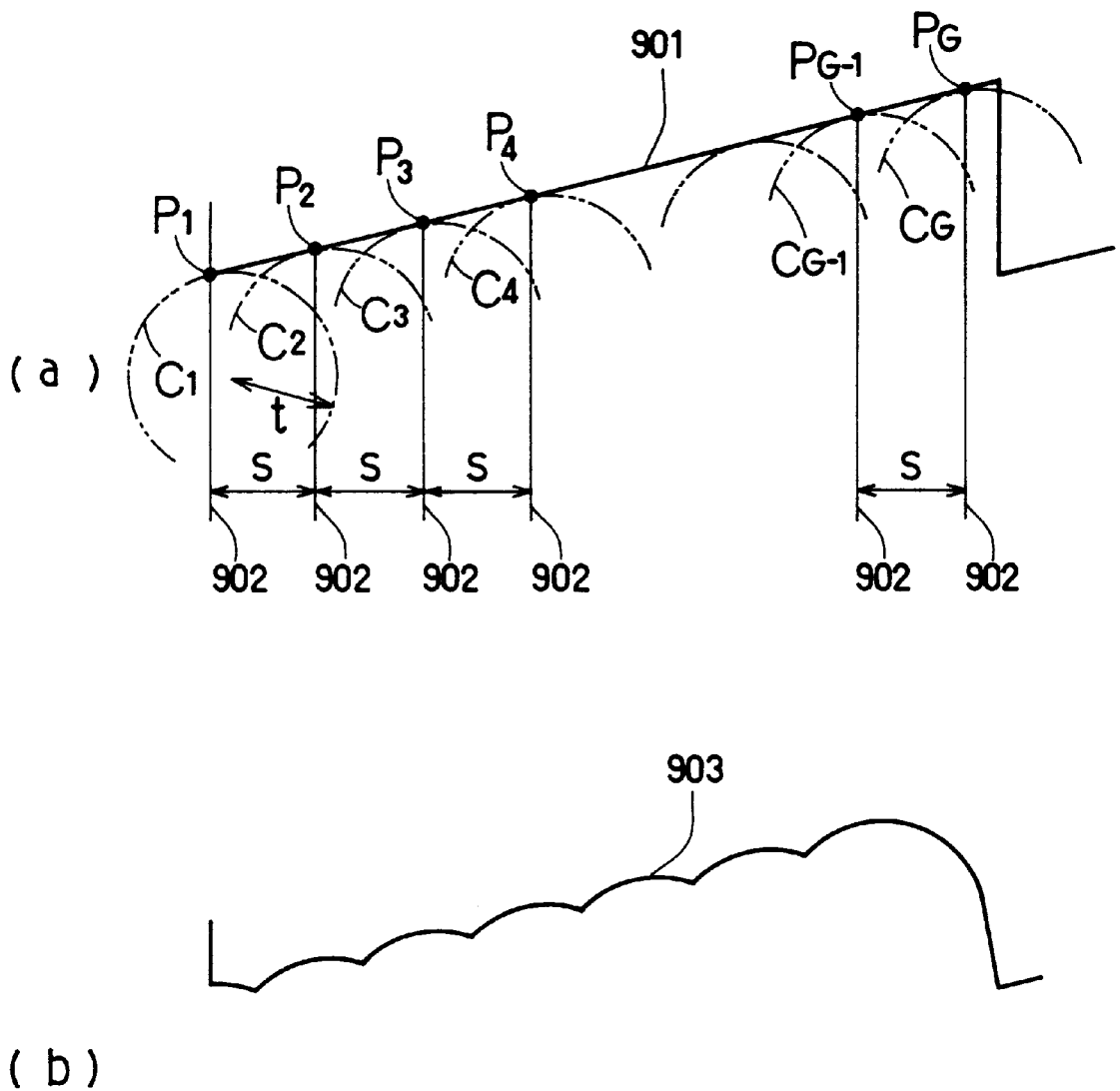
FIGS. 13a–b illustrates a process for calculating relief profiles after processing, taking the feed speed of the processing bit into consideration.

This calculation can be performed when the algorithm in FIG. 12 is used for the fourth processor indicated as step 702 in the explanation of Example 8. FIG. 13 explains this algorithm.

In FIG. 13(*a*), the solid line 901 indicates a saw-tooth-shaped relief design. The nose radius of the processing bite is t, and the feed amount of the processing bit per revolution of the mold during the machining is s. It is assumed that this information has been stored beforehand in a ninth, a tenth, and an eleventh memory of the computing device, respectively.

In step 1001 in FIG. 12, the relief profile design is retrieved from the memory corresponding to the ninth memory and stored temporarily as working data in a data array held in a memory of the computer.

Then, in step 1002, using the value held in the memory s, which corresponds to the eleventh memory, the point where the relief contacts the tip of the cutting bit is determined, and stored temporarily as working data in a data array P held in a memory of the computer. To be specific, parallel lines 902 are drawn in intervals in relief pitch direction (i.e. sideways in FIG. 13) that are equal to the feed speed s. The points of intersection $P_1, P_2, P_3, \ldots, P_{G-1}, P_G$, between these lines 902 and the designed relief 901 are determined and their coordinates are stored in memory. Here, it is assumed that the total number of points of intersections is G.

In the following step 1003, the counter g is initialized to 1.

In step 1004, the circular arc $C_g$ with the radius t that contacts the designed relief tangentially in $P_g$ is determined.

In step 1005, it is verified whether the circular arc determined in step 1004 intersects with the designed relief profile. If the circular arc intersects with the designed relief profile (for example, in the case of circular arc $C_G$ in FIG. 13), the procedure advances to step 1007. If it does not intersect the designed relief profile, the procedure advances to step 1006.

In step 1006, the shape of the circular arcs determined above is stored in an array for storing shapes, and the procedure advances to step 1007.

In step 1007, it is verified whether step 1004 has been performed for 20 all points of intersection P. If g=G is not true, the procedure advances to step 1008, g is augmented by 1, and the next calculation is performed. If g=G is true, this means that the calculation is finished.

Thus, data 903 of the shape after the processing, under consideration of the cutting feed speed, as illustrated in FIG. 13(*b*), is stored in an array for storing shapes. This data is stored in a memory that corresponds to the third memory.

Fourth Embodiment

When the lens is used over a broad wavelength range, as in camera lenses, the diffraction efficiency has to be calculated for a plurality of wavelengths. In this case, the calculations described in the above examples can be repeated for the necessary wavelengths components, but this will increase the computational amount proportionally to the calculated number of wavelengths.

Here, the relief profile after processing is determined from the designed relief profile, for example as illustrated for Example 8, using the method of finding the tangential circular arcs at the designed relief, and determining the envelope of these circular arcs. Therefore, the computational amount is large. Since the calculation for determining the relief profile after processing is the same for the calculation of the diffraction efficiency at every wavelength, the relief profile can be calculated once and then stored. The result of this calculation can be used for the diffraction efficiency calculation of every wavelength, so that the computational amount is lower than if the calculations explained in the previous examples are simply repeated for all wavelengths. Thus, compared to this case, the procedure is sped up. The same holds true for the calculation of the weights.

Moreover, when the relief profile after processing of a certain grating ring has been determined from the designed relief profile, it is possible to calculate the diffraction efficiencies at all wavelengths using the relief profile after processing, store only the calculated diffraction efficiencies in the memory, and then, calculate the relief profile after processing of the next grating ring. If the calculation is performed in this order, the necessary memory capacity and the time for retrieving information can be decreased compared to performing the calculation in the order (a) first, calculating the relief profile after processing for all grating rings, (b) store those relief profiles in a memory, (c) load the stored relief profiles after processing one after another and calculate the diffraction efficiencies of all relevant wavelengths one after another, because the data volume of the relief profiles after processing is large.

EXAMPLE 10

Figure 14:
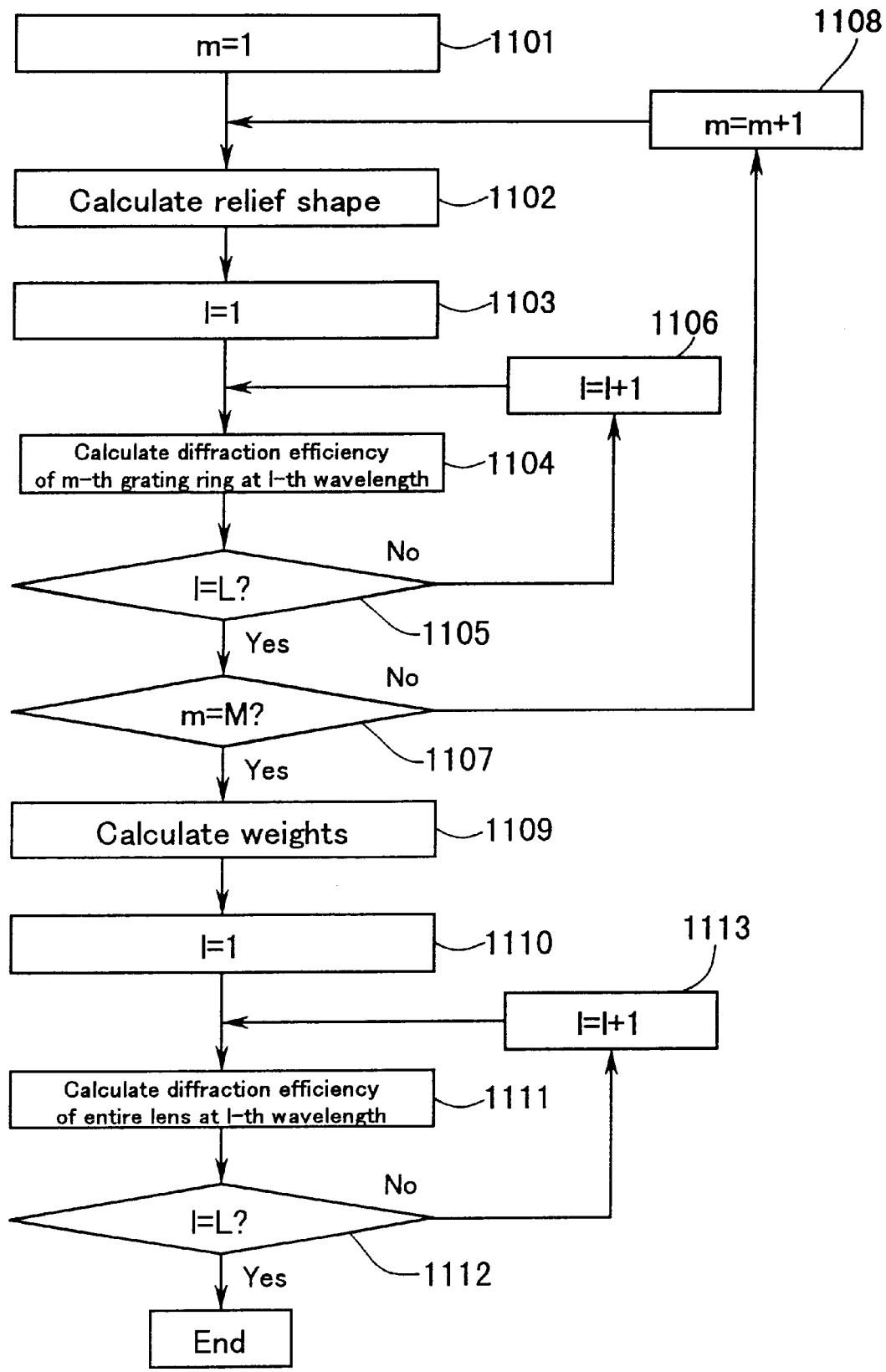
FIG. 14 illustrates a calculation algorithm for the device for calculating diffraction efficiencies according to a fourth embodiment of the present invention.

FIG. 14 is a diagram that explains an algorithm for a device for calculating diffraction efficiencies according to the fourth embodiment of the present invention.

It is assumed that the relief profile design, the processing bit data, a plurality of wavelengths, refractive indices for this plurality of wavelengths, and the radii of the grating rings of the diffraction lens have already been stored in memories that correspond to the ninth, the tenth, the fourth, the fifth, and the seventh memory, respectively.

In step 1101, an initialization is performed to prepare the start of the calculation. The memories corresponding to the first, the second and the third memory are held in the computing device, the number of lens grating rings is initialized to M, the number of wavelengths to be calculated is initialized to L, and the memory m is initialized to 1.

In step 1102, the relief profile design data and the nose radius of the cutting bit are retrieved from the memories corresponding to the ninth and the tenth memory. Then, the relief profile of the ring after processing is calculated and stored in the memory corresponding to the third memory. The precise calculations of this step correspond to those of step 702 in Example 8. Step 1102 corresponds to the fourth processor of the present invention.

In step 1103, the wavelength counter is initialized to 1. In the following step 1104, the relief profile after processing, an l-th wavelength, and the material's refractive index data at the l-th wavelength are retrieved from the memories corresponding to the third, the fourth and the fifth memory. Then, the diffraction efficiency is calculated and stored in the memory corresponding to the first memory. Step 1104 corresponds to the second processor.

Step 105 determines whether l=L is true. If l=L is true, this means that step 1104 has been performed for all wavelengths, and the procedure advances to step 1107. If l=L is not true, this means that there are still wavelengths for which the calculation has not been performed, and the procedure advances to step 1106, where l is increased by 1, and step 1104 is repeated. Step 1105 and step 1106 correspond to the third repeating means.

Step 1107 determines whether m=M is true. If m=M is true, this means that steps 1102, 1103, and 1104 have been performed for all grating rings, so that the procedure advances to step 1109. If m=M is not true, this means that there are still grating rings for which the calculation has not been performed, and the procedure advances to step 1108, where m is increased by 1, and steps 1102, 1103, and 1104 are repeated. Step 1107 and step 1108 correspond to the fourth repeating means.

In step 1109, information about the grating ring radii is retrieved from the memory corresponding to the seventh memory. Then, the weights are calculated and stored in the memory corresponding to the second memory for storing weights. The calculation in this step is the same as the calculation explained in Example 6, so a further explanation is omitted here. The information about the weights, which is stored in the second memory, cannot only be obtained by calculation from the grating ring radii as explained in Example 6, but also by the calculations explained in Example 5 or Example 7 of the second embodiment.

In step 1110, the wavelength counter l is initialized to 1. Then, in step 1111, the diffraction efficiencies and the weights of all grating rings corresponding to the l-th wavelength is retrieved from the first and the second memory, and the refractive index of the entire lens at the l-th wavelength is calculated. Step 1112 determines whether l=L is true. If l=L is true, this means that step 1111 has been performed for all wavelengths, and the calculation is concluded. If l=L is not true, this means that there are still wavelengths for which the calculation has not been performed, and the procedure advances to step 1113, where l is increased by 1, and step 1111 is repeated. In accordance with steps 1110, 1111, 1112, and 1113, $$E_{jl} = \sum_{m=1}^{M} W_m \eta_{mjl} \quad (5)$$

is calculated wherein
- j: integer indicating the order of diffraction light
- l: index of the wavelengths number
- $E_{jl}$: diffraction efficiency for j-th order diffraction light of the diffraction lens at the l-th wavelength
- M: positive integer (M>1) indicating the number of regions for which the diffraction efficiency is calculated
- m: index of the region number
- $W_m$: weight for the m-th region
- $\eta_{mjl}$: diffraction efficiency for the j-th order diffraction light of the m-th region at the l-th wavelength These steps 1110, 1111, 1112, and 1113 correspond to the first processor.

Using the calculation algorithm of this example, a calculation for many wavelengths can be performed with comparatively small memory capacity and high speed. Consequently, the calculation time for designing a lens for use over a broad wavelength spectrum, such as a camera lens, can be shortened, which can be a great advantage.

Fifth Embodiment

The shape of the manufactured diffraction lens and the lens-molding die can be measured using a high-precision shape-evaluation device such as a surface-roughness meter. To know to what extent the precision of the lens shape and the lens-molding die shape influences the diffraction efficiency can be very important in terms of quality management, such as determination of tolerances or discrimination of defective products.

EXAMPLE 11

Figure 15:
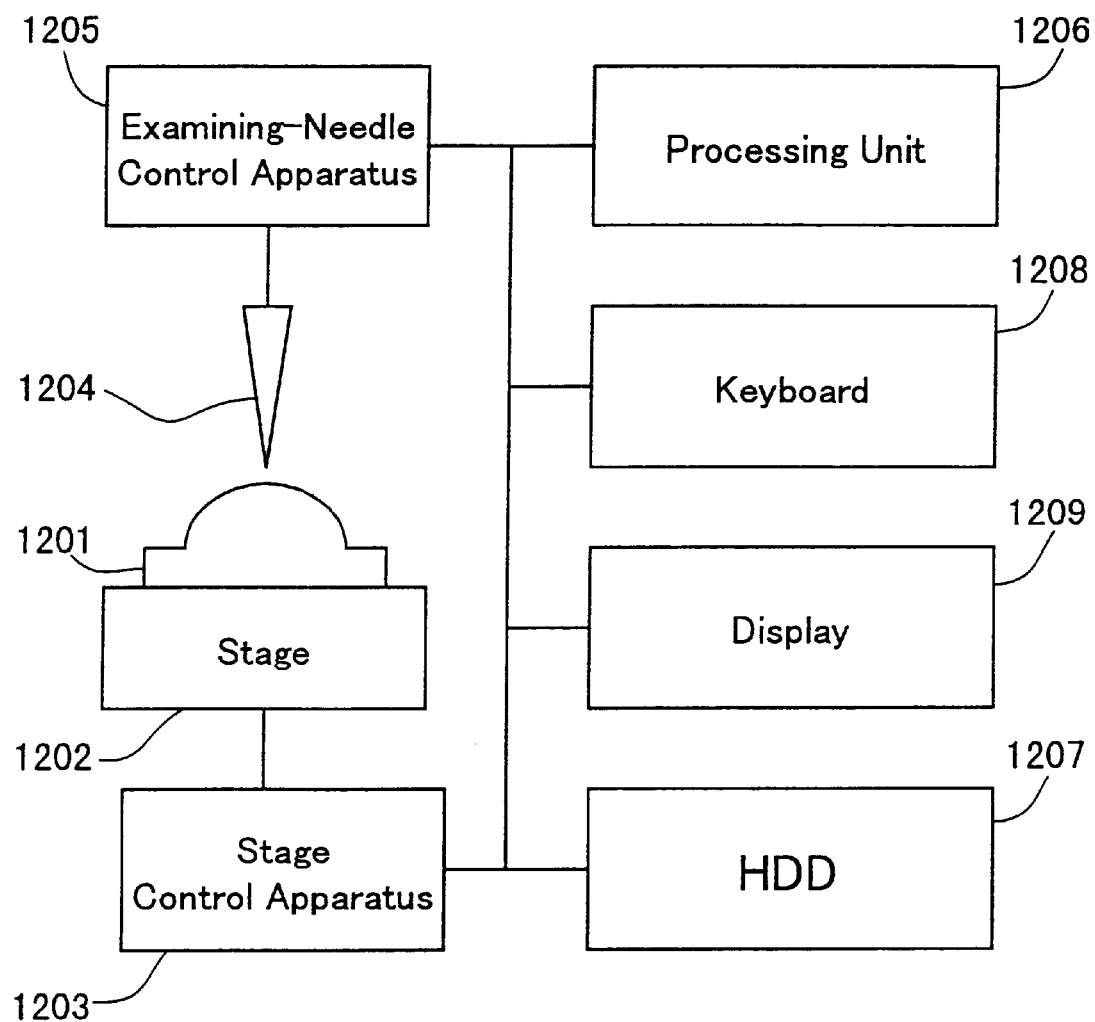
FIG. 15 is a drawing showing the structure of a lens-shape measurement apparatus according to the fifth embodiment.

FIG. 15 is a drawing showing the structure of a lens-shape measurement apparatus according to the fifth embodiment.

A lens 1201 is placed on a stage 1202 for examination. The stage 1202 is translated in horizontal direction by a stage control apparatus 1203. An examining needle 1204 is moved in vertical direction, controlled by an examining-needle control apparatus, so that it touches the lens 1201.

The stage control apparatus 1203 and the examining-needle control apparatus 1205 send the stage coordinates Y and the examining needle coordinates Z to a processing unit 1206. Thus, a data array consisting of pairs of stage coordinates Y and examining needle coordinates Z serves as the lens shape data. A program for calculating diffraction efficiencies with a computer is stored on the hard disk drive (HDD) 1207. The processing unit 1206 loads this program to control the apparatuses and determine the data. The data that is necessary to calculate the diffraction efficiency is entered over a keyboard 1208. A display 1209 displays the calculation result and the measured data.

Figure 16:
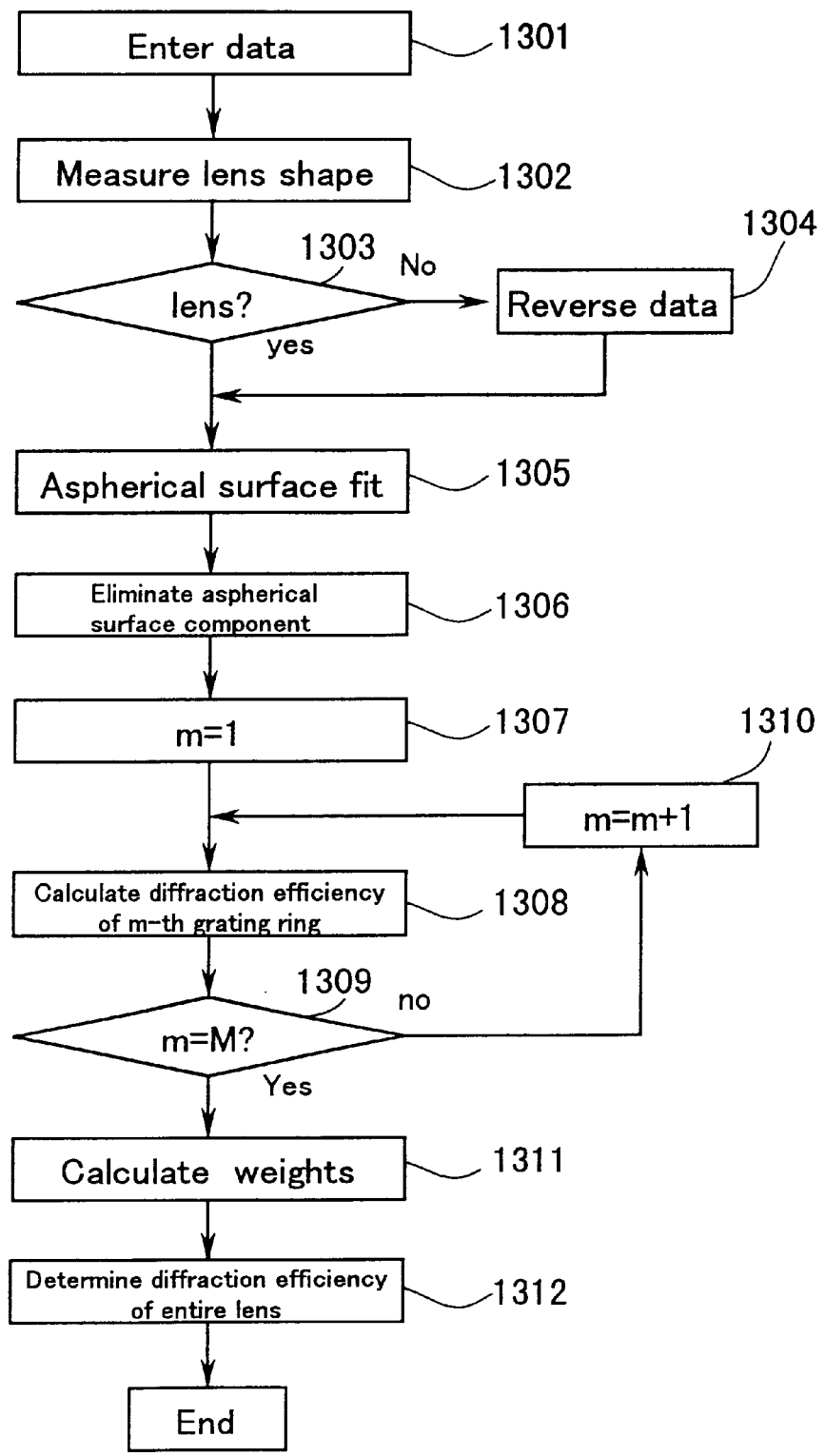
FIG. 16 illustrates an algorithm for the lens-shape measurement apparatus according to the fifth embodiment.

FIG. 16 is a software algorithm for calculating diffraction efficiencies with a computer in accordance with this example.

Step 1301 is the step for data input. In particular, data specifying the measurement, such as the measurement range on the lens to be examined and the number of sampling points, and data necessary for calculating the diffraction efficiency such as the refractive index of the glass material and the wavelengths are entered in this step.

In step 1302, the lens shape is measured. The stage coordinates when moving the stage 1202 with the stage control apparatus 1203 in horizontal direction and the coordinates of the examining needle obtained from the examining needle control apparatus 1205 are stored in a measurement data array U that has been previously reserved in a memory region of the computer.

The solid line in FIG. 17(a) is an example of the data for a combined refraction/diffraction lens measured with a surface roughness meter. The vertical axis 2202 corresponds to the optical axis of the measured lens. Thus, the vertical direction corresponds to the sag of the lens. The horizontal axis 2203 corresponds to the direction from the lens center to the periphery (radial direction).

The following step 1303 determines whether the measured data belongs to a die or to a lens. If the measured data belongs to a lens, then the procedure advances to step 1305. If the measured data belongs to a die, the procedure advances to step 1304, where the data is reversed to produce lens shape data, which is stored in the measurement data array U.

Step 1305 fits the measured data, for example by the least-squares method, to an aspherical surface, a spherical surface or a plane. The following step 1306 eliminates the shape of the aspherical surface, spherical surface or plane determined in step 1305 from the measurement data array U, and stores the resulting data in a relief profile array L.

Figure 17:
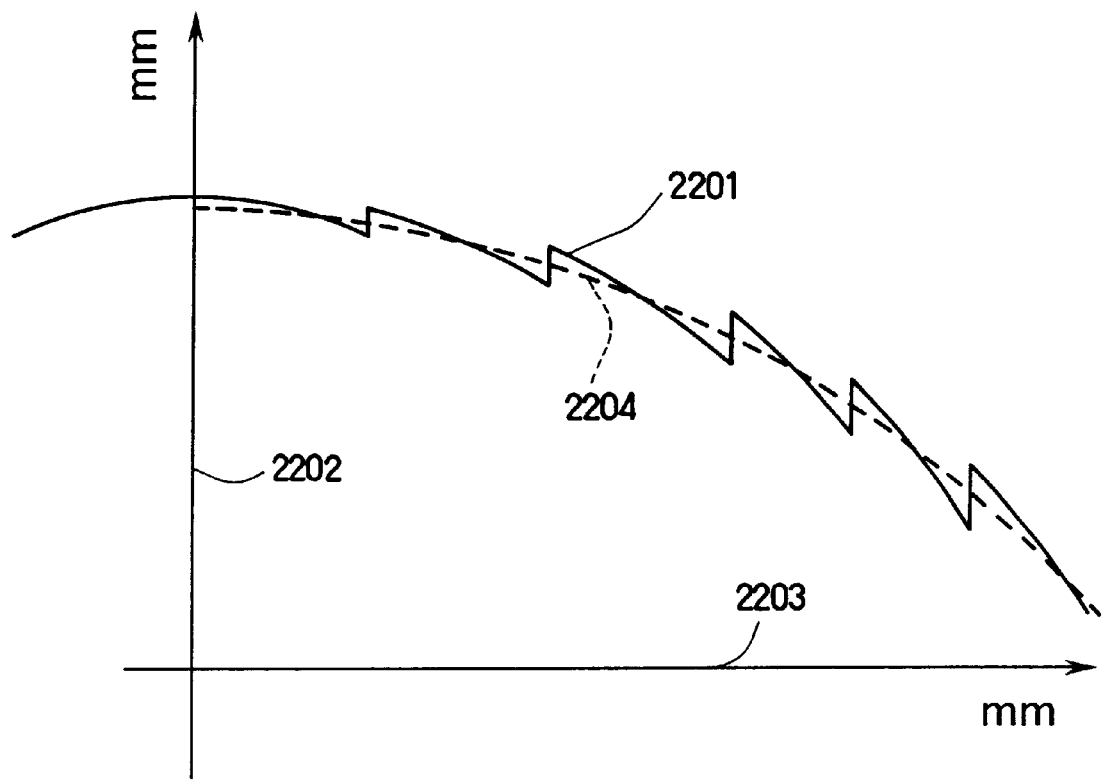
FIGS. 17a–b illustrates the data processing for eliminating a macroscopic curved surface shape from the measured shape data.
Figure 17:
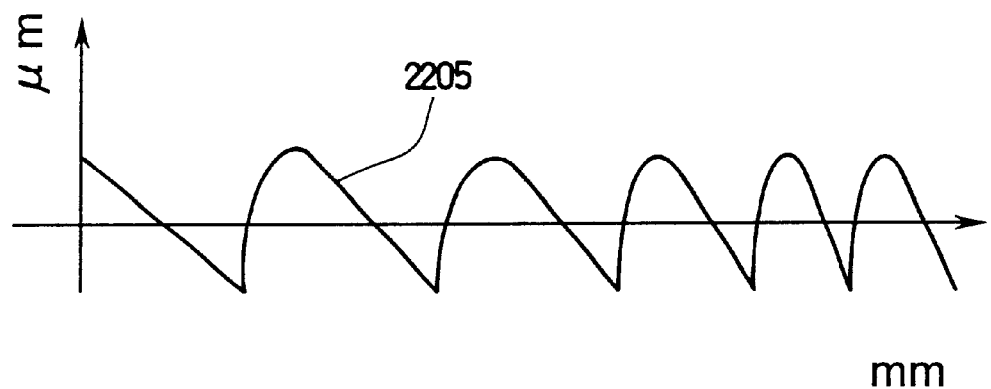

FIG. 17 explains the procedure for steps 1305 and 1306. To calculate the diffraction efficiency, a microscopic undulation of the lens surface is important. However, when the diffraction lens is measured with a shape-measurement device, such as a surface roughness meter, this microscopic undulation is superimposed on a macroscopic curved surface, as shown by the solid line 2201. Therefore, a procedure is necessary to remove this macroscopic curved surface portion from the measured data of the lens. The broken line 2204 in FIG. 17(a) is a plot of the aspherical polynomial determined in step 1305. The relief profile 2205 in Figure(b) is the result of the subtraction of the macroscopic portion 2204 from the measured data 2201. This relief profile 2205 is stored in a shape array L.

In step 1307, the grating ring counter m is initialized to 1. Step 1308 calculates the diffraction efficiency of the m-th grating ring, which is stored in the memory corresponding to the first memory. Step 1309 verifies whether this calculation has been performed for all grating rings. If there are grating rings left for which the calculation has not been performed, then m is increase by 1 in step 1310, and step 1308 is repeated. If step 1309 confirms that the calculation has been concluded for all grating rings, the procedure advances to step 1311, where the weights for all grating rings are calculated and stored in the memory corresponding to the second memory. In step 1312, the diffraction efficiency and the weight of each grating ring is retrieved from the first and the second memory respectively, and the diffraction efficiency of the entire lens is determined. The calculation of the diffraction efficiency of the entire lens in steps 1307–1312 can be performed using the device for calculating diffraction efficiencies according to the first or the second embodiment of the present invention.

The present embodiment uses a shape measurement device with an examining needle. However, the same effect can be attained using an optical non-contact-type shape measuring device, a shape measuring device utilizing interatomic forces, etc.

Using the shape measurement device described in this embodiment, the diffraction efficiency can easily be calculated from the measured shape of a diffraction lens or die for diffraction lenses.

Sixth Embodiment

Figure 18:
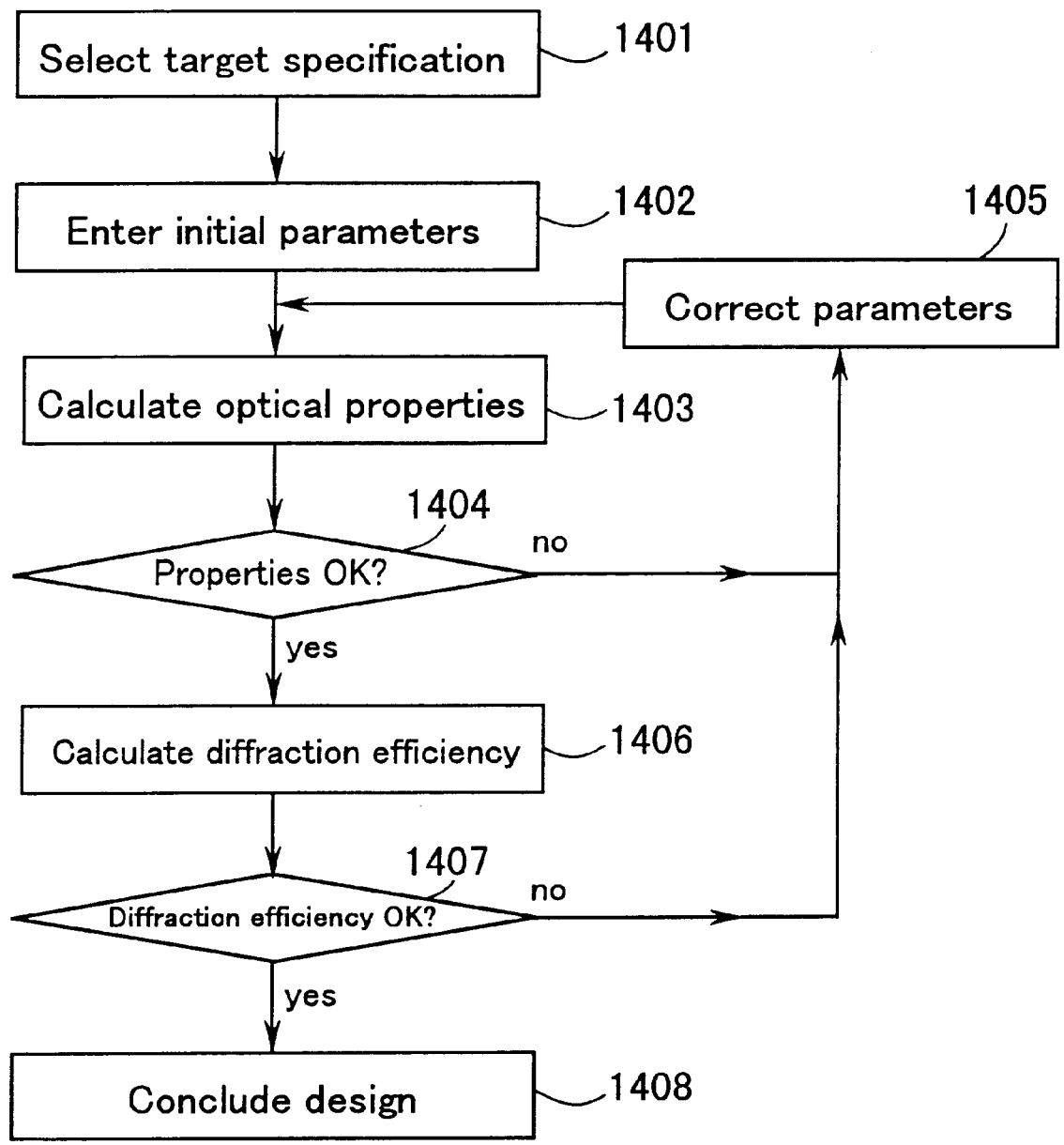
FIG. 18 illustrates an algorithm for lens design according to a sixth embodiment of the present invention, taking diffraction efficiencies into consideration.

FIG. 18 illustrates an algorithm for a lens design device according to a sixth embodiment of the present invention, which takes the diffraction efficiency into consideration.

First of all, a target specification is selected (step 1401), then the initial parameters of the lens are entered (step 1402). Next, the optical properties at these parameters are calculated by ray-tracing (step 1403).

Then, it is verified whether these optical properties satisfy the target specifications (step 1404). If the lens properties satisfy the target specifications, the procedure advances to step 1406, and if they do not satisfy the target specifications, the lens parameters are corrected at step 1405, and the evaluation of the optical properties in step 1403 is repeated.

In step 1406, a diffraction efficiency with consideration of processing is calculated. This calculation can be performed using the device for calculating diffraction efficiencies explained in the third embodiment of the present invention.

Step 1407 determines whether the diffraction efficiency obtained in the calculation satisfies the system design conditions. If the diffraction efficiency satisfies the system design conditions, the design is concluded (step 1408), and if it does not satisfy the system design conditions, the lens parameters are corrected (step 1405), and the procedure returns to step 1403, where the optical properties are calculated.

To correct the lens parameters in order to improve the diffraction efficiency, the lens data can be amended such that the pitch of the diffraction lens becomes wider. Especially, widening the small pitches near the lens periphery has the effect of improving the diffraction efficiency. It is necessary to correct the aberration that arises through the correction of the lens pitch by correcting the aspherical coefficients of the lens.

Even when the power of the entire diffraction lens is reduced, the diffraction lens pitch can be widened up, which has the effect of improving the diffraction efficiency. In this case, if the diffraction lens is used for example for correction of chromatic aberration, the correction of the chromatic aberration is reduced. However, using the design method of the present embodiment, a lens can be designed with consideration to the restrictions due to both correction of chromatic aberration and diffraction efficiency tolerance.

Moreover, when the method of calculating diffraction efficiencies according to the present invention is incorporated in lens design software, the previous processes can be further simplified and an even better design solution can be attained. To be even more specific, the diffraction efficiency under consideration of the processing can be used for one merit function (evaluation function) for the lens design. This can easily be realized by incorporating a program for calculating diffraction efficiencies according to the present invention in lens design software. By doing so, the designer can specify the diffraction efficiency, similar to the aberration conditions, for the evaluation function, and a design solution that minimizes the evaluation function can be found using such widely-known optimization techniques as the DLS method.

This embodiment is useful for designing an optical system with harsh restrictions concerning the diffraction efficiency, if the diffraction efficiency under consideration of processing is known at the time of lens design.

Seventh Embodiment

The following is an explanation how a lens is designed with a lens design apparatus of the sixth embodiment of the present invention.

The present embodiment explains an example of the design of an achromatic lens for the correction of the chromatic aberration of a refraction lens with a diffraction lens. To correct the lens design data at the design stage in order to improve the diffraction efficiency, the pitch of the diffraction lens is widened up. There are two approaches to the pitch correction.

The first approach is to prolong the focal length of the diffraction lens. By doing so, the pitch can be widened up entirely, which improves the diffraction efficiency. When the focal length of the diffraction lens is prolonged under the restriction that the total focal length of the entire lens has to be constant, the focal length of the refractive lens has to be shortened to compensate this. Thus, the correction conditions for the chromatic aberration cannot be satisfied, and the result is a lens where the chromatic aberration is undercorrected.

The other approach is to widen the pitch at a peripheral portion of the lens. This is very effective to suppress a drop of the diffraction efficiency, which is considerable at a peripheral portion where the pitch is narrow. In this case, the chromatic aberration of a light beam that is transmitted near the center of the lens is corrected, but the chromatic aberration for light beams that pass a peripheral portion of the lens becomes undercorrected.

Furthermore, lenses can be designed with a combination of the above two approaches. This means, the focal length of the diffraction lens is designed a little bit longer than according to the achromatism condition, and the pitch at the lens periphery is widened up a little compared to the regular pitch. If the lens is designed like this, then the entire undercorrection of the chromatic aberration and the undercorrection of the chromatic aberration for the beams that pass the lens periphery are smaller than if the diffraction efficiency is improved with only one of the two above approaches. As a result, the deterioration of the optical characteristics can be reduced.

Thus, in a lens with corrected chromatic aberration that is designed using the lens design apparatus of the sixth embodiment, the chromatic aberration tends to be undercorrected, but a lens can be obtained where the deterioration of the diffraction efficiency due to the manufacturing process where it is cut with a diamond bit can be reduced.

Eighth Embodiment

The following is an explanation of a combined refraction/diffraction lens according to an eighth embodiment of the present invention. A combined refraction/diffraction lens is a lens where a diffraction lens consisting of a plurality of concentric rings is arranged on the surface of at least one refraction lens.

The central wavelength for the lens design is $\lambda_1$ and the following and the preceding wavelengths are $\lambda_2$ and $\lambda_3$. The refractive indices of the lens material at these wavelengths are $n_1$, $n_2$, and $n_3$. The partial dispersion coefficient $v_g$ of the refraction lens in the applied wavelength region and the partial dispersion coefficient $v_d$ of the diffraction lens in the applied wavelength region are defined as $$v_g = \frac{n_1 - 1}{n_2 - n_3}, \text{ and} \tag{19}$$

$$v_d = \frac{\lambda_1}{\lambda_2 - \lambda_3}. \tag{20}$$

Moreover, $f_g$ is the focal length of the refraction lens, $f_d$ is the focal length of the diffraction lens, and the total focal length is f, and the focal lengths are selected so that $$\frac{1}{f_g \nu_g} + \frac{1}{f_d \nu_d} = 0, \quad (21)$$

then the chromatic aberrations at the wavelengths $\lambda_1, \lambda_2$, and $\lambda_3$ are cancelled.

In the design of regular optical systems, there is usually some tolerance for chromatic aberration, and it is mostly sufficient to reduce the chromatic aberration per glass lens or plastic lens by about one half. In that case, Equation (21) can be replaced with $$\frac{1}{f_g \nu_g} + \frac{1}{f_d \nu_g} = k \frac{1}{f \nu_g}, \quad (22)$$

In Equation (22), k is a factor that shows to what extent the chromatic aberration in a single glass (or plastic) lens is canceled. If k=0, then the chromatic aberration is zero, and if k=1, this means that no diffraction lens is used.

Here, $0.1 \leq k \leq 0.9$ is a preferable condition for correcting the chromatic aberration while maintaining a favorable diffraction efficiency. If k is lower than that range, it is necessary to use a sharp cutting bit to obtain a satisfactory diffraction efficiency, so that the productivity worsens, since the number of grating rings on the lens is large and the grating ring pitch becomes narrow. Moreover, when k is above this range, the correction of the chromatic aberration is not adequate, and the effect of incorporating a diffraction lens becomes insufficient.

More preferable is that k is in the range $0.2 \leq k \leq 0.8$.

Ninth Embodiment

Figure 19:
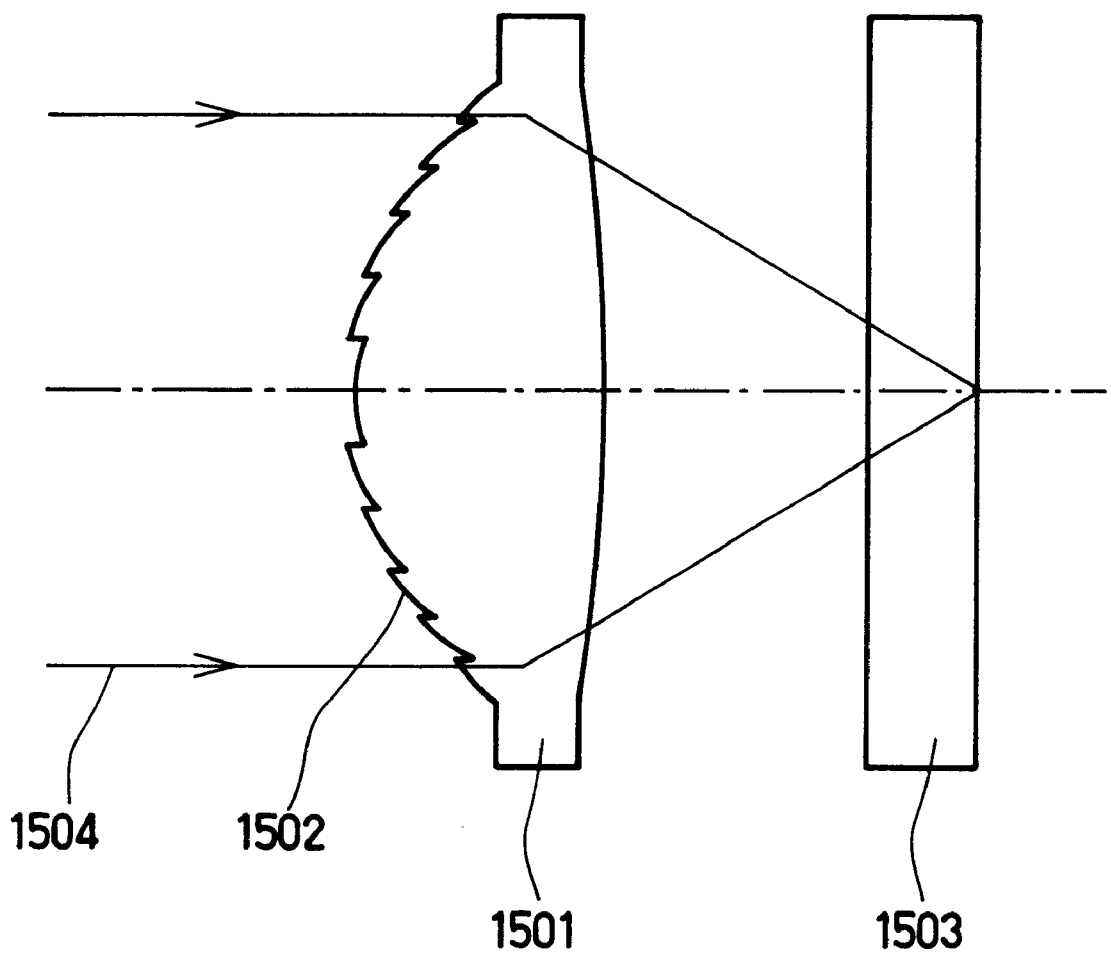
FIG. 19 is a schematic view of an objective lens for an optical information recording/reproducing apparatus according to a ninth embodiment of the present invention and the light paths therein.

FIG. 19 illustrates the outline of an objective lens according to the ninth embodiment of the present invention and an optical path when using it in an optical information recording and reproducing device.

An objective lens 1501 comprises a diffraction lens 1502 on an ingoing surface of a refraction lens. The objective lens is thus a combined refraction/diffraction lens for use in an optical information recording and reproducing device. Numeral 1503 indicates a protective plastic film on an information recording medium, and numeral 1504 indicates an ingoing light beam.

In the optical information recording and reproducing device, the emitted wavelength of the light source laser changes when the output power changes, so that it is preferable that the change of the focal length of the objective lens per change of wavelength is small. In the lens according to this embodiment, the refraction lens and the diffraction lens both have a positive refractive power, so that the chromatic aberration of the refraction lens is corrected by the diffraction lens.

The wavelength variation in a semiconductor laser as a light source for an optical information recording and reproducing device is about several nm, so that an achromatism in the range of design wavelength ±10 nm should be considered. This means, the partial dispersion should be calculated as $\lambda_2 = \lambda_1 - 10$ nm, and $\lambda_3 = \lambda_1 + 10$ nm.

When the numerical aperture (NA) of the lens is N, the minimum pitch p of the lens can be calculated approximately according to $$p = \frac{\lambda_1 (\nu_d - \nu_g)}{N k \nu_d}. \quad (23)$$

In this equation, the light-source wavelength $\lambda$ is approximately 650 nm–800 nm, and NA is approximately 0.45–0.65.

Moreover, when a regular die for molding lenses is processed with a cutting bit, it is preferable that the nose radius of the cutting bit tip is about 10 µm, which yields a good productivity. When the cutting bit tip is smaller than that, the diffraction efficiency can be improved, but the productivity becomes worse, so a smaller tip is not preferable.

In an objective lens for an optical information recording and reproducing device, $0.2 \leq k \leq 0.6$ is a preferable range for the above-mentioned factor k. If k is lower than this range, the above-mentioned minimum pitch p for processing a lens or a die for molding lenses using a cutting bit with a nose radius of 10 µm becomes short, which brings about deterioration of the diffraction efficiency. If k exceeds the above range, the effect of correcting chromatic aberration becomes insignificant, and there is no merit in incorporating a diffraction lens.

Moreover, $0.3 \leq k \leq 0.55$ is the condition for maintaining a satisfying diffraction efficiency when the numerical aperture of the lens is large, i.e. higher than 0.5. Because the minimum pitch becomes narrower when the numerical aperture is large, the lower limit of k has to be raised. Furthermore, the focus depth for a lens with high numerical aperture is small, so that the upper limit has to be lowered to about 0.55.

EXAMPLE 12

The following is an example for the design of a lens for an optical head, which is a system combining a refraction lens and diffraction lens (combined refraction/diffraction lens), where the focal length of the entire optical system is 3 mm.

Table 1 shows the refractive indices of the lens material used for the design at several wavelengths.

TABLE 1

| Wavelength (nm) | | Refractive Index |
|---|---|---|
| $\lambda_1$ | 680 | 1.526231 |
| $\lambda_2$ | 670 | 1.526554 |
| $\lambda_3$ | 690 | 1.525920 |

Under these conditions, $\nu_g$ and $\nu_d$ are
$\nu_g$ = 830.01735 and
$\nu_d$ = −34.

The design results for a total focal length of f=3.0 mm and three different factors k are shown in the Tables 2 to 4. These tables show the result of the diffraction efficiency calculations performed with the device for calculating diffraction efficiencies according to the present invention when the diffraction lens was processed using a cutting bit with 10 µm nose radius.

TABLE 2

| | |
|---|---|
| k | 0 |
| f | 3.0 |
| $f_g$ | 3.122889 |
| $f_d$ | 76.236825 |
| Number of Grating Rings | 27 |
| Minimum Pitch | 31.3 µm |
| Diffraction Efficiency | 84.8% |

TABLE 3

| | |
|---|---|
| k | 0.3 |
| f | 3.0 |
| $f_g$ | 3.084978 |
| $f_d$ | 108.90975 |
| Number of Grating Rings | 19 |
| Minimum Pitch | 44.9 μm |
| Diffraction Efficiency | 89.3% |

TABLE 4

| | |
|---|---|
| k | 0.55 |
| f | 3.0 |
| $f_g$ | 3.0540816 |
| $f_d$ | 169.41517 |
| Number of Grating Rings | 12 |
| Minimum Pitch | 69.8 μm |
| Diffraction Efficiency | 92.3% |

It follows from these tables, that the diffraction efficiency can be improved when $0.3 \leq k$.

The same calculation for a total focal length of 5 mm is illustrated in the Tables 5 to 7.

TABLE 5

| | |
|---|---|
| k | 0 |
| f | 5.0 |
| $f_g$ | 5.204815 |
| $f_d$ | 127.06138 |
| Number of Grating Rings | 44 |
| Minimum Pitch | 31.5 μm |
| Diffraction Efficiency | 85.0% |

TABLE 6

| | |
|---|---|
| k | 0.3 |
| f | 5.0 |
| $f_g$ | 5.14163 |
| $f_d$ | 181.51625 |
| Number of Grating Rings | 31 |
| Minimum Pitch | 45.0 μm |
| Diffraction Efficiency | 89.3% |

TABLE 7

| | |
|---|---|
| k | 0.55 |
| f | 5.0 |
| $f_g$ | 5.09136 |
| $f_d$ | 282.35861 |
| Number of Grating Rings | 20 |
| Minimum Pitch | 70.2 μm |
| Diffraction Efficiency | 93.1% |

In the following, a lens with a focal length of 3 mm but designed from a different material is examined.

The refractive indices of the lens material at several wavelengths are shown in Table 8.

TABLE 8

| Wavelength (nm) | | Refractive Index |
|---|---|---|
| $\lambda_1$ | 680 | 1.511272 |
| $\lambda_2$ | 670 | 1.511567 |
| $\lambda_3$ | 690 | 1.510987 |

TABLE 8-continued

| Wavelength (nm) | Refractive Index |
|---|---|

Under these conditions, $v_g$ and $v_d$ are
$v_g = 881.50345$, and
$v_d = -34.0$.

Under these conditions, $v_g$ and $v_d$ are $v_g=881.50345$, and $v_d=-34.0$.
The calculation results are shown in Tables 9–11:

TABLE 9

| | |
|---|---|
| k | 0 |
| f | 3.0 |
| $f_g$ | 3.1157114 |
| $f_d$ | 80.779716 |
| Number of Grating Rings | 25 |
| Minimum Pitch | 33.5 μm |
| Diffraction Efficiency | 85.6% |

TABLE 10

| | |
|---|---|
| k | 0.3 |
| f | 3.0 |
| $f_g$ | 3.08007158 |
| $f_d$ | 115.39959 |
| Number of Grating Rings | 18 |
| Minimum Pitch | 47.6 μm |
| Diffraction Efficiency | 89.7% |

TABLE 11

| | |
|---|---|
| k | 0.55 |
| f | 3.0 |
| $f_g$ | 3.0509885 |
| $f_d$ | 179.51048 |
| Number of Grating Rings | 12 |
| Minimum Pitch | 74.0 μm |
| Diffraction Efficiency | 93.2% |

According to the above design examples, the diffraction efficiency can be improved by setting k to a certain range, regardless of the lens material or focal length.

In these examples, the grating ring radius $r_m$ of the m-th grating ring was calculated in accordance with $$r_m = \sqrt{2m\lambda_1 f_d}. \tag{24}$$

As a method for calculating the radius of the grating rings, methods such as using the high imaginary refractive index and other methods are well known. By selecting the focal lengths of the refraction lens and the diffraction lens such that k is within a certain range, a refraction/diffraction achromatic lens with excellent processability and no diminished diffraction efficiency can be designed. This main point of the present invention has of course the same effect when the grating ring radii are designed by another method.

Moreover, in this example, a lens for an optical head has been explained, but in an optical system with a light source that has the same level of wavelengths variations as a semiconductor laser, a lens with both high diffraction efficiency and good chromatic aberration correction can be designed in accordance with the present invention.

Furthermore, in this example, the diffraction lens was arranged on the ingoing plane of a refraction lens, but the same effect can of course also be attained if a diffraction lens is arranged on the outgoing plane of a lens.

Tenth Embodiment

The following is an explanation of an optical head according to a tenth embodiment of the present invention, with reference to accompanying drawings.

Figure 20:
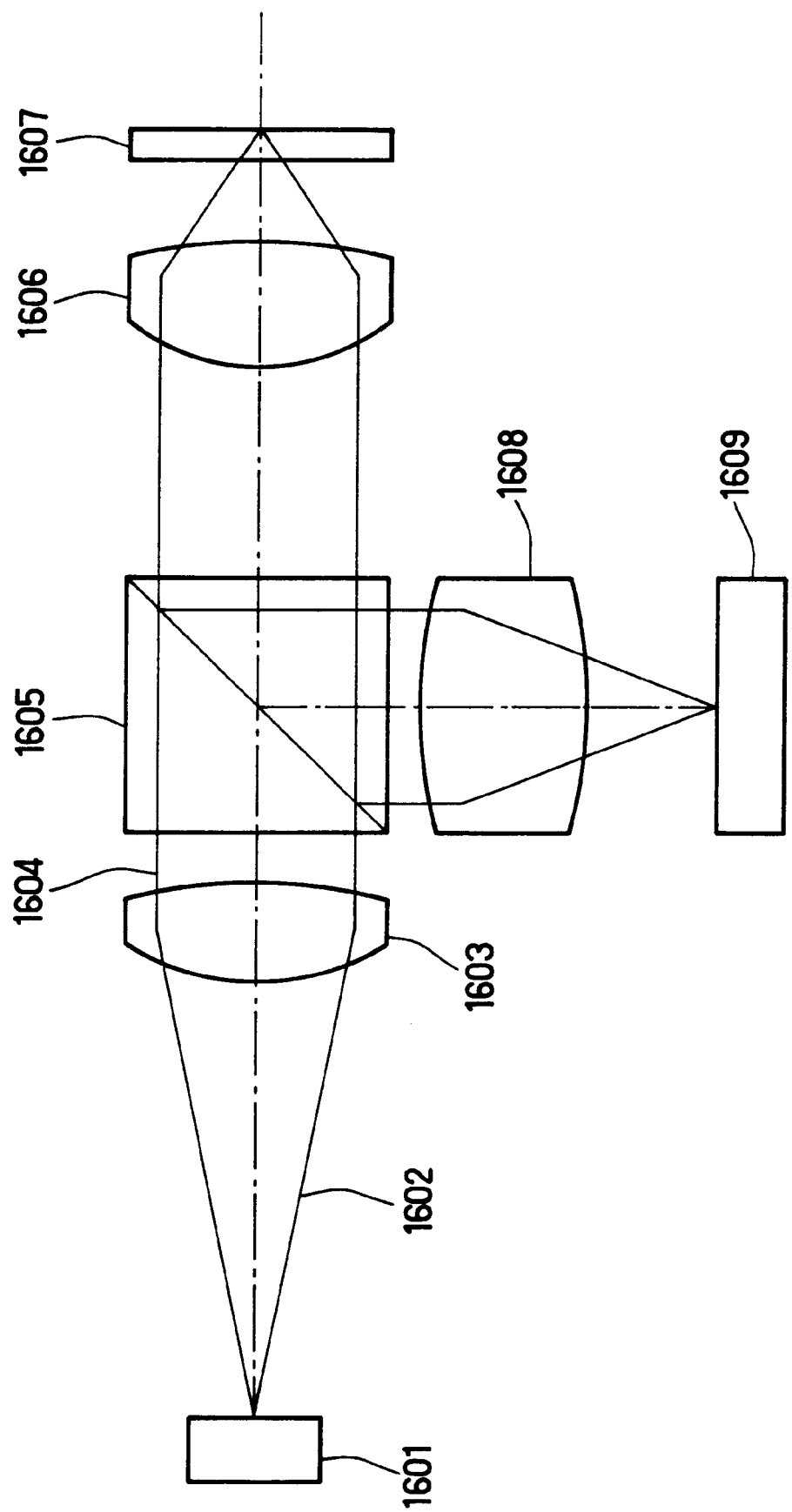
FIG. 20 is a structural drawing of an optical head according to a tenth embodiment of the present invention.

FIG. 20 is a structural drawing of an optical head according to this embodiment.

A divergent light beam 1602 emitted from a semiconductor laser light source 1601 is collimated into a substantially parallel light beam 1604 by a collimator lens 1603. The light beam 1604 passes a beam splitter 1605 and an objective lens 1606 for an optical information recording and reproducing device according to the present invention focuses the light beam on a disk 1607. The light that is reflected from the disk 1607 is collimated into a substantially parallel light beam by the objective lens 1606, reflected by the beam splitter 1605, and focused on a photodetector 1609 by an optical detection system 1608.

Because the output of the semiconductor laser light source 1601 during recording differs from the output during reproducing, the wavelength also differs a little. An objective lens according to the ninth embodiment is used for the objective lens 1606, so that the change of the focal length of the objective lens due to chromatic aberration is small. Moreover, because the diffraction lens has a favorable diffraction efficiency, stray light can be reduced, so that a favorable signal output can be obtained.

Eleventh Embodiment

The following is an explanation of an imaging lens according to an eleventh embodiment of the present invention, with reference to the 10 accompanying drawings.

Figure 21:
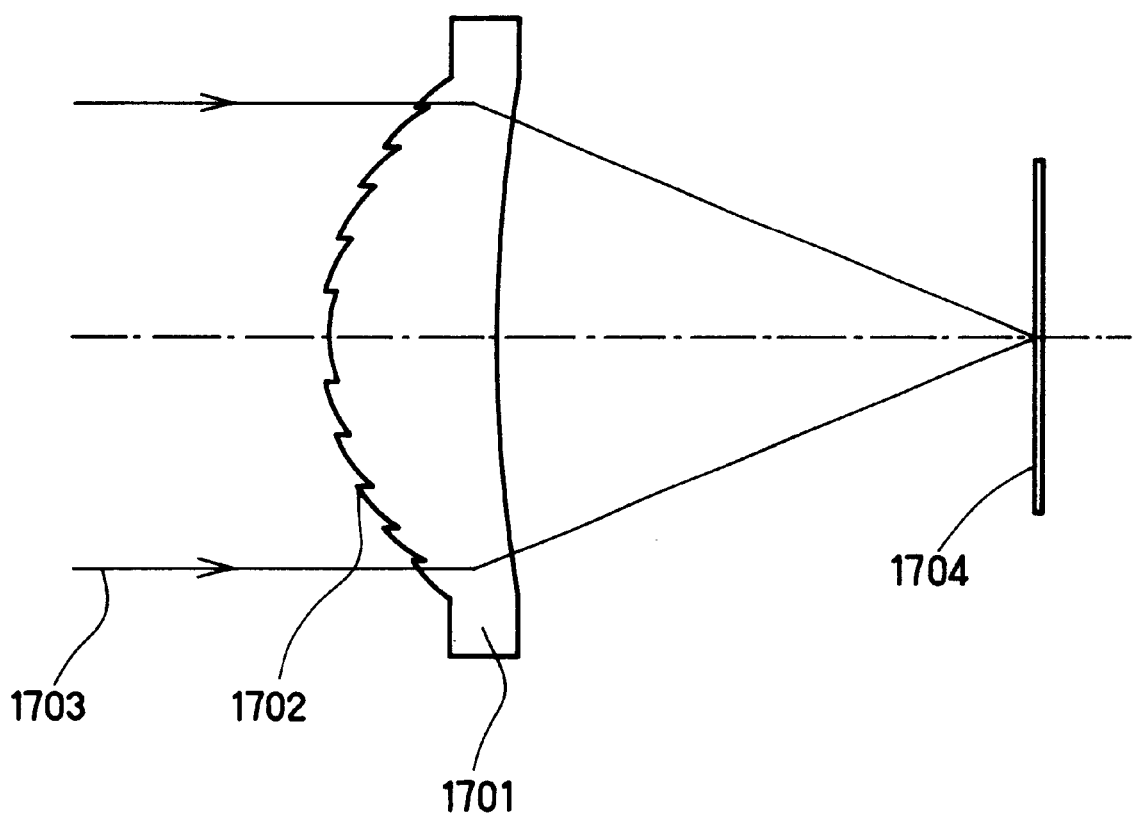
FIG. 21 illustrates an imaging lens according to an eleventh embodiment of the present invention.

FIG. 21 is a structural drawing of an imaging lens according to the present invention. An imaging lens 1701 according to the present invention is a combined refraction/diffraction lens comprising a diffraction lens 1702 of a plurality of concentric grating rings arranged on an ingoing surface of a refraction lens. The lens images an ingoing light beam 1703 on an image plane 1704.

In this lens, the refraction lens and the diffraction lens both have a positive refracting power, and the chromatic aberration of the refraction lens is corrected by the diffraction lens.

The wavelength used in the case of an imaging lens is broad, and it is necessary to consider not only the diffraction efficiency at the principal wavelength $\lambda_1$, but also the diffraction efficiencies at the wavelengths $\lambda_2$ and $\lambda_3$. When the diffraction efficiency deteriorates outside the principal wavelength, the image obtained with that lens tends to flare, which is not desirable.

It is preferable that that factor k of the imaging lens of the present invention satisfies the equation $0.3 \leq k$.

When k is lower than 0.3, then processing with an extremely sharp cutting bit is necessary to obtain a satisfactory diffraction efficiency, which lowers the productivity for manufacturing the lens.

It is even more preferable that the factor k satisfies the equation $0.4 \leq k \leq 0.7$. The lower restriction of this equation is the condition under which a satisfactory diffraction efficiency can be attained in a bright lens with an f number of about 1.5. The upper restriction is the condition for reducing the remaining chromatic aberration to one half of the chromatic aberration of a single refraction lens.

EXAMPLE 13

The following is a comparative discussion of three design examples for a lens with a total focal length of the diffraction lens and the refraction lens of 5 mm, an f number of 1.55 and three different values of k.

For $\lambda_1$, $\lambda_2$, and $\lambda_3$, the visible wavelength region has been considered, and the D line (587.6 nm), the F line (486.1 nm) and the C line (656.3 nm) have been chosen.

Table 12 shows these standard wavelengths for the design and the refractive index of the lens material at these wavelengths.

TABLE 12

| Wavelength (nm) | | Refractive Index |
|---|---|---|
| $\lambda_1$ | 587.6 | 1.524039 |
| $\lambda_2$ | 486.1 | 1.530271 |
| $\lambda_3$ | 656.3 | 1.520983 |
| $v_g$ | | 56.439526 |
| $v_d$ | | −3.452409 |

Tables 13, 14, and 15 show the design for k=0, 0.4, and 0.7. In these tables, the diffraction efficiencies have been calculated for processing with a cutting bit with 10 μm nose radius using a device for calculating diffraction efficiencies of the present invention.

TABLE 13

| Design Parameters | |
|---|---|
| k | 0 |
| $f_g$ | 5.3131153 |
| $f_d$ | 84.842801 |
| Number of Grating Rings | 27 |
| Minimum Pitch | 30.9 μm |

| Diffraction Efficiency | |
|---|---|
| Wavelength | Diffraction Efficiency |
| $\lambda_1$ | 85.5 |
| $\lambda_2$ | 76.9 |
| $\lambda_3$ | 80.9 |

TABLE 14

| Design Parameters | |
|---|---|
| k | 0.4 |
| $f_g$ | 5.1791273 |
| $f_d$ | 144.56557 |
| Number of Grating Rings | 16 |
| Minimum Pitch | 52.7 μm |

| Diffraction Efficiency | |
|---|---|
| Wavelength | Diffraction Efficiency |
| $\lambda_1$ | 91.3 |
| $\lambda_2$ | 80.2 |
| $\lambda_3$ | 87.0 |

TABLE 15

| Design Parameters | |
|---|---|
| k | 0.7 |
| $f_g$ | 5.0879875 |
| $f_d$ | 289.13114 |
| Number of Grating Rings | 8 |
| Minimum Pitch | 105.3 μm |

TABLE 15-continued

Diffraction Efficiency

| Wavelength | Diffraction Efficiency |
|---|---|
| $\lambda_1$ | 92.1 |
| $\lambda_2$ | 80.6 |
| $\lambda_3$ | 87.8 |

If k=0, the number of grating rings is large, and the minimum pitch is small. As a result, a satisfactory diffraction efficiency cannot be attained, even when the lens is processed using a cutting bit with a nose radius of 10 μm.

On the other hand, if k=0.4 is chosen for the design, a favorable diffraction efficiency and a good productivity can be attained when a cutting bit with a nose radius of 10 μm is used. If k=0.7 is chosen, even better results can be obtained.

In this embodiment, the grating ring radius $r_m$ of the m-th grating lens on the diffraction lens can be calculated according to $$r_m = \sqrt{2m\lambda_1 f_d}. \quad (24)$$

As a method for calculating the radius of the grating rings, methods such as using the high imaginary refractive index and other methods are well known. By selecting the focal lengths of the refraction lens and the diffraction lens such that k is within a certain range, a refraction/diffraction achromatic lens with excellent processability and no diminished diffraction efficiency can be designed. This main point of the present invention has of course the same effect when the grating ring radii are designed by another method.

In this embodiment the D line, the F line, and the C line have been chosen for $\lambda_1$, $\lambda_2$, and $\lambda_3$, but other conditions are possible, considering for example the spectral distribution of the object to be imaged, and the sensitivity of the imaging element. Even when different wavelengths are chosen, a design solution that takes both diffraction efficiency and correction of chromatic aberration into account can be attained with a design according to the method of the present invention.

Furthermore, in this example, the diffraction lens was arranged on the ingoing plane of a refraction lens, but the same effect can of course also be attained if a diffraction lens is arranged on the outgoing plane of a lens.

Twelfth Embodiment

The following is an explanation of an imaging lens according to a twelfth embodiment of the present invention, with reference to the accompanying drawings.

Figure 22:
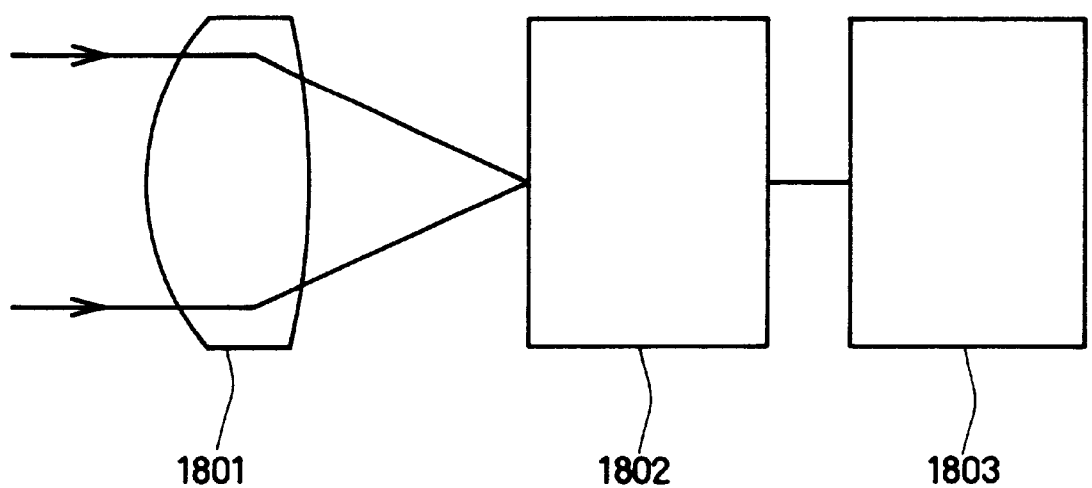
FIG. 22 is a structural drawing of an image pickup device according to a twelfth embodiment of the present invention.

The image pickup device shown in FIG. 22 comprises an imaging lens 1801 according to the present invention, a CCD element 1802, and a signal processing circuit 1803.

The combined refraction/diffraction lens 1801 projects the imaged object onto the CCD element 1802. The CCD element 1802 converts the optical image into electric signals. The electric signals output from the CCD element 1802 are processed into image data by the signal processing circuit 1803.

A lens according to the eleventh embodiment of the present invention is used for the combined refraction/diffraction lens. Therefore, the diffraction efficiency is high, even when the chromatic aberration is eliminated with the diffraction lens, and an image output with little flare can be obtained.

Thirteenth Embodiment

In a lens with diffraction element, the radii of relief rings are determined by calculating positions at which the phase differences are shifted by an integer multiple of 2π (or at which the light path lengths are shifted by an integer multiple of the wavelength) between adjacent rings. In this way, when a plane wave enters the lens with diffraction element, the emergent ray from the lens forms a stairs-like wave front with phases shifting by 2π, but a new phase front is formed by adjacent relief rings and is propagated as a wave having uniform phases. The radii of the relief rings are determined by $$r_m = \sqrt{2m\lambda_1 f_d}, \quad (24)$$

where $r_m$ are the radii of the relief rings, m are the numbers of the rings counted from the center of the lens, $\lambda_1$ is the principal wavelength of the diffraction element, and $f_d$ is the focal length of the grating element.

A lens with a grating element of the thirteenth embodiment in accordance with the present invention is described referring to the drawings in the following.

Figure 23:
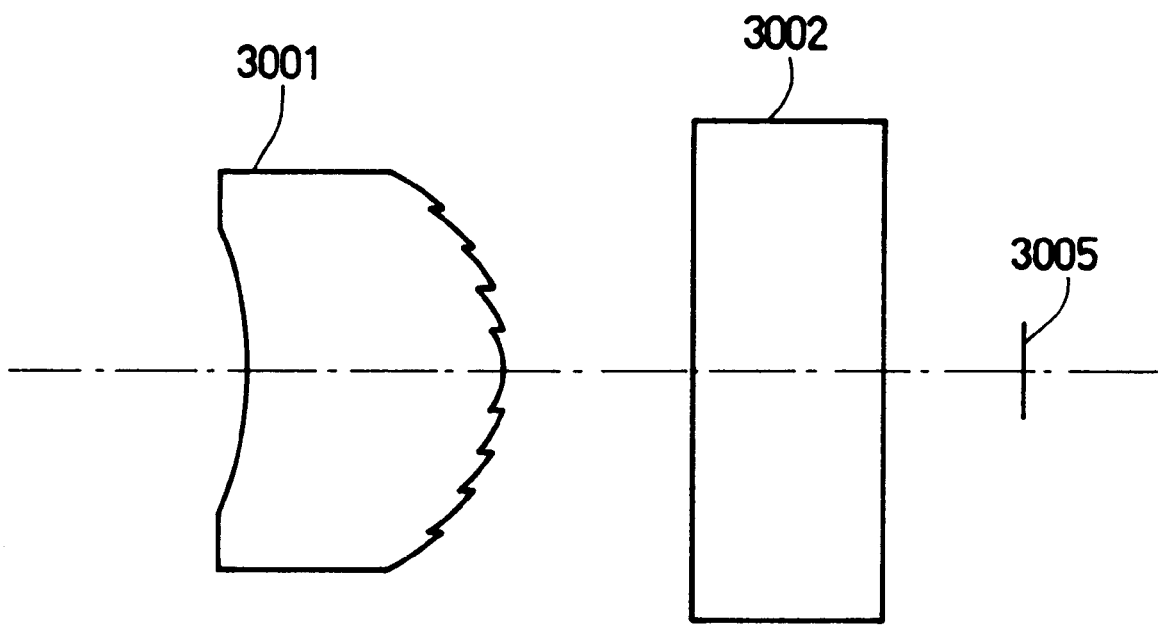
FIG. 23 is a cross sectional view showing the configuration of a lens with a grating element of the thirteenth embodiment in accordance with the present invention.
Figure 24:
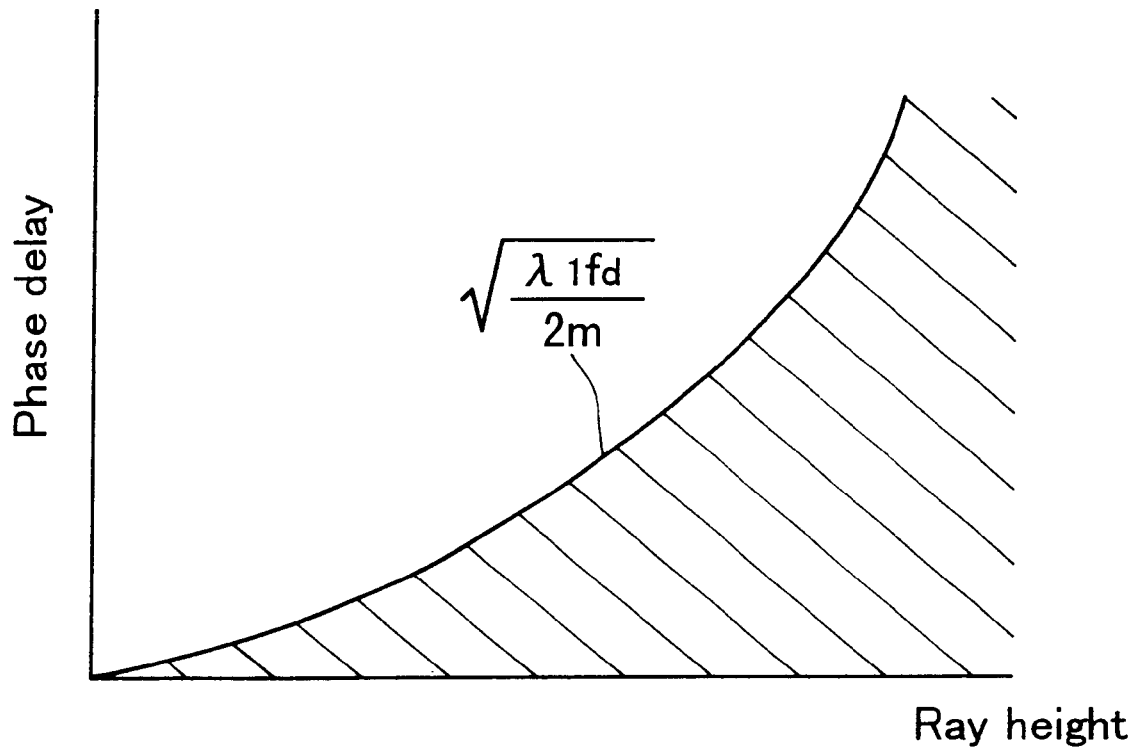
FIG. 24 is a graph showing the relationship between the ray height and the phase delay of the lens with a grating element of the thirteenth embodiment in accordance with the present invention.
Figure 25:
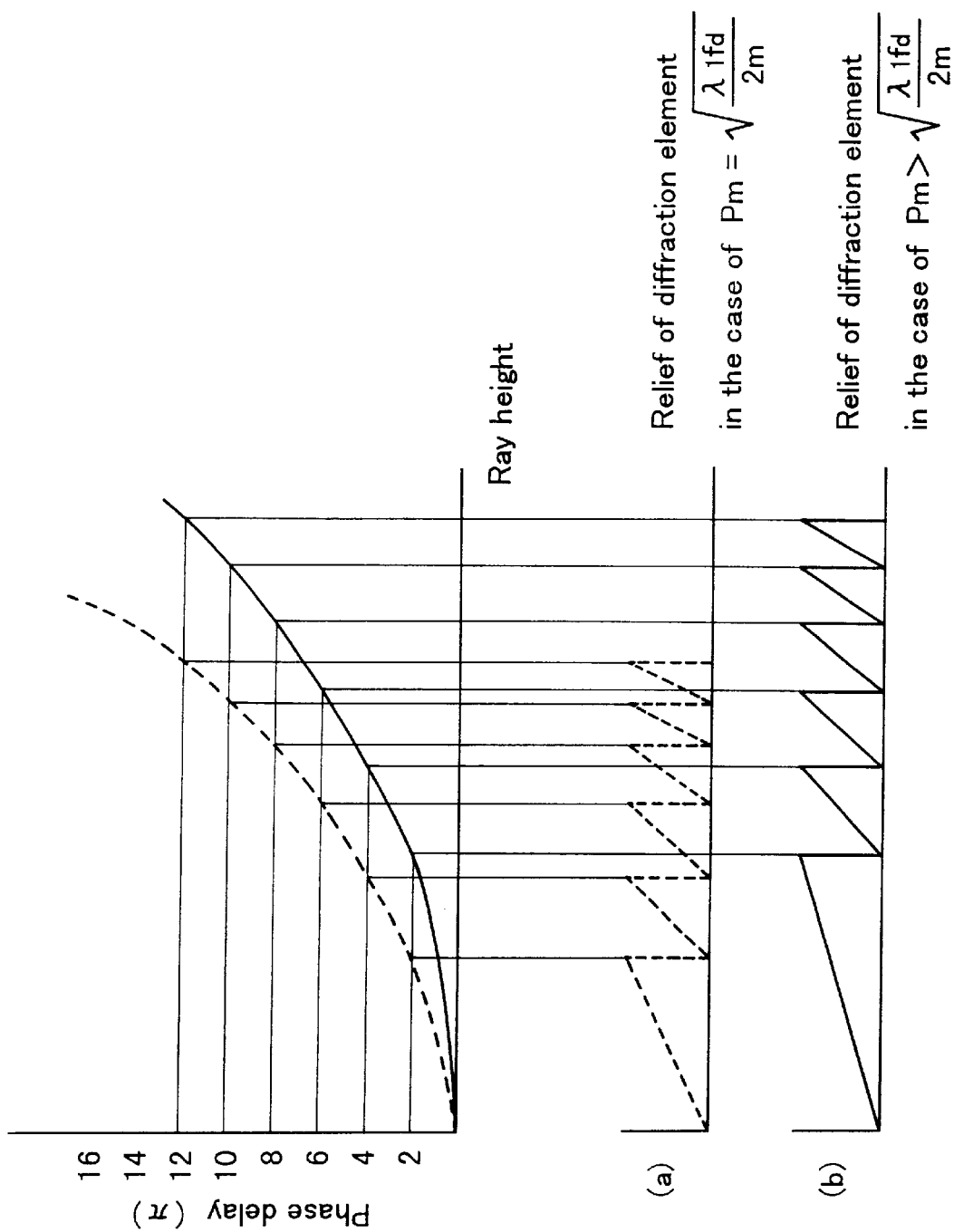
FIG. 25 is a graph showing the relationship between the ray height and the phase delay of the lens with a grating element of the thirteenth embodiment in accordance with the present invention, and a schematic diagram showing a specific relief profile of a diffraction element formed from the graph.

FIG. 23 is a cross sectional view showing the configuration of the lens with a grating element of the thirteenth embodiment. FIG. 24 is a graph showing the relationship between the ray height and the phase delay of the lens with a grating element of the thirteenth embodiment. FIG. 25 illustrates a specific relief profile of the diffraction element: FIG. 25(a) is a schematic diagram showing the relief profile of the diffraction element determined by the above Equation (24), and FIG. 25(b) is a schematic diagram showing the relief profile of the diffraction element of this embodiment.

FIG. 23 shows the lens with a grating element of this embodiment, in which a lens 3001 with grating element, a plate 3002 that is optically equal to a face plate in a crystal filter or an image pickup device etc., and an image surface 3005 are arranged in this order from the object side (left side in the drawing).

In the relief formed on the grating element surface of the lens 3001 with grating element of the thirteenth embodiment in accordance with the present invention, the pitches $P_m$ of the relief satisfy the above-mentioned Equation (7), $$P_m > \sqrt{\frac{\lambda_1 \cdot f_d}{2m}},$$

Where m is the ring number counted from the center of the lens, $f_d$ is the focal length of the grating element, and $\lambda_1$ is the principal wavelength when the grating element is formed. When Equation (7) is satisfied, the curve showing the relationship between the ray height and the phase delay is present in the range as shown in FIG. 24.

When the Equation (7) is met, the relief profile of the diffraction element can be a specific shape as shown in FIG. 25(b), where the relief has larger pitches, and have greatly reduced number of rings compared to a relief profile in the case of $$P_m = \sqrt{\frac{\lambda_1 \cdot f_d}{2m}}$$

as shown in FIG. 25(a). As a result, formation of the grating element surface becomes easy, and decreased diffraction efficiency can be prevented, so that influence of unnecessary scattered light that reflects in an image surface to decrease the imaging performance can be inhibited. If Equation (7) is not satisfied, the number of relief rings is increased, and moreover, the pitches of the relief become smaller, resulting in decreased diffraction efficiency as well as processing difficulties.

Furthermore, the grating element surface preferably has a kinoform profile as shown in FIG. 25, and the lens with a grating element is produced either by glass molding or plastic molding. In this way, a lens with a grating element having a kinoform profile with excellent transcription performance can be achieved.

Furthermore, the lens with a grating element may be made from an infrared absorbing material. By using such a material, influence of unnecessary light in the infrared spectrum generated by the grating element surface being projected on an image pickup device to decrease the imaging performance can be inhibited, so that good imaging performance can be maintained.

Fourteenth Embodiment

Next, a lens with a grating element of the fourteenth embodiment in accordance with the present invention will be described referring to the drawings.

Figure 26:
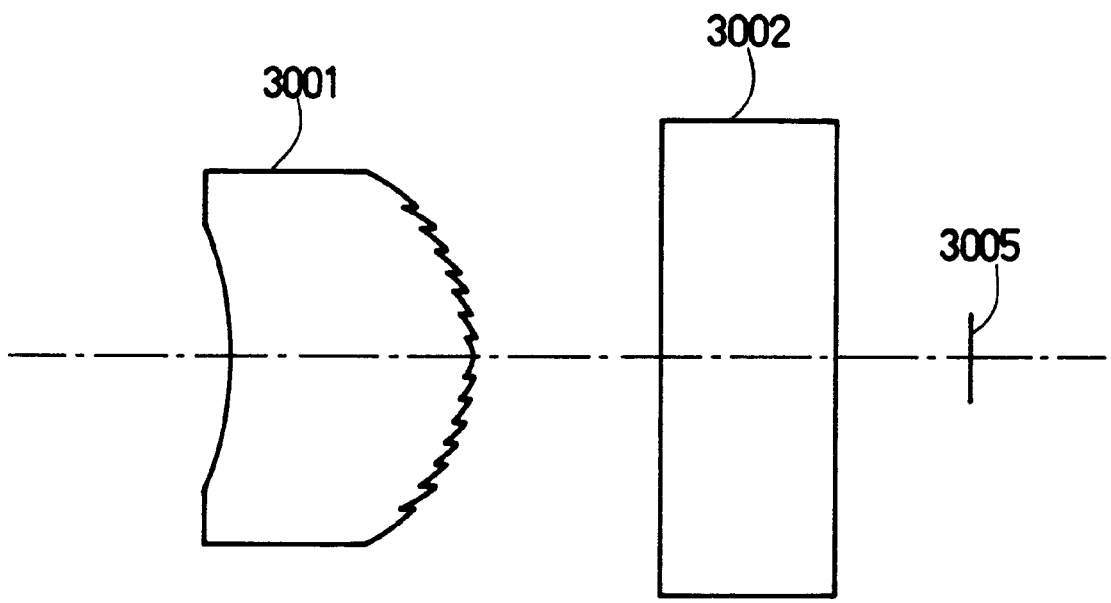
FIG. 26 is a cross sectional view showing the configuration of a lens with a grating element of the fourteenth embodiment in accordance with the present invention.
Figure 27:
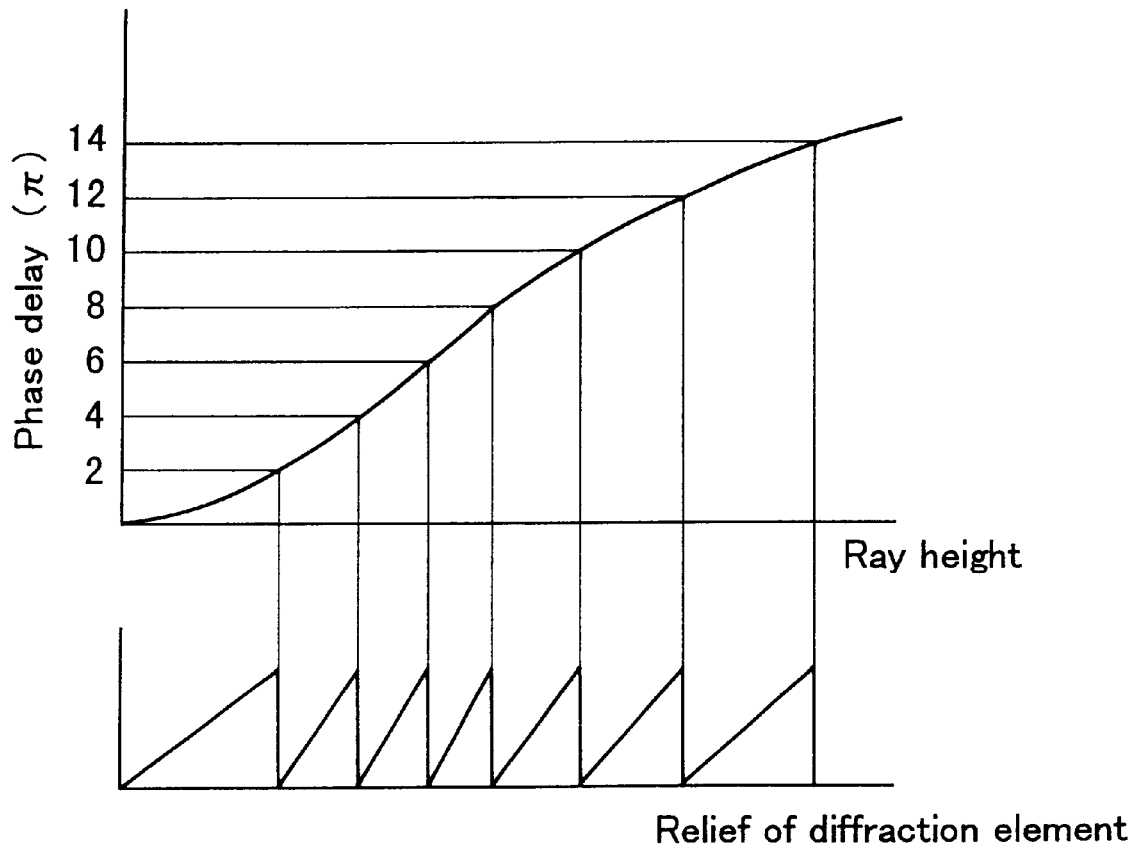
FIG. 27 illustrates a graph showing the relationship between the ray height and the phase delay of the lens with diffraction element of the fourteenth embodiment in accordance with the present invention, and a schematic diagram showing a specific relief profile of a diffraction element formed from the graph.

FIG. 26 is a cross sectional view showing the configuration of the lens with a grating element of the fourteenth embodiment, and FIG. 27 illustrates a graph showing the relationship between the ray height and the phase delay of the lens with a grating element of the fourteenth embodiment and a schematic diagram of a specific relief profile of a diffraction element, which is formed from the graph.

FIG. 26 shows the lens with a grating element of this embodiment, in which a lens 3001 with grating element, a plate 3002 that is optically equal to a face plate in a crystal filter or an image pickup device etc., and an image surface 3005 are arranged in this order from the object side (left side in the drawing).

The shape of the relief formed on the grating element surface of the lens 3001 is derived from the curve showing the relationship between the ray height and the phase delay in FIG. 27, and the relief rings are located at where the phase delay is an integer multiple of $2\pi$. That is, the pitches of the relief gradually decrease up to a certain position away from the optical axis, and gradually increase further away from this position.

In such a configuration, the pitches of the relief at the periphery of the lens can be increased, so that a lens with a grating element which can easily be processed may be achieved. Also, because the pitches of the relief at the periphery of the lens can be increased, decrease in diffraction efficiency can be inhibited. As a result, influence of unnecessary scattered light being projected on an image surface to decrease the imaging performance can be inhibited.

Furthermore, the grating element surface preferably has a kinoform profile as shown in FIG. 27, and the lens with a grating element surface is preferably produced either by glass molding or plastic molding. In this way, a lens with a grating element having a kinoform profile with excellent transcription performance can be achieved.

Furthermore, the lens with a grating element may be made from an infrared absorbing material. By using such a material, influence of unnecessary light in the infrared spectrum generated by the grating element surface being projected on an image pickup device to decrease the imaging performance can be inhibited, so that good imaging performance can be maintained.

Fifteenth Embodiment

Next, a lens with a grating element of the fifteenth embodiment in accordance with the present invention will be described referring to the drawings.

Figure 28:
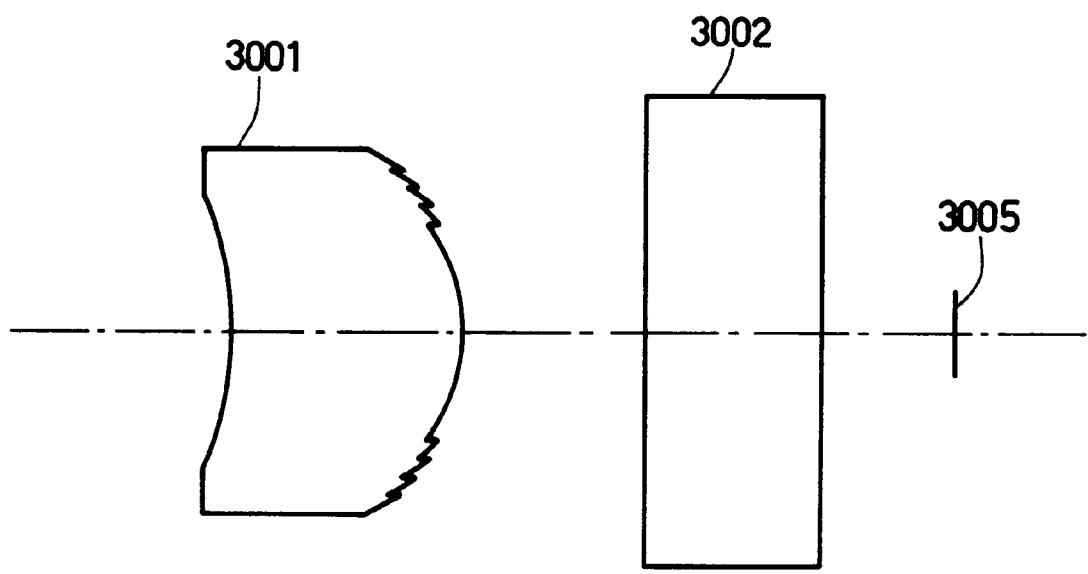
FIG. 28 is a cross sectional view showing the configuration of a lens with a grating element of the fifteenth embodiment in accordance with the present invention.
Figure 29:
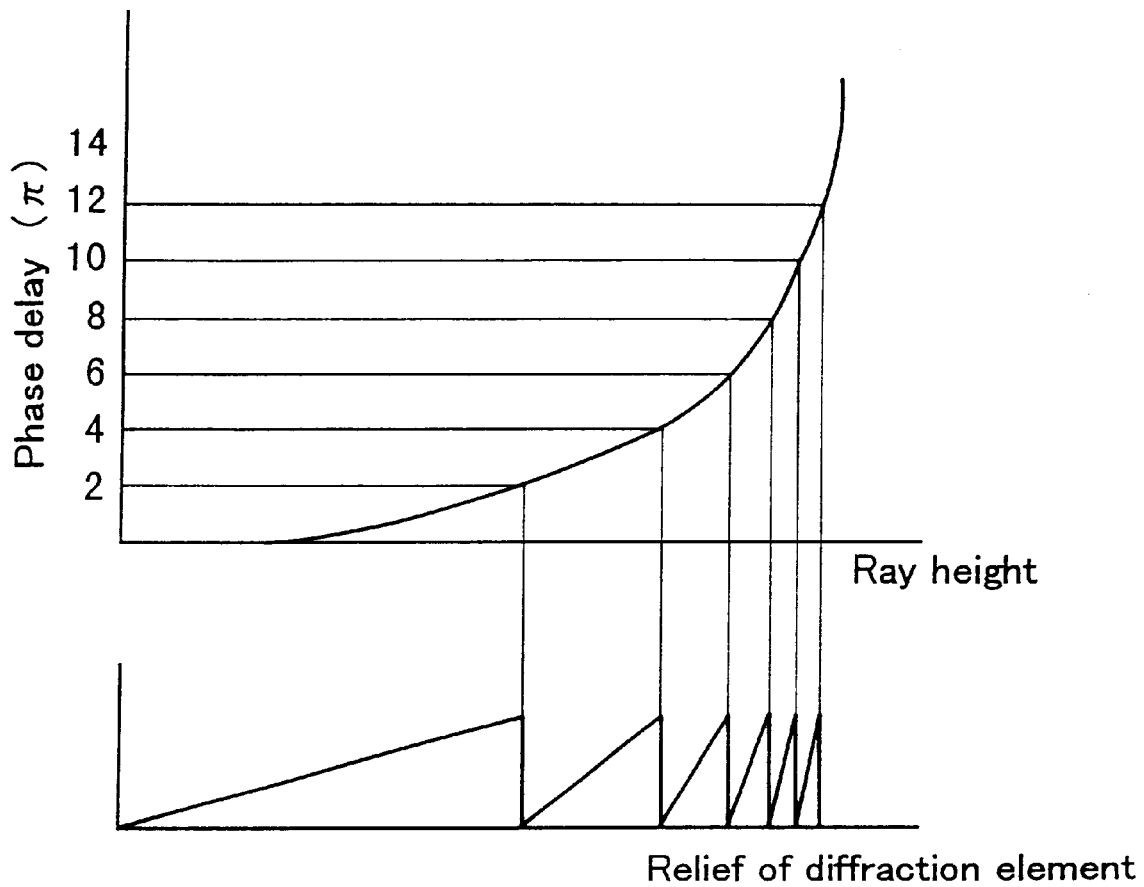
FIG. 29 illustrates a graph showing the relationship between the ray height and the phase delay of the lens with diffraction element of the fifteenth embodiment in accordance with the present invention, and a schematic diagram showing a specific relief profile of a diffraction element formed from the graph.

FIG. 28 is a cross sectional view showing the configuration of the lens with a grating element of the fifteenth embodiment. FIG. 29 illustrates a graph showing the relationship between the ray height and the phase delay of the lens with a grating element of the fifteenth embodiment, and a schematic diagram showing a specific relief profile of a diffraction element, which is made from the graph.

In FIG. 28, the lens with a grating element of this embodiment comprises a lens 3001 with grating element, a plate 3002 optically equal to a face plate in a crystal filter or an image pickup device etc., and an image surface 3005, which are arranged in this order from the object side (left side in the drawing). The shape of the relief formed on the grating element surface of the lens 3001 is lead from the curve showing the relationship between the ray height and the phase delay in FIG. 29. The lens 3001 with grating element of the fifteenth embodiment satisfies the above Equation (8), where r is the effective radius of the grating element surface, and d is the distance of the innermost ring of the relief from the optical axis.

Figure 30:
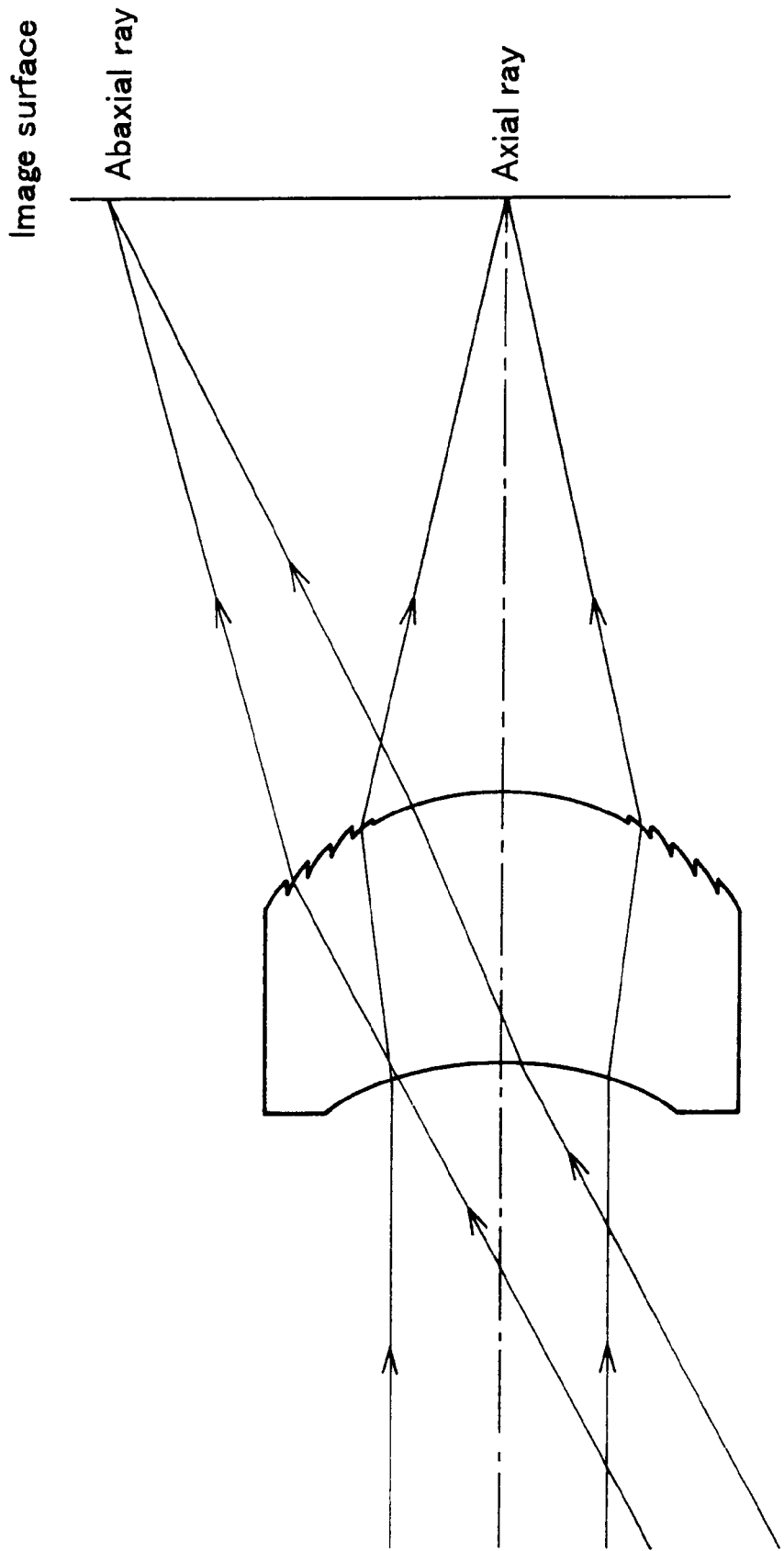
FIG. 30 is a schematic diagram showing the ray paths of axial rays and abaxial rays in the lens with a grating element of the fifteenth embodiment in accordance with the present invention.

By satisfying the Equation (8), the shape of the lens can be particularly effective in correcting lateral chromatic aberration (magnification chromatic aberration), and it is particularly effective in the case of a wide-angle lens having a field angle of at least 60°. That is, in a lens with diffraction element formed by satisfying Equation (8), as is shown in FIG. 30, if an axial ray enters, the diameter of luminous flux hardly includes the relief rings on the diffraction element surface, so that the diffractive effect is small and thus the effect of correcting longitudinal chromatic aberration (axial chromatic aberration) is not obtained. On the other hand, if an abaxial ray enters, a sufficient number of the relief rings are included in the diameter of luminous flux, so that the diffractive effect is large and thus the lateral chromatic aberration can be corrected effectively.

If the upper limit of the above-mentioned equation is exceeded, lateral chromatic aberration cannot be corrected sufficiently. If the lower limit of the equation is exceeded, excess correction of longitudinal chromatic aberration may result in order to correct lateral chromatic aberration sufficiently, so that good imaging performance cannot be obtained. In addition, the number of the relief rings also increases, resulting in decrease in diffraction efficiency.

Furthermore, the grating element surface preferably has a kinoform profile as shown in FIG. 29, and the lens having the grating element surface is preferably produced either by glass molding or plastic molding. In this way, a lens with a grating element having a kinoform profile with excellent transcription performance can be achieved.

Furthermore, the above-mentioned lens with a grating element may be made from an infrared absorbing material. By using such a material, influence of unnecessary light in the infrared spectrum generated by the grating element surface being projected on an image pickup device to decrease the imaging performance can be inhibited, so that good imaging performance can be maintained.

Sixteenth Embodiment

Next, the configuration of an imaging apparatus of the sixteenth embodiment of the present invention will be described referring to the drawings.

Figure 31:
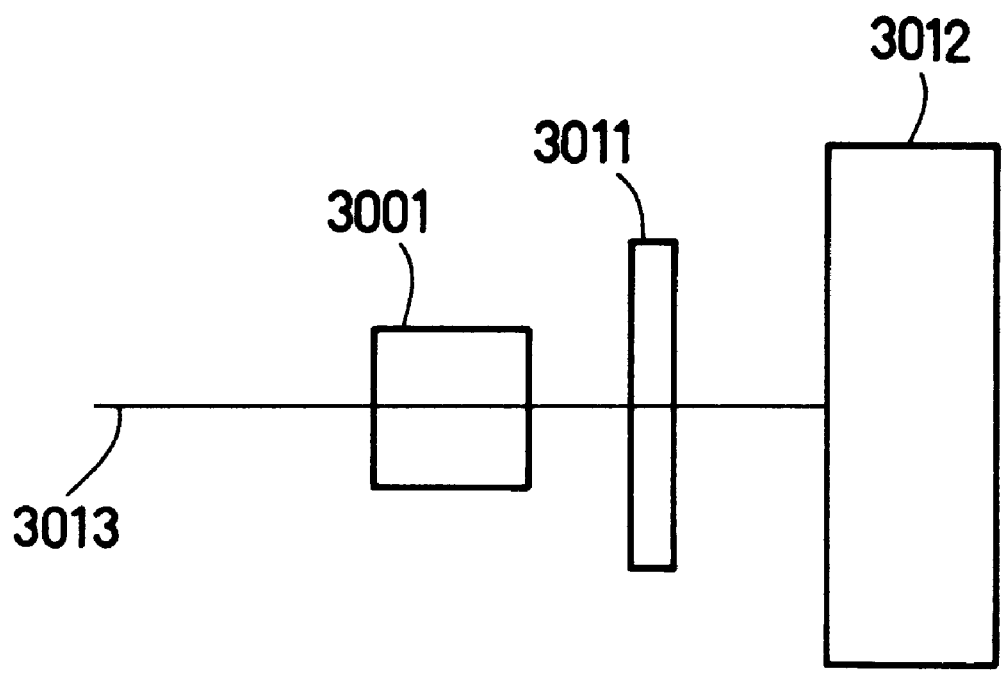
FIG. 31 is a schematic diagram showing the configuration of an imaging apparatus of the sixteenth embodiment in accordance with the present invention.

The imaging apparatus shown in FIG. 31 comprises a lens 3001 with grating element in accordance with the present invention, an image pickup device 3011 and a signal processing circuit 3012. The numeral 3013 designates an optical axis.

As the lens with a grating element, one of the thirteenth to fifteenth embodiments in accordance with the present invention is used. The lenses with grating element of these embodiments in accordance with the present invention have a small size and are easily produced, and are thus suitable for making a very low-priced, small size imaging apparatus.

Thus, by making an imaging apparatus using the lens with a grating element of the present invention, the size of the entire apparatus can be made smaller than a conventional apparatus, and a very low-priced, small size imaging apparatus having a good imaging performance can also be obtained.

Seventeenth Embodiment

Next, the configuration of a reading apparatus of the seventeenth embodiment of the present invention will be described referring to the drawings.

Figure 32:
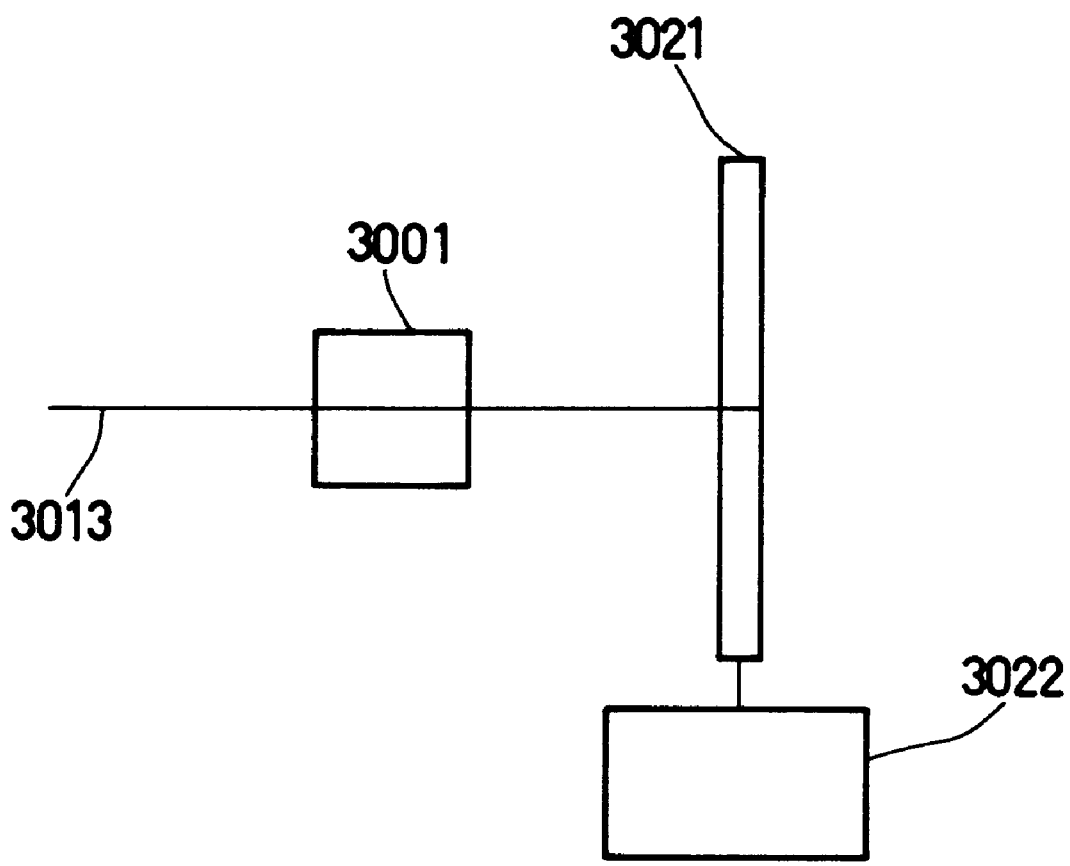
FIG. 32 is a schematic diagram showing the configuration of a reading apparatus of the seventeenth embodiment in accordance with the present invention.

The reading apparatus shown in FIG. 32 comprises a lens 3001 with grating element in accordance with the present invention, an image sensor 3021, and a signal processing circuit 3022. The numeral 3013 refers to an optical axis.

As the lens with a grating element, one of the thirteenth to fifteenth embodiments in accordance with the present invention is used. In the lenses with grating element of these embodiments in accordance with the present invention, chromatic aberration is excellently corrected over a wide range of wavelength. In addition, these lenses have a large field angle and also have a smaller size than a conventional optical system, thus being suitable for constituting a small size reading apparatus.

Accordingly, by constituting a reading apparatus using the lens with a grating element of the present invention, the size of the entire reading apparatus can be smaller than that of a conventional apparatus, and a very low-priced reading apparatus having a good imaging performance can also be obtained.

Second Invention

The second invention will be further described in detail referring to the following embodiments. First, a method of designing a grating element of the present invention will be described.

A grating element is an optical element utilizing the phenomenon of diffraction. While a refraction element has a high refractive index for short wavelengths, the grating element has a higher diffractive angle for longer wavelengths. Therefore, the effect of the grating element for chromatic aberration becomes opposite to that of a refraction element. The dispersion of the grating element is determined depending on the band of the wavelength used, and generally, in the case of color images, the band of the wavelength required for photographing is in the range of about 430 nm to 630 nm. In this range, the dispersion of the grating element becomes negative. When this grating element is combined with a refraction element having a positive refractive power, then achromatism can be achieved by using a grating element having a positive refractive power.

We used the high refractive index method proposed by William C.

Sweatt (see "Describing Holographic Optical Elements as Lenses", Journal of Optical Society of America, Vol. 67, No. 6, June 1977) as a specific method for designing the grating element. The method indicates that the effect of a grating element to a light ray can be displaced by refraction of a hypothetical high refractive index, and when the refractive index becomes infinite, the refraction element completely corresponds to the grating element. However, because an infinite refractive index cannot be defined in actual designing, it must be set to a certain value. In the following, the error between the high refractive index method and the actual diffractive grating will be explained.

Figure 40:
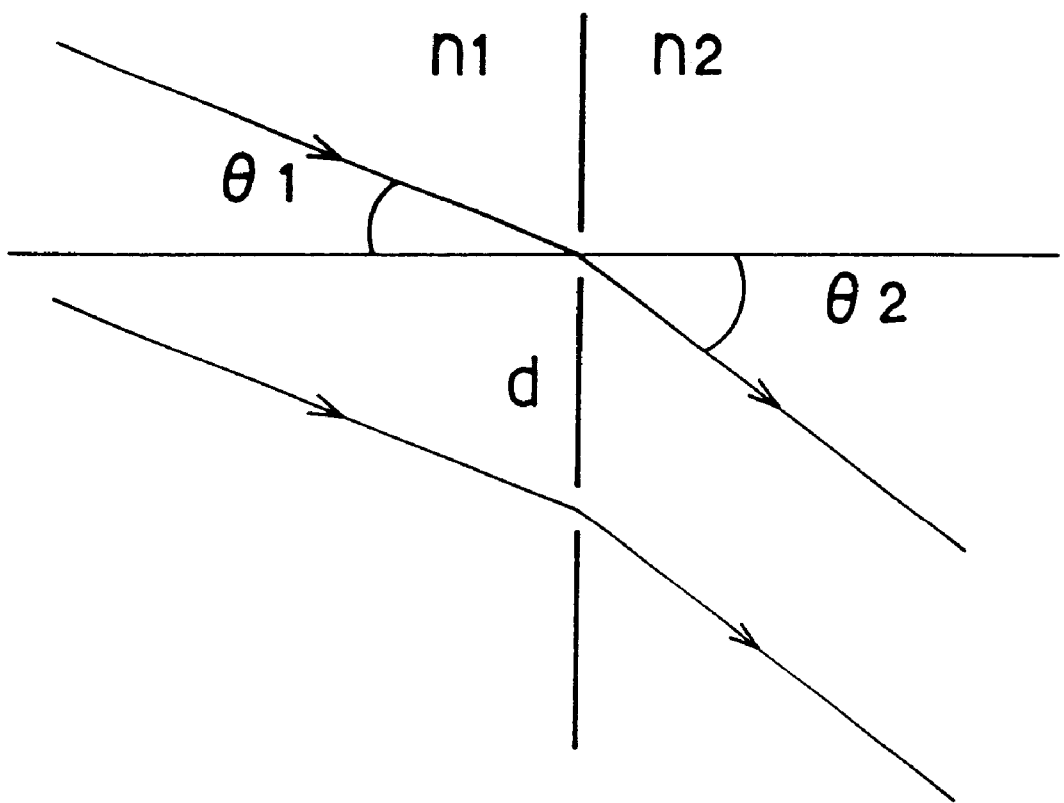
FIG. 40 is a drawing for explaining the error analysis of Sweatt's model.
Figure 41:
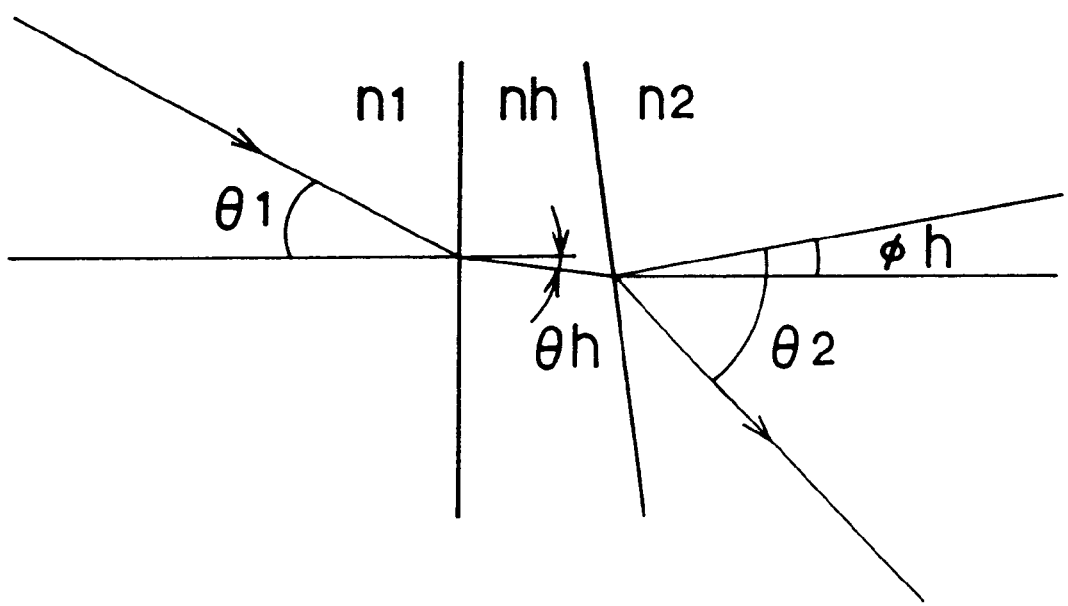
FIG. 41 is another drawing for explaining the error analysis of Sweatt's model.

FIGS. 40 and 41 show the error analysis of the Sweatt's model. The diffraction (see FIG. 40) can be found using the equation $$n_1 \sin\theta_1 - n_2 \sin\theta_2 = \lambda/d. \tag{25}$$

On the other hand, because the refraction (see FIG. 41) takes place twice, at a first surface and at a second surface, Snell's law applies twice. The first application of Snell's law is expressed by the equation $$n_1 \sin\theta_1 = n_h \sin\theta_h, \tag{26}$$

and the second application of Snell's law is expressed by the equation $$n_h \sin(\theta_h + \phi_h) = n_2 \sin\theta_2. \tag{27}$$

If we suppose $\theta_h \ll 1$, then the difference between the two outgoing radiation angles becomes $\lambda/dn_h$ according to the above equations (25) to (27). The error $\Delta$ of the ray position on the image surface is expressed by the equation $$\Delta = \lambda \cdot f / d \cdot n_h, \tag{28}$$

where f is the focal length of the lens.

According to this equation, if the wavelength is 550 nm, the focal length f=5 mm, the pitch of the grating is 20 $\mu$m, and the high refractive index $n_h$=5501, the error $\Delta$ of the ray position on the image surface becomes $\Delta$=0.025 $\mu$m. This is less than one tenths of the value that should be considered in designing, and thus it is of no problem. Thus, in the case of designing by the high refractive index method, the refractive index was set ten times the wavelength plus one. One is added because if a first order diffracted light is used, the pitch of the grating is determined at every height of $\lambda/(n-1)$. That is, if the refractive index n=10$\lambda$+1, the pitches may be etched at every 0.1 nm. This is convenient because the number of grating rings can be determined readily by calculating the sag of the high refractive index layer. For example, if the sag of the high refractive index layer is 2.5 nm, the number of grating rings is 25. However, for the actual number of grating rings, the refracted direction of the ray also has to be considered, so the number of grating rings cannot be calculated correctly, if only the sag measured vertically to the surface is considered, but it is useful for approximation.

Eighteenth Embodiment

In the following, an optical system for reading of the eighteenth embodiment in accordance with the present invention will be described referring to FIGS. 33 and 35.

Figure 33:
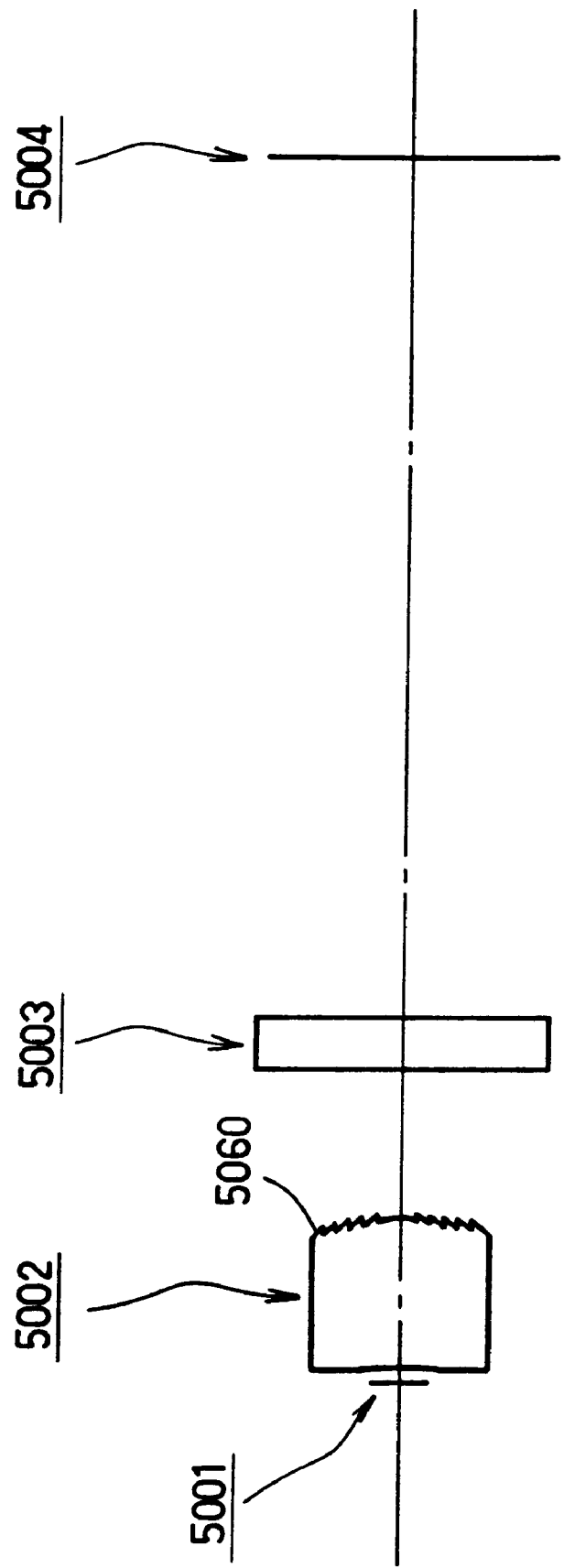
FIG. 33 is a cross sectional view showing one example of an optical system for reading of the eighteenth embodiment in accordance with the present invention.
Figure 35:
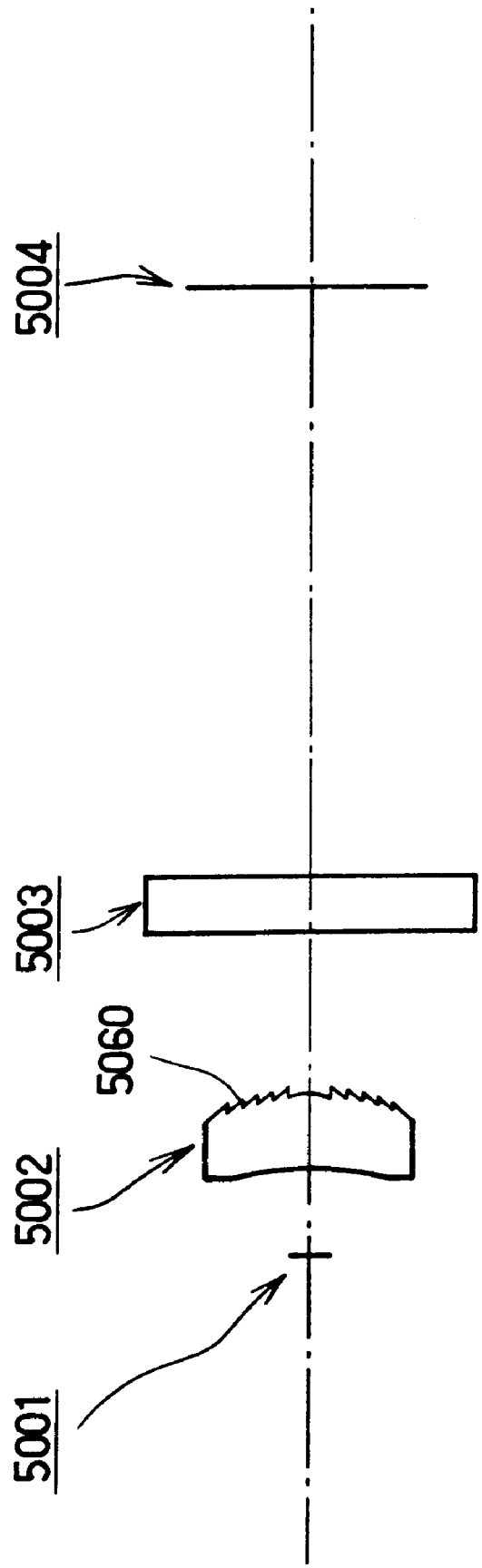
FIG. 35 is a cross sectional view showing another example of the optical system for reading of the eighteenth embodiment in accordance with the present invention.

FIGS. 33 and 35 are cross sectional views showing the configuration of the lenses in the optical system for reading of the Examples 14 and 15 respectively, which are specific numerical examples of the eighteenth embodiment.

As shown in FIGS. 33 and 35, the optical system for reading according to this embodiment comprises a diaphragm 5001, a lens 5002, and a flat plate 5003 that is optically equal to a face plate in an image pickup device, which are arranged in this order from the object side (left side in the drawing). The numeral 5004 designates an image surface in FIGS. 33 and 35.

The lens 5002 constituting this optical system for reading has a convex image side surface, and a grating element surface 5060 having a positive refractive power is formed on the image side surface. In addition, the object side surface of the lens 5002 is an aspheric surface with a local radius of curvature that becomes smaller with increasing distance from the optical axis.

Figure 42:
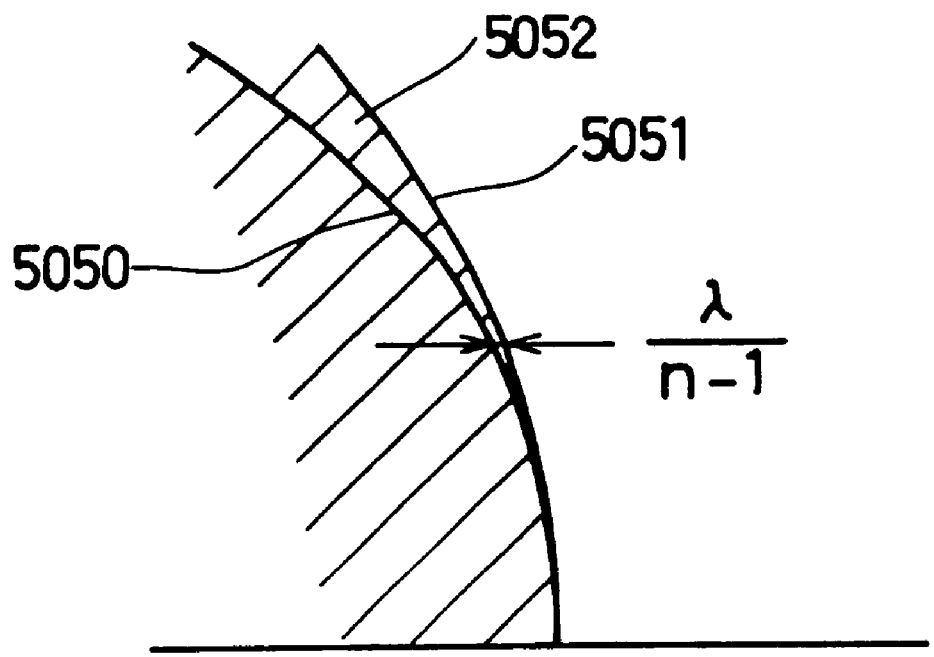
FIG. 42 is an expanded sectional view of the image side surface of a lens before it is converted to a grating element surface.
Figure 43:
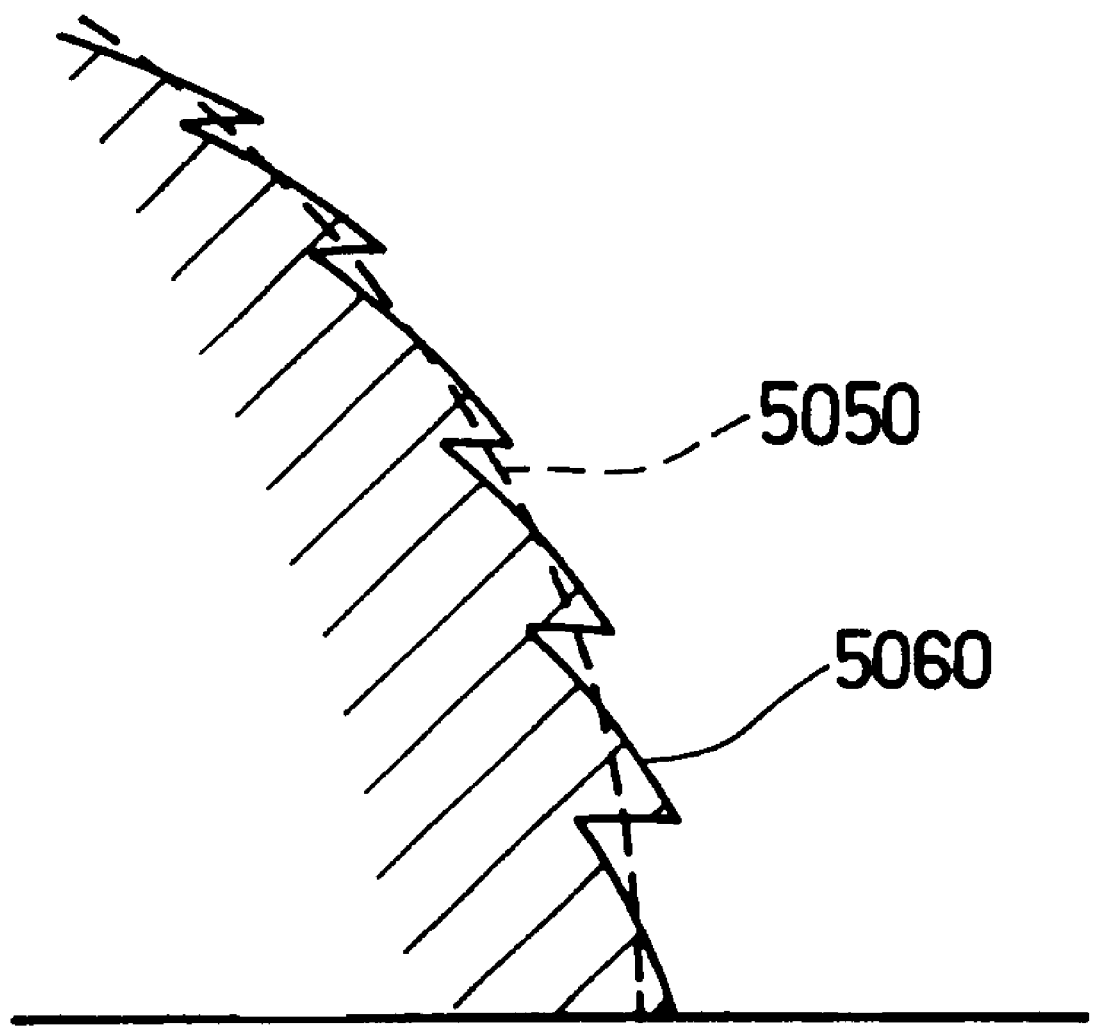
FIG. 43 is an expanded sectional view of a grating element surface formed by converting the lens surface shown in FIG. 42.

The numerical values shown for the image side surface of the lens 5002 in the later described examples are the values before conversion into the grating element surface 5060, and the grating element surface 5060 is formed based on these numerical values. To be specific, at the time of design, as shown in FIG. 42, it is assumed that the image side surface has a base aspheric surface 5050 (the third surface having a radius $r_3$ of curvature at the vertex in Examples 14 and 15), a high refractive index surface 5051 (the second surface having a radius $r_2$ of curvature at the vertex in Examples 14 and 15) located on the base surface, and a high refractive index portion 5052 between the two surfaces. Then, in order to obtain the same effects as this image side surface comprising the base aspheric surface 5050 and the high refractive index surface 5051, they are converted to the grating element surface 5060 as shown in FIG. 43 by the above-mentioned method.

Figure 44:
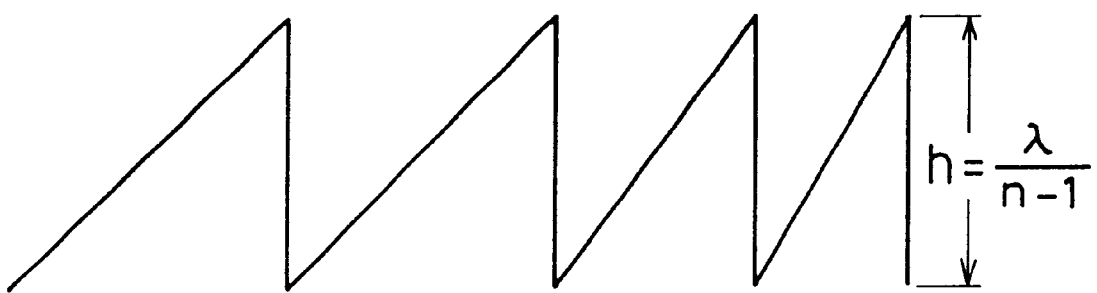
FIG. 44 is an expanded sectional view showing a kinoform profile of a grating element surface.

The grating element surface 5060 has a kinoform profile as shown in FIG. 44, and the lens 5002 having the grating element surface 5060 is formed either by glass molding or plastic molding. Thus, an optical system for reading having a kinoform profile with excellent transcription performance can be achieved.

Furthermore, by making the lens 5002 having the grating element surface 5060 from an infrared absorbing material such as an infrared ray insulating glass etc., an optical system for reading having a kinoform profile with excellent transcription performance, in which unnecessary light in the infrared spectrum generated by the grating element surface 5060 is prevented from being projected on an image sensor to decrease the imaging performance, and thus ensuring good imaging performance, can be achieved.

In this embodiment, the following effects can be obtained by satisfying the equations $$0.05<|r_2/r_1|<0.5, \qquad (9)$$

$$9<f/D<16, \qquad (10)$$

and $$0.05<|f/f_d|<0.15, \qquad (11)$$

where $r_1$ is the radius of curvature at the vertex of the object side surface of the lens 5002 (the first surface), $r_2$ is the radius of curvature at the vertex of the image side surface, D is the diameter of the diaphragm 5001, f is the focal length of the entire optical system, and $f_d$ is the focal length of the grating element surface 5060.

First, by satisfying Equation (9) above, an optimal lens shape in balance of all the aberrations can be obtained. If it does not fall in the range of Equation (9), the incident angle of an abaxial ray is increased, and as a result, abaxial performance or diffraction efficiency to an abaxial ray decreases, and flare is generated. Moreover, if the radius $r_2$ of curvature at the vertex of the image side surface becomes small, lens production becomes more difficult, and this may become a factor in decreasing yield and rising cost.

Then, by satisfying Equation (10) above, sufficient depth of field to prevent loss of image information or erroneous recognition of code information due to vibration etc. can be obtained. If it does not fall in the range of Equation (10), sufficient brightness for reading image information or code information may not be obtained, or sufficient depth of field may not be obtained, thus causing loss of image information or erroneous recognition of code information.

Then, by satisfying Equation (11) above, chromatic aberration can be excellently corrected. If it does not fall in the range of Equation (11), chromatic aberration is not corrected sufficiently, or is corrected excessively, so that good imaging performance is difficult to obtain.

Furthermore, as mentioned above, by providing at least one surface of the lens 5002 with an aspheric shape with local radius of curvature that becomes smaller with increasing distance from the optical axis, distortion aberration and curvature of field can be corrected effectively.

Furthermore, unnecessary scattered light generated by the grating element surface 5060 can be prevented from being projected on an image sensor so as to decrease the image performance by satisfying the equation $$450\ nm<\lambda_1<600\ nm, \qquad (12)$$

where $\lambda_1$ is the principal wavelength when the grating element surface 5060 is formed.

If it does not fall in the range of Equation (12), unnecessary scattered light becomes strong to the sensitivity for wavelength of the image sensor, and flare is generated.

Furthermore, in the optical system for reading, miniaturization of the optical system for reading can be achieved by satisfying the Equation $$0.2<y/Y<0.6, \qquad (13)$$

where Y is the maximum height of a manuscript and y is the maximum height of an image sensor.

However, if it does not fall in the range of Equation (13), the distance between the object and the image increases. In addition, distortion aberration and curvature of field are deteriorated, so that good imaging performance cannot be obtained, or only a part of a desired reading size of a manuscript can be read, so that operation and response performances are deteriorated.

Furthermore, by making the meridional image surface to have a better imaging performance than the sagittal image surface in the optical system for reading, the precision of the reading code information can be enhanced, so that erroneous recognition can be prevented.

In the following, Examples 14 and 15 are given as specific numerical examples of this embodiment. In these Examples, f is the total focal length of the entire system, $F_{no}$ is the f number, and $2\omega$ is the field angle. In these Examples, $r_1$, $r_2$ and $r_3$ designate the radius of curvature at the vertex of the object side lens surface (the first surface), the radius of curvature at the vertex of the high refractive index surface of the image side surface (the second surface), and the radius of curvature at the vertex of the base aspheric surface of the image side surface (the third surface), respectively; $d_1$, $d_2$ and $d_3$ represent the distance between the diaphragm 5001 and the first surface of the lens 5002, the distance between the first surface and the second surface (the thickness of the lens), and the distance between the second surface and the third surface, respectively; and n and v are the refractive index and the Abbe number of the lens material for d-ray respectively. The surface having an aspheric shape (marked with an asterisk ☆ in the column "Surface No." in the Examples) is ruled by the following equation $$Z = \frac{cy^2}{1+\sqrt{1-(1+k)c^2y^2}} + Dy^4 + Ey^6 + Fy^8 + Gy^{10}, \qquad (29)$$

with

Z: The sag at the height y from the optical axis y: Height from the optical axis c: Curvature at the vertex of an aspheric surface k: Conical constant D, E, F and G: Aspheric coefficients.

In the following, specific numerical values of Example 14 are given. In this Example, the high refractive surfaces that have been designed by the high refractive index method are marked with a circle (○) in the column "Surface No."

EXAMPLE 14 f=24.4
$F_{no}$=15.2, 2ω=50.0
Y=25.0, y=10.5

| Surface No. | r | d | n | ν |
|---|---|---|---|---|
| Diaphragm | | $d_1$ = 0.5 | | |
| 1 ☆ | $r_1$ = −13.2300 | $d_2$ = 5.0 | 1.5240 | 56.7 |
| 2 ☆ ○ | $r_2$ = −7.60302 | $d_3$ = 0.0 | 5877 | −3.45 |
| 3 ☆ | $r_3$ = −7.60300 | | | |

The surfaces marked with ☆ are aspheric surfaces, and the aspheric coefficients thereof are given below.

| | First Surface | Second Surface | Third Surface |
|---|---|---|---|
| k | 0.0 | 0.0 | 0.0 |
| D | −1.23566 × 10$^{-3}$ | 1.17662 × 10$^{-4}$ | 1.17649 × 10$^{-4}$ |
| E | 6.16012 × 10$^{-4}$ | −1.94690 × 10$^{-6}$ | −1.94714 × 10$^{-6}$ |
| F | 0.0 | 0.0 | 0.0 |
| G | 0.0 | 0.0 | 0.0 |

Figure 34:
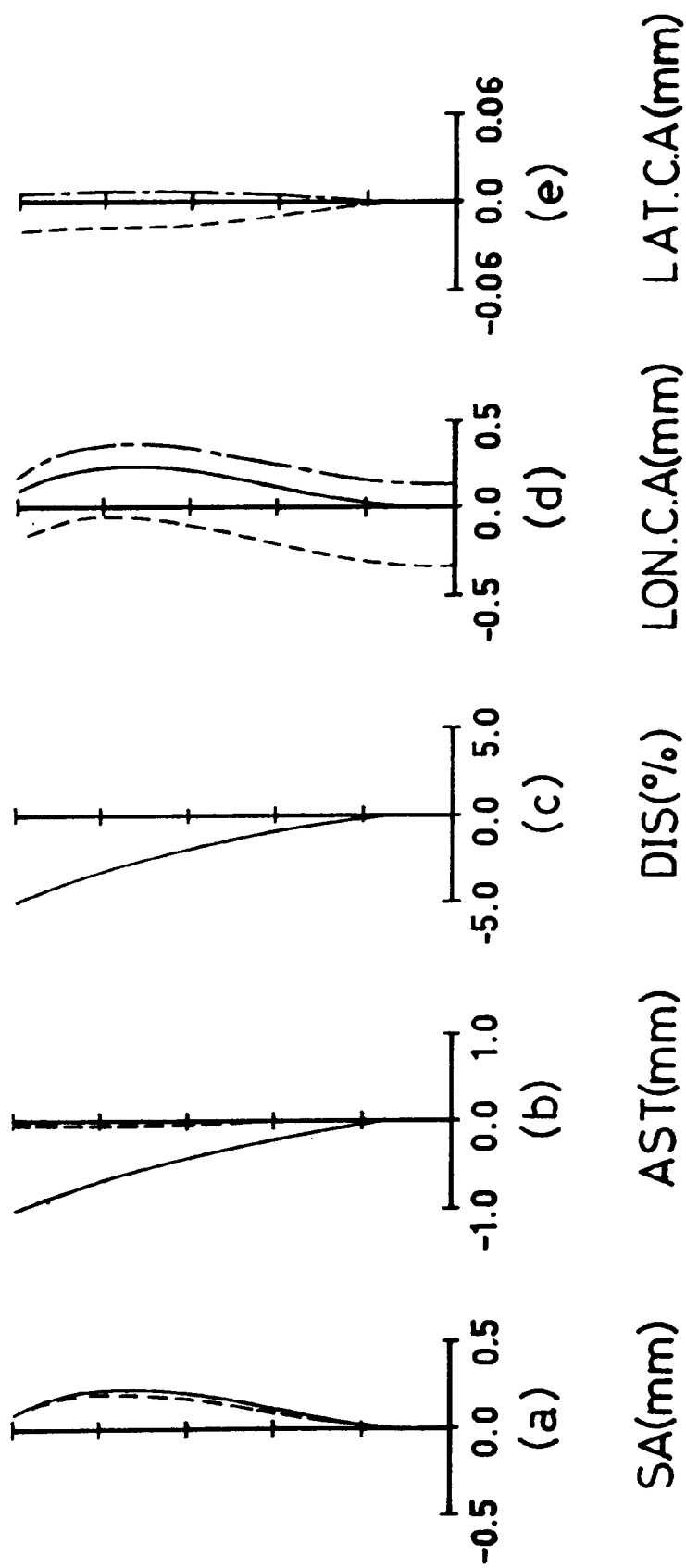
FIGS. 34a–e shows drawings of various aberrations of the optical system for reading in FIG. 33.

FIG. 34 shows the aberrations in an optical system for reading according to the above Example 14.

In FIGS. 34, (a), (b), (c), (d) and (e) denote spherical aberration (mm), astigmatism (mm), distortion aberration (%), longitudinal chromatic aberration (mm), and lateral chromatic aberration (mm), respectively. In FIG. 34(a), which shows spherical aberration, the solid line is the value for d-ray, and the broken line is the sine condition. In FIG. 34(b), which shows astigmatism, the solid line is the curvature of the sagittal image surface, and the broken line is the curvature of the meridional image surface. In FIG. 34(d), which shows longitudinal chromatic aberration, the solid line is the values for d-ray, the broken line is the value for F-ray, and the alternate long and short dash line is the value for C-ray. In FIG. 34(e), which shows lateral chromatic aberration, the broken line is the value for F-ray, and the alternate long and short dash line is the value for C-ray. As is evident from these diagrams, according to this Example, chromatic aberration is excellently corrected and an optical system for reading that displays good imaging performance can be attained.

In the following, specific numerical values are given for Example 15.

EXAMPLE 15 f=17.0
$F_{no}$=10.4, 2ω=56.5
Y=32.5, y=10.5

| Surface No. | r | d | n | ν |
|---|---|---|---|---|
| Diaphragm | | $d_1$ = 2.8 | | |
| 1 ☆ | $r_1$ = −11.5083 | $d_2$ = 2.6 | 1.5298 | 55.7 |
| 2 ☆ ○ | $r_2$ = −5.63147 | $d_3$ = 0.0 | 5877 | −3.45 |
| 3 ☆ | $r_3$ = −5.63145 | | | |

The surfaces marked with ☆ are aspheric surfaces, and the aspheric coefficients thereof are given below.

| | First Surface | Second Surface | Third Surface |
|---|---|---|---|
| k | 0.0 | 0.0 | 0.0 |
| D | −2.01753 × 10$^{-3}$ | −1.35383 × 10$^{-4}$ | −1.35410 × 10$^{-4}$ |
| E | 5.50497 × 10$^{-4}$ | −8.57270 × 10$^{-6}$ | −8.57284 × 10$^{-6}$ |
| F | −1.17212 × 10$^{-4}$ | −2.27625 × 10$^{-7}$ | −2.27024 × 10$^{-7}$ |
| G | 5.67473 × 10$^{-6}$ | −1.49093 × 10$^{-7}$ | −1.49150 × 10$^{-7}$ |

Figure 36:
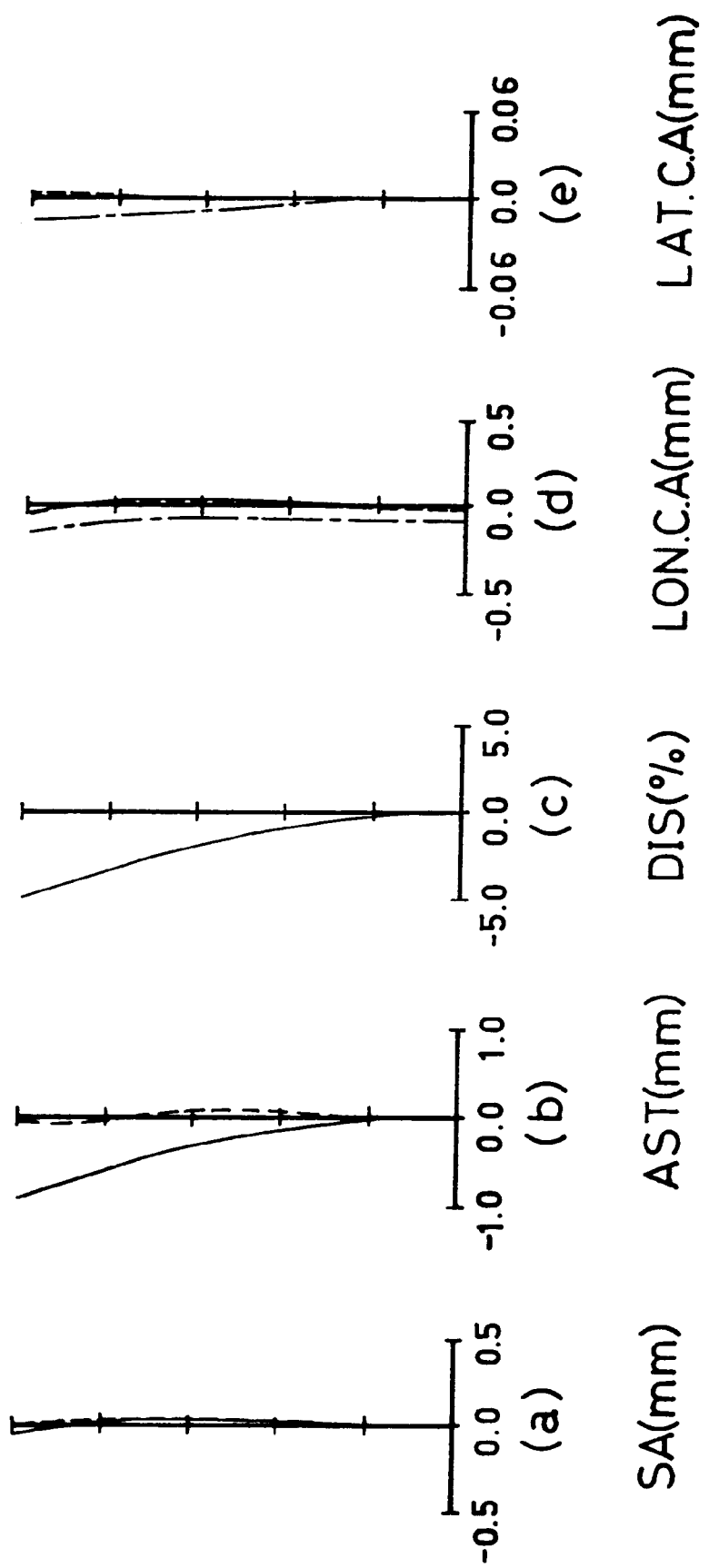
FIGS. 36a–e shows drawings of various aberrations of the optical system for reading in FIG. 35.

FIG. 36 shows the aberrations in an optical system for reading according to Example 15.

In FIGS. 36, (a), (b), (c), (d) and (e) denote spherical aberration (mm), astigmatism (mm), distortion aberration (%), longitudinal chromatic aberration (mm), and lateral chromatic aberration (mm), respectively. In FIG. 36(a), which shows spherical aberration, the solid line is the value for d-ray, and the broken line is the sine condition. In FIG. 36(b), which shows astigmatism, the solid line is the curvature of the sagittal image surface, and the broken line is the curvature of the meridional image surface. In FIG. 36(d), which shows longitudinal chromatic aberration, the solid line is the value for d-ray, the broken line is the value for F-ray, and the alternate long and short dash line is the value for C-ray. In FIG. 36(e), which shows lateral chromatic aberration, the broken line is the value for F-ray, and the alternate long and short dash line is the value for C-ray. As is evident from these diagrams, according to this Example, chromatic aberration is excellently corrected and an optical system for reading that displays good imaging performance can be attained.

Having described an optical system for reading in which a grating element surface is formed on the image side surface of the lens 5002 as an example in this embodiment, the present invention is not limited to this configuration, and the grating element surface may be formed on the object side surface of the lens 5002.

Nineteenth Embodiment

In the following, an optical system for reading of the nineteenth embodiment in accordance with the present invention will be described referring to FIG. 37.

Figure 37:
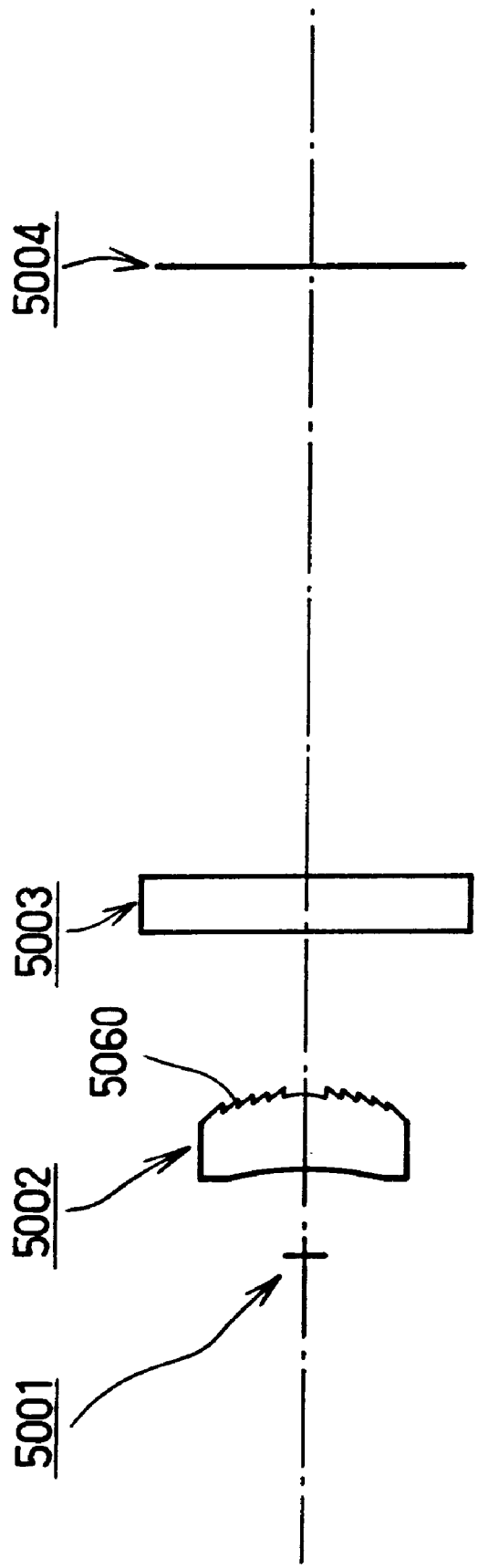
FIG. 37 is a cross sectional view showing one example of an optical system for reading of the nineteenth embodiment in accordance with the present invention.

FIGS. 37 is a cross sectional view showing the configuration of the lens in the optical system for reading of Example 16, which is a specific numerical example of the nineteenth embodiment.

As shown in FIG. 37, the optical system for reading according to this embodiment comprises a diaphragm 5001, a lens 5002, and a plate 5003 optically equal to a face plate in an image pickup device, which are arranged in this order from the object side (left side in the drawing), and it can read manuscripts of different sizes as it is moved on the optical axis by a driving device not shown in the drawing. The numeral 5004 designates an image surface in FIG. 37.

The lens 5002 constituting this optical system for reading has a convex image side surface, and also is an aspheric surface with a local radius of curvature that becomes smaller with increasing distance from the optical axis. In addition, in the lens 5002, a grating element surface 5060 having a positive refractive power is formed on the image side surface.

The numerical values shown for the image side surface of the lens 5002 as described later in Example 16 are the values before conversion into the grating element surface 5060, and the grating element surface 5060 is formed based on these numerical values. To be specific, at the time of designing, as shown in FIG. 42, it is assumed that the image side surface has a base aspheric surface 5050 (the third surface having a radius $r_3$ of curvature at the vertex in Example 16), a high refractive index surface 5051 (the second surface having a radius $r_2$ of curvature at the vertex in Example 16) located on the base surface, and a high refractive index portion 5052 between the two surfaces. Then, in order to obtain the same effects as this image side surface comprising the base aspheric surface 5050 and the high refractive index surface 5051, they are converted to the grating element surface 5060 as shown in FIG. 43 by the above-mentioned method.

The grating element surface 5060 has a kinoform profile as shown in FIG. 44, and the lens 5002 having the grating element surface 5060 is formed either by glass molding or plastic molding. Thus, an optical system for reading having a kinoform profile with excellent transcription performance can be achieved.

Furthermore, by making the lens 5002 having the grating element surface 5060 from an infrared absorbing material, an optical system for reading having a kinoform profile with excellent transcription performance, in which unnecessary scattered light generated by the grating element surface 5060 is prevented from being projected on an image sensor to decrease the imaging performance, and thus ensuring good imaging performance, can be achieved.

In this embodiment, the following effects can be obtained by satisfying the equations $$0.05<|r_2/r_1|<0.5, \tag{9}$$

$$9<f/D<16, \tag{10}$$

and $$0.05<|f/f_d|<0.15, \tag{11}$$

where $r_1$ is the radius of curvature at the vertex of the object side surface of the lens 5002 (the first surface), $r_2$ is the radius of curvature at the vertex of he image side surface, D is the diameter of the diaphragm 5001, f is the focal length of the entire optical system, and $f_d$ is the focal length of the grating element surface 5060.

First, by satisfying Equation (9) above, an optimal lens shape in balance of various aberrations can be obtained. However, if it does not fall in the range of Equation (9), the incident angle of an abaxial ray is increased, and as a result, abaxial performance or diffraction efficiency to an abaxial ray decreases, and flare is generated. Furthermore, if the radius $r_2$ of curvature at the vertex of the image side surface is small, lens production becomes difficult, so that yield is decreased and also production cost is increased.

Then, by satisfying Equation (10) above, sufficient depth of field so as to prevent loss of image information or erroneous recognition of code information due to vibration etc. can be obtained. However, if it does not fall in the range of Equation (10), sufficient brightness for reading image information or code information may not be obtained, or sufficient depth of field may not be obtained, causing loss of image information or erroneous recognition of code information.

Then, by satisfying Equation (11) above, chromatic aberration can be excellently corrected. If it does not fall in the range of Equation (11), chromatic aberration is not corrected sufficiently or is corrected excessively, so that good imaging performance is difficult to obtain.

Furthermore, as mentioned above, by making at least one surface of the lens 5002 to be an aspheric shape with a local radius of curvature that becomes smaller with increasing distance from the optical axis, distortion aberration and curvature of field can be corrected effectively.

Furthermore, unnecessary scattered light generated by the grating element surface 5060 can be prevented from being projected on an image sensor so as to decrease the image performance by satisfying the equation $$450 \text{ nm}<\lambda_1<600 \text{ nm}, \tag{12}$$

where $\lambda_1$ is the principal wavelength when the grating element surface 5060 is formed.

If it does not fall in the range of Equation (12), unnecessary scattered light becomes too strong to the sensitivity for wavelength of the image sensor, and flare is generated.

Furthermore, in the optical system for reading, miniaturization of the optical system for reading can be achieved by satisfying the equation $$0.2<y/Y<0.6, \tag{13}$$

where Y is the maximum height of a manuscript and y is the maximum height of an image sensor.

If it does not fall in the range of Equation (13), the distance between the object and the image increases. In addition, distortion aberration and curvature of field are deteriorated so that good imaging performance cannot be obtained, or only a part of a desired reading size of manuscript can be read, so that operation and response performances are deteriorated.

Furthermore, in the optical system for reading, a small size optical system for reading having a good imaging performance can be achieved by satisfying the equation $$0.6<Y_t/Y_W<1, \tag{14}$$

where $Y_W$ is the maximum height of a manuscript when the optical system for reading is moved closest to the object side, and $Y_t$ is the maximum height of a manuscript when the optical system for reading is moved closest to the image side.

If it does not fall in the range of Equation (14), the amount of movement of the lens increases, so that miniaturization of the apparatus cannot be attained, and also a good imaging performance cannot be obtained.

Furthermore, by making the meridional image surface have better imaging performance than the sagittal image surface in the optical system for reading, precision of reading code information can be enhanced, so that erroneous recognition can be prevented.

In the following, Examples 16 is given as a specific numerical example of this embodiment. In this Example, f is the total focal length of the entire system, $F_{no}$ is the f number, and 2ω is the field angle. In this Example, $r_1$, $r_2$ and $r_3$ designate the radius of curvature at the vertex of the object side lens surface (the first surface), the radius of curvature at the vertex of the high refractive index surface of the image side surface (the second surface), and the radius of curvature at the vertex of the base aspheric surface of the image side surface (the third surface), respectively; $d_1$, $d_2$ and $d_3$ represent the distance between the diaphragm 5001 and the first surface of the lens 5002, the distance between the first surface and the second surface (the thickness of the lens), and the distance between the second surface and the third surface, respectively; and n and ν are the refractive index and the Abbe number of the lens material for d-ray, respectively. The surface having an aspheric shape (marked with an asterisk ☆ in the column "Surface No." in the Example) is ruled by the following equation $$Z = \frac{cy^2}{1 + \sqrt{1 - (1+k)c^2y^2}} + Dy^4 + Ey^6 + Fy^8 + Gy^{10}, \qquad (29)$$

with

Z: The sag at the height y from the optical axis
y: Height from the optical axis
c: Curvature at the vertex of an aspheric surface
k: Conical constant
D, E, F and G: Aspheric coefficients.

In the following, specific numerical values of Example 16 are given.

In this Example, the high refractive surfaces that have been designed by the high refractive index method are marked with a circle (○) in the column "Surface No."

EXAMPLE 16 f=17.2
$F_{no}$=10.4, 2ω=55.4 to 52.7

| Surface No. | r | d | n | ν |
|---|---|---|---|---|
| Position of Manuscript Diaphragm | | (variable) $d_1$ = 2.8 | | |
| 1 ☆ | $r_1$ = −11.6748 | $d_2$ = 2.6 | 1.5298 | 55.7 |
| 2 ☆ ○ | $r_2$ = −5.71453 | $d_3$ = 0.0 | 5877 | −3.45 |
| 3 ☆ | $r_3$ = −5.71451 | | | |

| | d |
|---|---|
| Yw = 25.0 | 51.0 |
| Yt = 32.5 | 62.4 |

The surfaces marked with ☆ are aspheric surfaces, and the aspheric coefficients thereof are given below.

| | First Surface | Second Surface | Third Surface |
|---|---|---|---|
| k | 0.0 | 0.0 | 0.0 |
| D | −2.06110 × 10$^{-3}$ | −1.29557 × 10$^{-4}$ | −1.29590 × 10$^{-4}$ |
| E | 5.32089 × 10$^{-4}$ | −7.96984 × 10$^{-6}$ | −7.96763 × 10$^{-6}$ |
| F | −1.22456 × 10$^{-4}$ | −2.04872 × 10$^{-7}$ | −2.04907 × 10$^{-7}$ |
| G | 8.67146 × 10$^{-6}$ | −1.30728 × 10$^{-7}$ | −1.30735 × 10$^{-7}$ |

Figure 38:
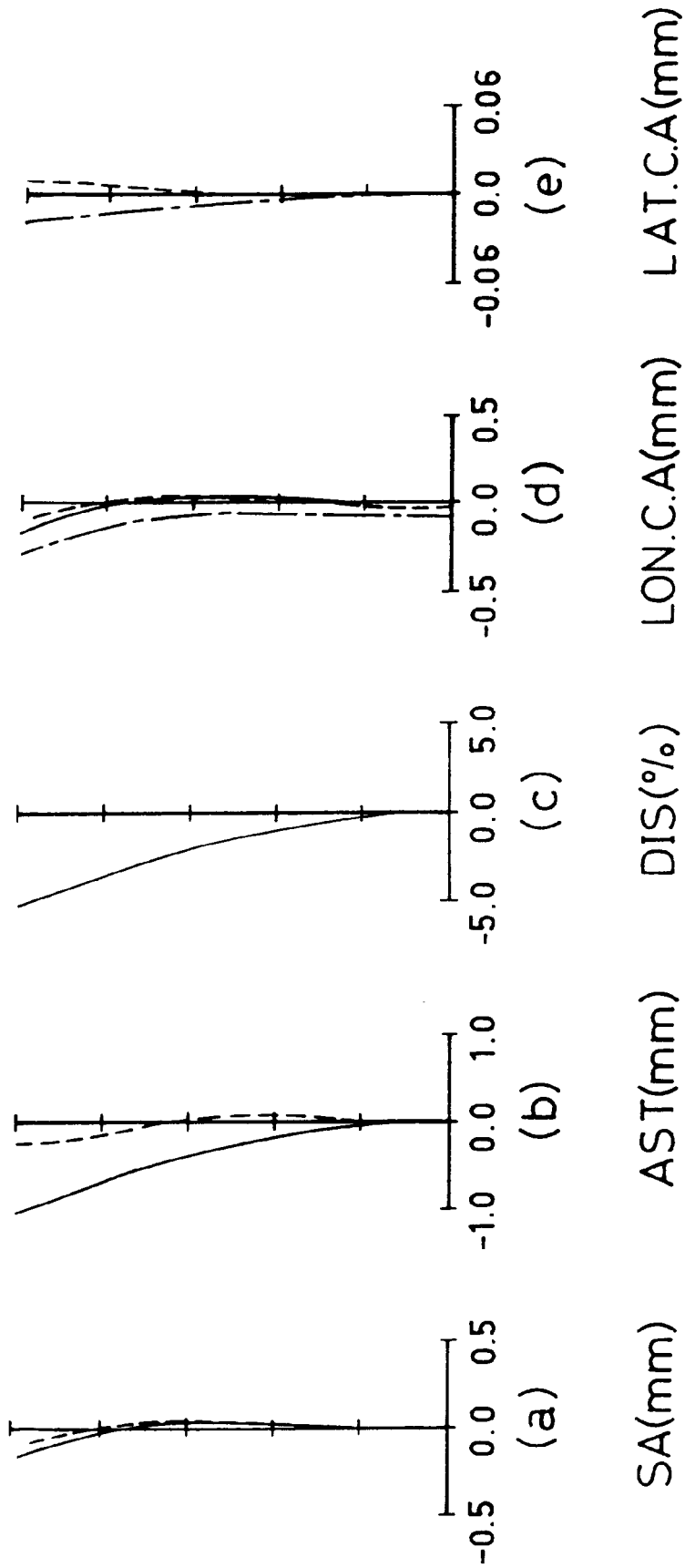
FIGS. 38a–e shows drawings of various aberrations when the optical system for reading in FIG. 37 is moved closest to the object side.
Figure 39:
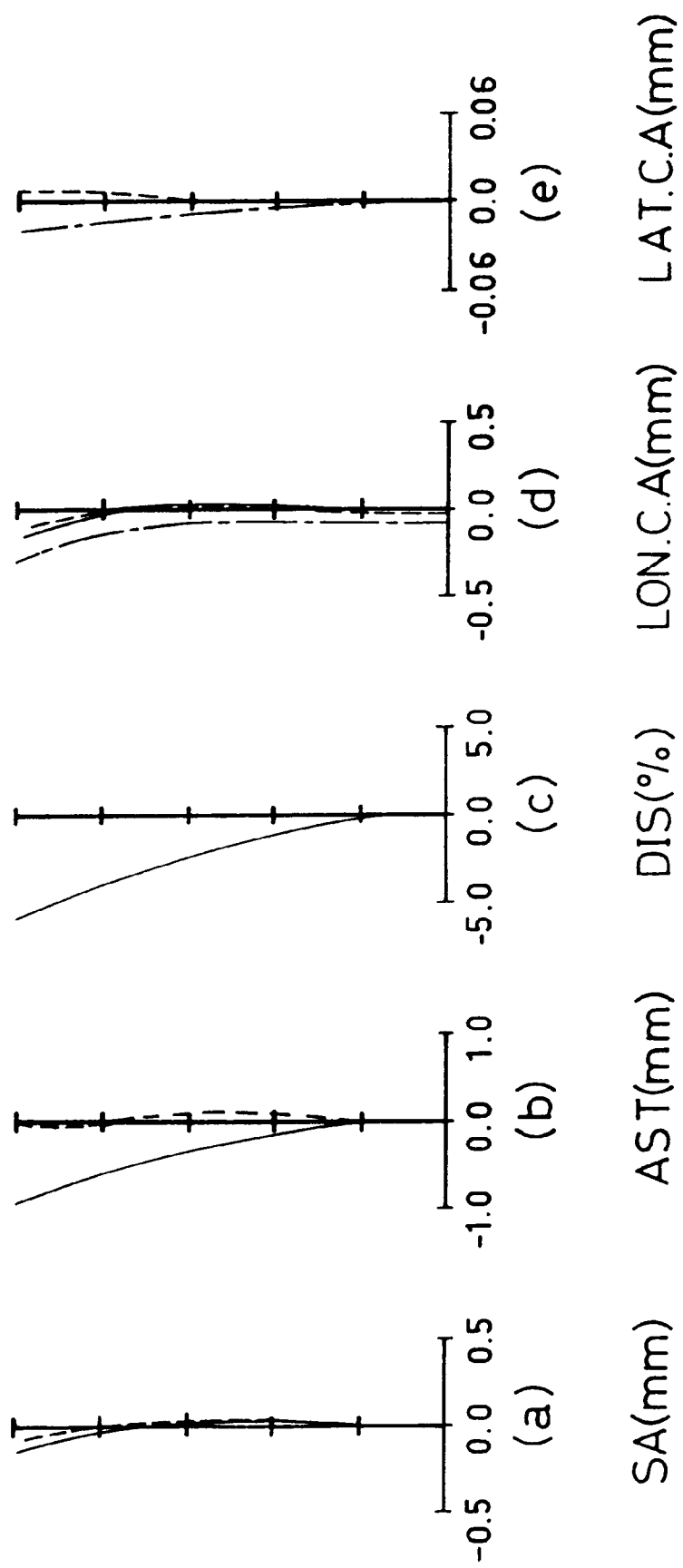
FIGS. 39a–e shows drawings of various aberrations when the optical system for reading in FIG. 37 is moved closest to the image side.

FIGS. 38 and 39 show the aberrations in an optical system for reading according to this Example 16.

FIG. 38 shows drawings of the aberrations when the optical system for reading is moved closest to the object side, and FIG. 39 shows drawings of the aberrations when the optical system for reading is moved closest to the image side. In FIGS. 38 and 39, (a), (b), (c), (d) and (e) denote spherical aberration (mm), astigmatism (mm), distortion aberration (%), longitudinal chromatic aberration (mm), and lateral chromatic aberration (mm) respectively. In the FIG. 38(a) and FIG. 39(a), each of which shows spherical aberration, the solid line is the value for d-ray, and the broken line is the sine condition. In the FIG. 38(b) and FIG. 39(b), each of which shows astigmatism, the solid line is the curvature of the sagittal image surface, and the broken line is the curvature of the meridional image surface. In FIG. 38(d) and FIG. 39(d), each of which shows longitudinal chromatic aberration, the solid line is the value for d-ray, the broken line is the value for F-ray, and the alternate long and short dash line is the value for C-ray. In FIG. 38(e) and FIG. 39(e), each of which shows lateral chromatic aberration, the broken line is the value for F-ray, and the alternate long and short dash line is the value for C-ray. As is evident from these diagrams, according to this Example, chromatic aberration is excellently corrected and an optical system for reading that displays good imaging performance can be attained.

Having described an optical system for reading in which a grating element surface is formed on the image side surface of the lens 5002 as an example in this embodiment, the present invention is not limited to this configuration, and the grating element surface may be formed on the object side surface of the lens 5002.

Twentieth Embodiment

Next, an image reading apparatus of the twentieth embodiment in accordance with the present invention will be described referring to FIG. 45.

Figure 45:
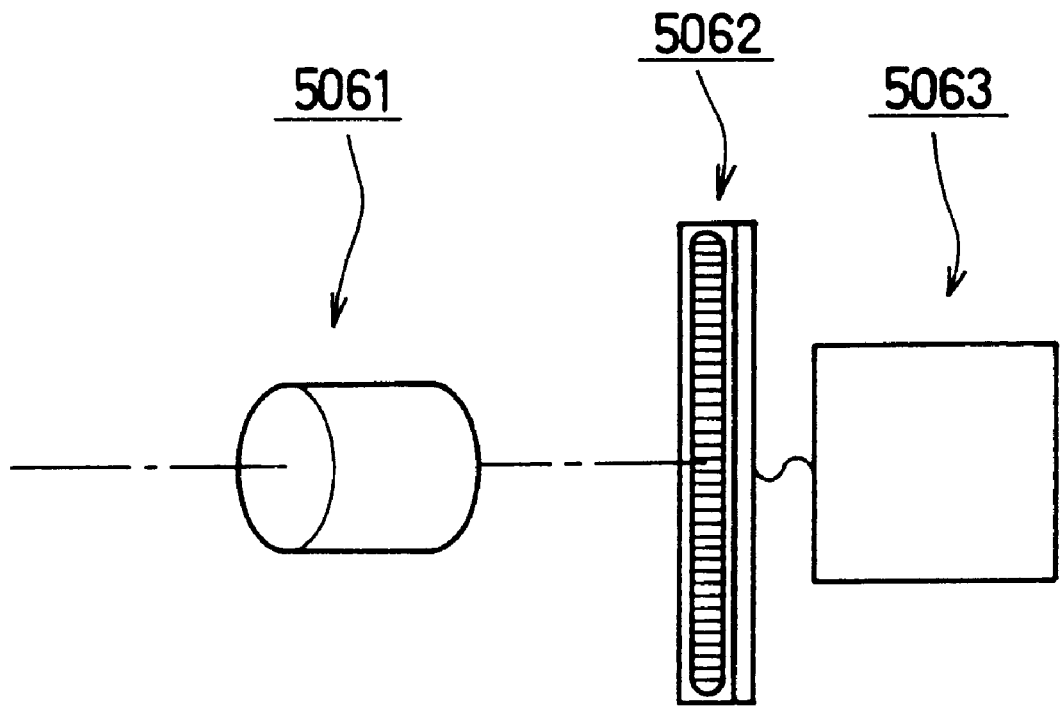
FIG. 45 is a schematic diagram showing an image reading apparatus of the twelfth embodiment in accordance with the present invention.

FIG. 45 is a schematic diagram showing an image reading apparatus of the twelfth embodiment in accordance with the present invention.

As shown in FIG. 45, the image reading apparatus comprises an optical system for reading 5061, an image sensor 5062 for converting the image information imaged by the optical system for reading 5061 into electric signals, and a circuit portion 5063 for processing the electric signals to process the image information etc.

The optical system for reading of the above eighteenth embodiment is used as the optical system for reading 5061. In the optical system for reading of the eighteenth embodiment, chromatic aberration is excellently corrected over a wide range of wavelength, and the field angle is large, and in addition it is smaller than a conventional optical system, so that it is suitable for constituting a small size image reading apparatus.

Accordingly, by constituting an image reading apparatus using the optical system for reading of the above eighteenth embodiment, the size of the entire image reading apparatus can be smaller than that of a conventional apparatus, and also an image reading apparatus having a good imaging performance can be obtained.

Twenty-first Embodiment

Next, an image reading apparatus of the twenty-first embodiment in accordance with the present invention will be described referring to FIG. 46.

Figure 46:
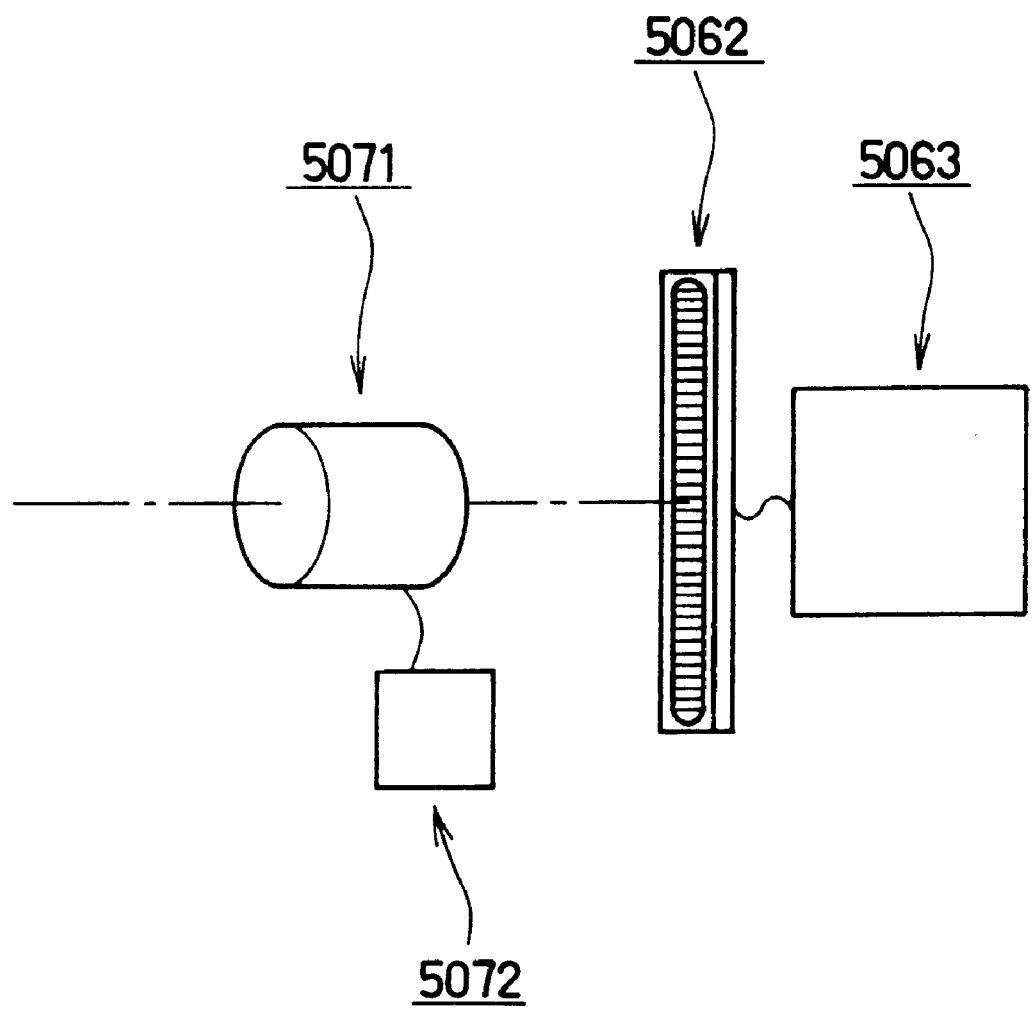
FIG. 46 is a schematic diagram showing an image reading apparatus of the twenty-first embodiment in accordance with the present invention.

FIG. 46 is a schematic diagram showing an image reading apparatus of the twenty-first embodiment in accordance with the present invention.

As shown in FIG. 46, the image reading apparatus comprises an optical system for reading 5071, a driving device 5072 for driving the optical system for reading 5071, and an image sensor 5062 for converting the image information imaged by the optical system for reading 5071 into electric signals, and a circuit portion 5063 for processing the electric signals to process the image information etc.

The optical system for reading of the above nineteenth embodiment is used as the optical system for reading 5071. In the optical system for reading of the nineteenth embodiment, chromatic aberration is excellently corrected over a wide range of wavelength, the field angle is large, and also it is smaller than a conventional optical system, so that it is suitable for constituting a small size image reading apparatus.

Accordingly, by constituting an image reading apparatus using the optical system for reading of the above nineteenth embodiment, the size of the entire image reading apparatus can be made smaller than that of a conventional apparatus, and also an image reading apparatus having a good imaging performance can be obtained.

Twenty-second Embodiment

Next, a bar code reader of the twenty-second embodiment in accordance with the present invention will be described referring to FIG. 47.

Figure 47:
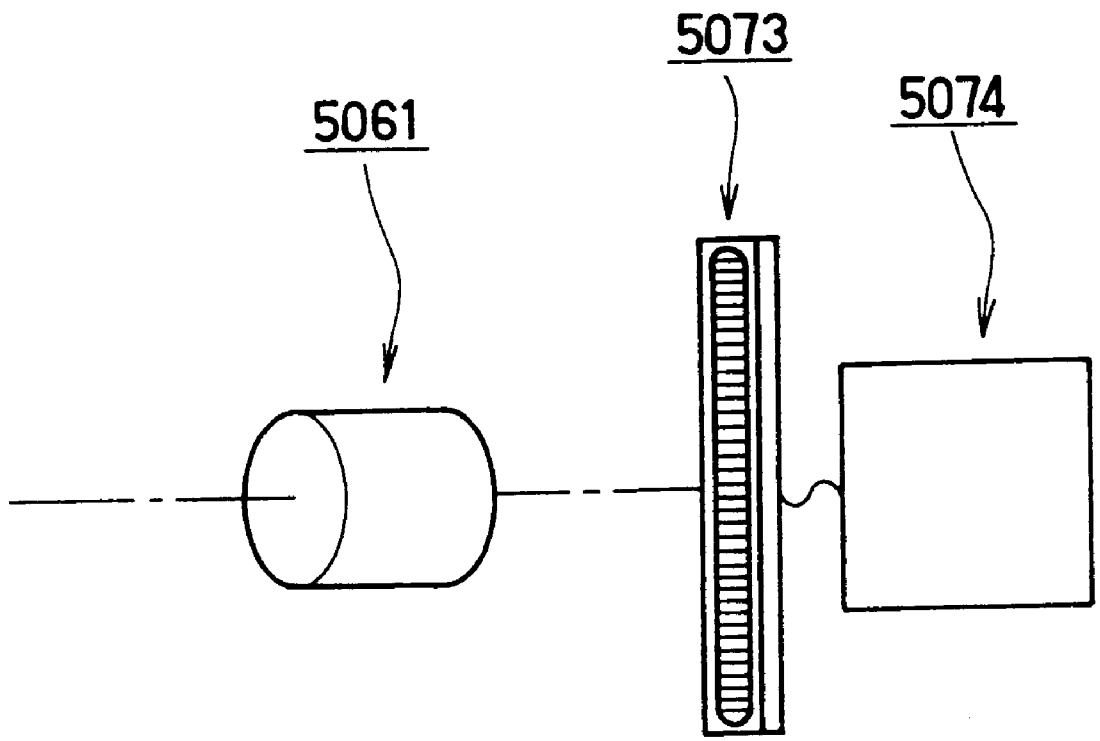
FIG. 47 is a schematic diagram showing a bar code reader of the twenty-second embodiment in accordance with the present invention.

FIG. 47 is a schematic diagram showing a bar code reader of the twenty-second embodiment in accordance with the present invention.

As shown in FIG. 47, the bar code reader comprises an optical system for reading 5061, an image sensor 5073 for converting the bar code information imaged by the optical system for reading 5061 into electric signals, and a signal processing circuit 5074 having a circuit portion for decoding the bar code information etc.

The optical system for reading of the above eighteenth embodiment is used as the optical system for reading 5061. In the optical system for reading of the above eighteenth embodiment, chromatic aberration is excellently corrected over a wide range of wavelength, so that a light source such as LED is not required, and also the field angle is large, and in addition it is smaller than a conventional optical system, so that it is suitable for constituting a small size bar code reader.

Accordingly, by constituting a bar code reader using the optical system for reading of the above the eighteenth embodiment, the size of the entire bar code reader can be smaller than that of a conventional one, and also a bar code reader having a good imaging performance can be obtained.

Twenty-third Embodiment

Next, a bar code reader of the twenty-third embodiment in accordance with the present invention will be described referring to FIG. 48.

Figure 48:
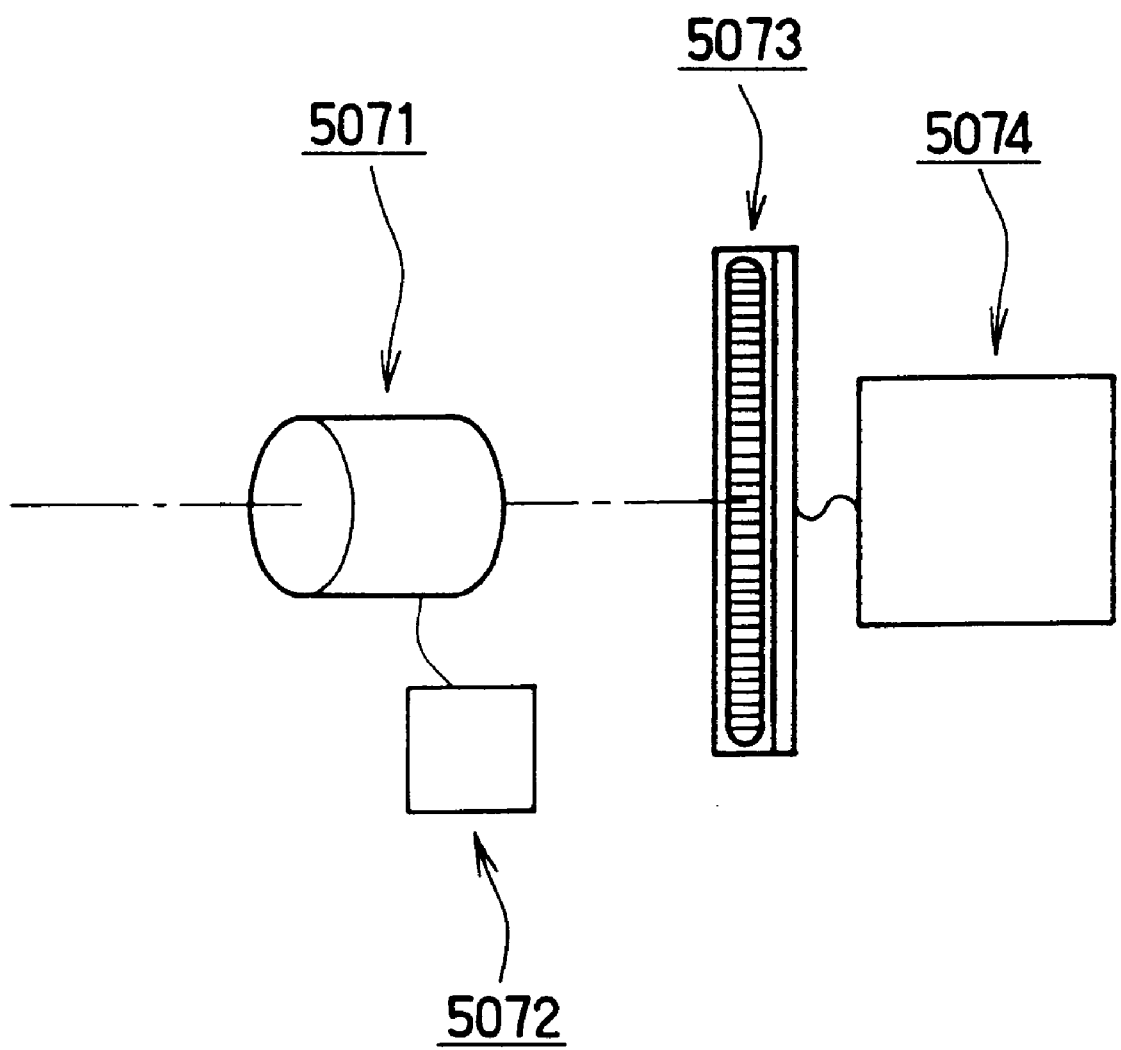
FIG. 48 is a schematic diagram showing a bar code reader of the twenty-third embodiment in accordance with the present invention.
Figure 49:
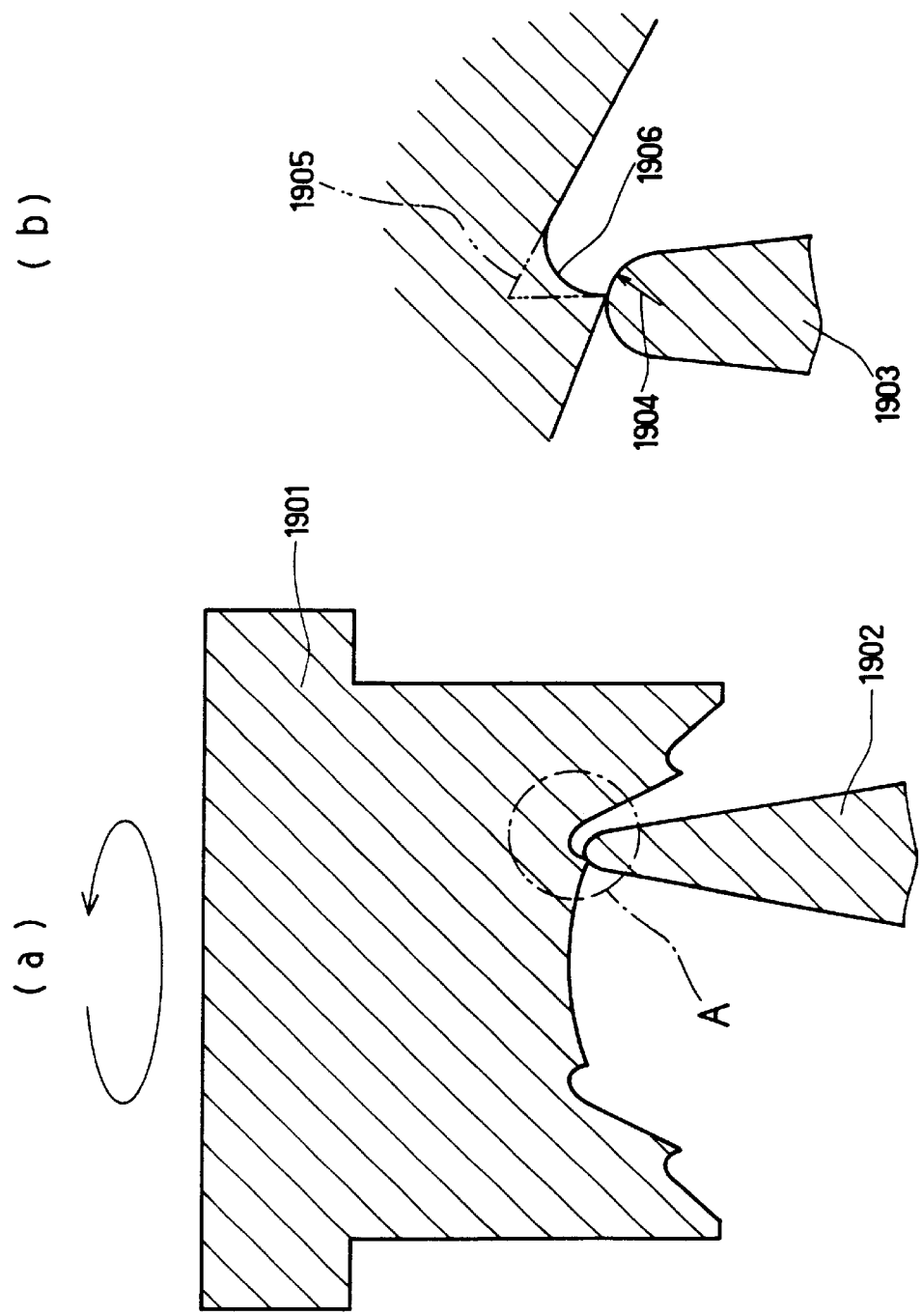
FIGS. 49a–b is a schematic drawing illustrating how a die for the diffraction lens is cut with a diamond bit.
Figure 50:
FIGS. 50a–e is a schematic drawing illustrating how a die for the diffraction lens is cut with a diamond bit, and a lens formed with such a die.
Figure 50:
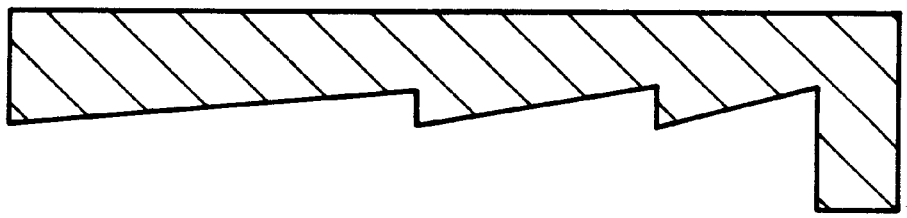
Figure 50:
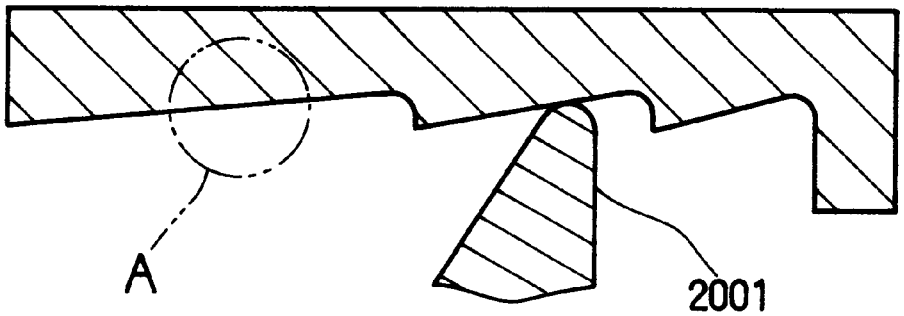
Figure 50:
Figure 50:
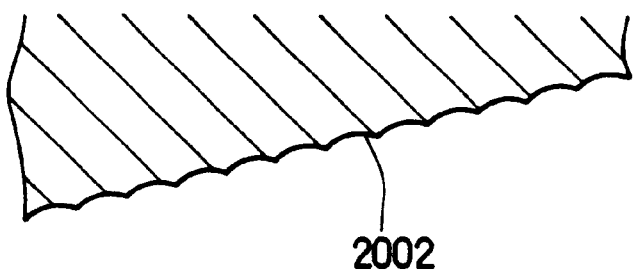

FIG. 48 is a schematic diagram showing a bar code reader of the twenty-third embodiment in accordance with the present invention.

As shown in FIG. 48, the bar code reader comprises an optical system for reading 5071, a driving device 5072 for driving the optical system for reading 5071, an image sensor 5073 for converting the bar code information imaged by the optical system for reading 5071 into electric signals, and a signal processing circuit 5074 having a circuit portion for decoding the bar code information etc.

The optical system for reading of the above nineteenth embodiment is used as the optical system for reading 5071. In the optical system for reading of the above nineteenth embodiment, chromatic aberration is excellently corrected over a wide range of wavelength, so that a light source such as LED is not required, and also the field angle is large, and in addition it is smaller than a conventional optical system, so that it is suitable for constituting a small size bar code reader.

Accordingly, by constituting a bar code reader using the optical system for reading of the above nineteenth embodiment, the size of the entire bar code reader can be made smaller than that of a conventional one, and also a bar code reader having a good imaging performance can be obtained.

The invention may be embodied in other specific forms without departing from the spirit or essential characteristics thereof The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A combined refraction/diffraction lens, comprising a refraction lens; and a diffraction lens comprising a plurality of concentric grating rings formed on at least one surface of the refraction lens;

satisfying the formula $$k = f\left(\frac{1}{f_g} + \frac{v_g}{f_d v_d}\right), \qquad (6)$$

wherein:

f: total focal length of said combined refraction/diffraction lens $f_d$: focal length of the diffraction lens $f_g$: focal length of the refraction lens $v_d$: partial dispersion coefficient at an applied wavelength region of the diffraction lens $v_g$: partial dispersion coefficient at an applied wavelength region of the refraction lens wherein k satisfies $0.1 \leq k$.

2. The combined refraction/diffraction lens according to claim 1, wherein said k satisfies $$0.2 \leq k \leq 0.8.$$

3. A combined refraction/diffraction objective lens for use in an optical information recording/reproducing device, comprising:

a single lens having an ingoing surface and an outgoing surface; and a diffraction lens comprising a plurality of concentric grating rings formed on at least one surface of the single lens;

satisfying the formula $$k = f\left(\frac{1}{f_g} + \frac{v_g}{f_d v_d}\right), \qquad (6)$$

wherein:

f: total focal length of said combined refraction diffraction objective lens $f_d$: focal length of the diffraction lens $f_g$: focal length of the refraction lens $v_d$: partial dispersion coefficient at an applied wavelength region of the diffraction lens $v_g$: partial dispersion coefficient at an applied wavelength region of the refraction lens wherein k satisfies $0.2 \leq k \leq 0.6$.

4. The combined refraction/diffraction objective lens according to claim 3, wherein said k satisfies $$0.3 \leq k \leq 0.55.$$

5. An optical head comprising a light source;

a beam splitting means for splitting a light beam emitted from said light source;

a focussing means for focussing a light beam emitted from said light source on an information recording medium;

a photo-detector element for detecting a light beam that is reflected or a transmitted by said information recording medium, wherein said focussing means comprises an objective lens according to claim 3 or claim 4.

6. A combined refraction/diffraction imaging lens comprising:

a single lens having an ingoing surface and an outgoing surface; and a diffraction lens comprising a plurality of concentric grating rings formed on at least one surface of the single lens;

satisfying the formula $$k = f\left(\frac{1}{f_g} + \frac{v_g}{f_d v_d}\right), \quad (6)$$

wherein:

f: total focal length of said combined refraction/diffraction imaging lens $f_d$: focal length of the diffraction lens $f_g$: focal length of the refraction lens $v_d$: partial dispersion coefficient at an applied wavelength region of the diffraction lens $v_g$: partial dispersion coefficient at an applied wavelength region of the refraction lens wherein k satisfies $0.3 \leq k$.

7. The combined refraction/diffraction imaging lens according to claim 6, wherein said k satisfies $0.4 \leq k \leq 0.7$.

8. An image pickup device comprising an imaging lens according to claim 6 or claim 7, an imaging element, and a signal processing circuit.

9. A lens with grating element wherein chromatic aberration is corrected by forming concentric relief rings on a surface of the lens to provide diffractive effect, the pitch $P_m$ of the relief rings satisfying the formula $$P_m > \sqrt{\frac{\lambda_1 \cdot f_d}{2m}}, \quad (7)$$

where m is the ring number counted from the center of the lens, $f_d$ is the focal length of the grating element, and $\lambda_1$ is the principal wavelength of the grating element.

10. A lens with grating element in which chromatic aberration is corrected by forming concentric relief rings on a surface of the lens to provide diffractive effect, satisfying the formula $$0.2 < \left|\frac{d}{r}\right| < 0.7, \quad (8)$$

where r is the effective radius of the grating element surface, and d is the distance of the innermost ring of the relief from the optical axis.

11. The lens with grating element according to claim 9 or 10, wherein the surface of said grating element has a kinoform profile.

12. The lens with grating element according to claim 9 or 10, wherein said lens with grating element is made of a material selected from the group consisting of glass and plastics.

13. The lens with grating element according to claim 9 or 10, wherein said lens with grating element is formed from an infrared absorbing material.

14. An imaging apparatus comprising at least the lens with grating element according to claim 9 or 10, an image sensor, and a signal processing circuit.

15. A reading apparatus comprising at least the lens with grating element according to claim 9 or 10, an image sensor, and a signal processing circuit.

16. An optical system for reading optical information selected from the group consisting of image information and code information, comprising a lens wherein a grating element surface is formed on at least one surface of the lens, the optical system being suitable for being moved on an optical axis by a driving device, wherein the lens which constitutes the optical system for reading is only a single lens on which said grating element surface is formed, the image side surface of said lens is convex and has positive refractive power, and a diaphragm is placed at the object side from said lens.

17. The optical system for reading according to claim 16, which satisfies the formulas $$0.05 < |r_2/r_1| < 0.5, \quad (9)$$

$$9 < f/D < 16, \quad (10)$$

and $$0.05 < |f/f_d| < 0.15, \quad (11)$$

where $r_1$ is the radius of curvature at the vertex of the object side surface of said lens, $r_2$ is the radius of curvature at the vertex of the image side surface of said lens, D is the diameter of the diaphragm, f is the focal length of the entire optical system, and $f_d$ is the focal length of the grating element surface of said lens.

18. The optical system for reading according to claim 16, wherein at least one surface of said lens is an aspheric surface with a local radius of curvature that becomes smaller with increasing distance from the optical axis.

19. The optical system for reading according to claim 16, which satisfies the formula $$450 \text{ nm} < \lambda_1 < 600 \text{ nm}, \quad (12)$$

where $\lambda_1$ is the principal wavelength when the grating element surface is formed.

20. The optical system for reading according to claim 19, wherein the grating element surface has a kinoform profile.

21. The optical system for reading according to claim 16, wherein the lens having the grating element surface is made of a material selected from the group consisting of glass and plastics.

22. The optical system for reading according to claim 16, wherein the lens having the grating element surface is formed from an infrared absorbing material.

23. The optical system for reading according to claim 16, which satisfies the formula $$0.2 < y/Y < 0.6, \quad (13)$$

where Y is the maximum height of a manuscript, and y is the maximum height of an image sensor.

24. The optical system for reading according to claim 23, wherein the meridional image surface has a better imaging performance than the sagittal image surface.

25. An optical system for reading optical information selected from the group consisting of image information and code information, comprising a lens wherein a grating element surface is formed on at least one surface of the lens, the optical system being suitable for being moved on an optical axis by a driving device, wherein the optical system satisfies the formula $$0.6 < Y_t/Y_w < 1, \tag{14}$$

where $Y_w$ is the maximum height of a manuscript when the optical system is moved closest to the object side, and $Y_t$ is the maximum height of a manuscript when the optical system is moved closest to the image side.

26. An image reading apparatus comprising
    the optical system for reading according to claim 16,
    an image sensor for converting image information that is imaged by said optical system for reading into electrical signals, and
    a circuit portion for processing said electric signals to process said image information.

27. A bar code reader comprising
    the optical system for reading according to claim 16,
    an image sensor for converting bar code information that is imaged by said optical system for reading into electric signals, and
    a signal processing circuit having a circuit portion for decoding said bar code information.

28. A diffraction lens comprising a plurality of regions, each region comprising at least one grating ring, wherein the relief profile of the lens is optimized for particular desired lens properties and processing characteristics according to analysis of the diffraction efficiencies of the entire lens using the formula $$E_j = \sum_{m=1}^{M} W_m \eta_{mj} \tag{1}$$

wherein:
    j: integer indicating the order of diffraction light
    $E_j$: diffraction efficiency for j-th order diffraction light of the diffraction lens
    M: positive integer (M>1) indicating the number of regions for which the diffraction efficiency is calculated
    m: index of the region for which the diffraction efficiency is calculated
    $\eta_{mj}$: diffraction efficiency for the j-th order diffraction light of the m-th region
    $W_m$: weight for the m-th region.

29. A diffraction lens comprising a plurality of regions, each region comprising at least one grating ring, wherein the relief profile of the lens is optimized for particular desired lens properties and processing characteristics according to analysis of the diffraction efficiencies of the entire lens using the formula $$E_{jl} = \sum_{m=1}^{M} W_m \eta_{mjl} \tag{5}$$

wherein:
    j: integer indicating the order of diffraction light
    l: index of the wavelengths
    $E_{jl}$: diffraction efficiency for j-th order diffraction light of the diffraction lens at the l-th wavelength
    M: positive integer (M>1) indicating the number of regions for which the diffraction efficiency is calculated
    m: index of the region for which the diffraction efficiency is calculated
    $W_m$: weight for the m-th region
    $\eta_{mjl}$: diffraction efficiency for the j-th order diffraction light of the m-th region at the l-th wavelength.

* * * * *